(12) United States Patent
Nishikawa

(10) Patent No.: US 7,871,538 B2
(45) Date of Patent: Jan. 18, 2011

(54) LIQUID CRYSTAL COMPOSITION, RETARDATION PLATE, AND ELLIPTIC POLARIZING PLATE

(75) Inventor: Hideyuki Nishikawa, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 229 days.

(21) Appl. No.: 11/817,696

(22) PCT Filed: Mar. 3, 2006

(86) PCT No.: PCT/JP2006/304670

§ 371 (c)(1),
(2), (4) Date: Oct. 16, 2007

(87) PCT Pub. No.: WO2006/093351

PCT Pub. Date: Sep. 8, 2006

(65) Prior Publication Data

US 2008/0186443 A1    Aug. 7, 2008

(30) Foreign Application Priority Data

Mar. 4, 2005   (JP) .......................... P2005-060480

(51) Int. Cl.
C09K 19/00 (2006.01)
C09K 19/06 (2006.01)
C09K 19/52 (2006.01)
G02F 1/1333 (2006.01)

(52) U.S. Cl. ............................. 252/299.01; 252/299.6; 252/299.61; 252/299.62; 428/1.1; 430/20; 349/194

(58) Field of Classification Search ............ 252/299.01, 252/299.61, 299.62, 299.6; 428/1.1; 430/20; 349/194

See application file for complete search history.

(56) References Cited

U.S. PATENT DOCUMENTS

| 5,875,104 | A | * | 2/1999 | Prager ........................ 363/65 |
| 6,811,833 | B2 | | 11/2004 | Nishikawa et al. |
| 7,364,670 | B2 | * | 4/2008 | Nishikawa et al. ..... 252/299.01 |
| 7,535,531 | B2 | * | 5/2009 | Nishikouji et al. .......... 349/118 |
| 2002/0135728 | A1 | | 9/2002 | Tatsuta et al. |
| 2004/0141121 | A1 | | 7/2004 | Tanaka et al. |

FOREIGN PATENT DOCUMENTS

| EP | 1 506 991 A2 | 2/2005 |
| JP | 2002-048919 A | 2/2002 |
| JP | 2002-267838 A | 9/2002 |
| JP | 2002-267843 A | 9/2002 |
| JP | 2003-160540 A | 6/2003 |
| WO | WO 00/02675 A1 | 1/2000 |
| WO | WO 02/093213 A1 | 11/2002 |

OTHER PUBLICATIONS

Form PCT/ISA/210 (International Search Report) dated Jun. 27, 2006.
Form PCT/ISA/237 (Written Opinion of the International Searching Authority) dated Jun. 14, 2006.

* cited by examiner

*Primary Examiner*—Geraldina Visconti
(74) *Attorney, Agent, or Firm*—Buchanan Ingersoll & Rooney PC

(57) ABSTRACT

A liquid crystal composition is provided and includes: at least one kind of liquid crystal R exhibiting a liquid crystal phase having a positive birefringence property; and at least one kind of liquid crystal D exhibiting a liquid crystal phase having a negative birefringence property. The characteristic birefringence $\Delta n\ (\lambda)$ at wavelength $\lambda$ of the liquid crystal phase exhibited by the liquid crystal R satisfies the equation (II): $\Delta n\ (450\ nm)/\Delta n\ (550\ nm)<1.0$.

6 Claims, No Drawings

LIQUID CRYSTAL COMPOSITION, RETARDATION PLATE, AND ELLIPTIC POLARIZING PLATE

TECHNICAL FIELD

The present invention relates to a liquid crystal composition very useful for the manufacture of a retardation plate and the like, in particular relates to a liquid crystal composition whose retardation in arbitrary direction shows reciprocal dispersibility. The invention further relates to a retardation plate having an optical anisotropic layer containing the liquid crystal composition, and an elliptic polarizing plate.

BACKGROUND ART

A broad-band λ/4 plate whose wavelength dispersibility is controlled to the reciprocal wavelength dispersion is useful in the optical field. A manufacturing method of such a broad-band λ/4 plate, a method of manufacturing by uniaxial stretching with a polymer film obtained by copolymerization of a monomer unit having positive refractive index anisotropy and a monomer unit having a negative birefringence property is proposed (e.g., refer to WO 00/2675). However, the film obtained by this method is uniaxial, and manufactured by stretching of a polymer film, so that the film thickness is thick, dimensional stability is inferior, and the optical performances are susceptible to humidity and heat, therefore, the improvement of these points has been required.

DISCLOSURE OF THE INVENTION

An object of an illustrative, non-limiting embodiment of the invention is to provide a liquid crystal composition obtained by blending a plurality of liquid crystal compound or compositions showing different liquid crystal phases, which develops a biaxial liquid crystal phase and whose retardation in arbitrary direction shows reciprocal dispersibility. Another object of an illustrative, non-limiting embodiment of the invention is to provide a retardation plate using the liquid crystal composition and an elliptic polarizing plate using the retardation plate.

The above objects can be solved by the following means.

(1) A liquid crystal composition including: a liquid crystal R exhibiting a liquid crystal phase having a positive birefringence property; and a liquid crystal D exhibiting a liquid crystal phase having a negative birefringence property, wherein the liquid crystal phase exhibited by the liquid crystal R has a characteristic birefringence $\Delta n\ (\lambda)$ at wavelength $\lambda$ the characteristic birefringence $\Delta n\ (\lambda)$ satisfying equation (II):
$\Delta n\ (450\ nm)/\Delta n\ (550\ nm)<1.0$.

(2) The liquid crystal composition described in the above item (1), wherein the liquid crystal R comprises a compound represented by formula (GI):

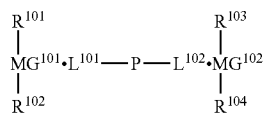

wherein $MG^{101}$ and $MG^{102}$ each independently represents a liquid crystal core part containing 2 to 8 cyclic groups for inducing an exhibition of the liquid crystal phase of the liquid crystal R, and each ring of the 2 to 8 cyclic groups in the liquid crystal core part is an aromatic ring, an aliphatic ring or a heterocyclic ring;

one cyclic group of the 2 to 8 cyclic groups in $MG^{101}$ is substituted with $L^{101}$, and one cyclic group of the 2 to 8 cyclic groups in $MG^{102}$ is substituted with $L^{102}$;

$R^{101}$ and $R^{102}$ each independently represents a flexible substituent, a dipole-acting group, or a hydrogen-bonding group, which are substituted in a molecular long axis direction of the liquid crystal core $MG^{101}$ and induce an exhibition of the liquid crystal phase of the liquid crystal R, and $R^{103}$ and $R^{104}$ each independently represents a flexible substituent, a dipole-acting group, or a hydrogen-bonding group, which are substituted in a molecular long axis direction of the liquid crystal core $MG^{102}$ and induce an exhibition of the liquid crystal phase of the liquid crystal R; and $L^{101}$ represents a linking group substituted on the liquid crystal core part $MG^{101}$, $L^{102}$ represents a linking group substituted on the liquid crystal core part $MG^{102}$, and $L^{101}$ and $L^{102}$ each independently is a group represented by one of formulae (GI)-LA and (GI)-LB:

(GI)-LA:

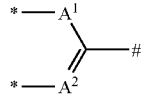

(GI)-LB:

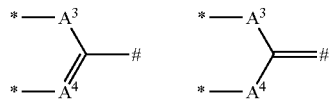

wherein * represents a position of substitution on the cyclic group $MG^{101}$ or $MG^{102}$;

# represents the position to be linked to a substituent P;

$A^1$, $A^3$ and $A^4$ each independently represents —O—, —NH—, —S—, —CH$_2$—, —CO—, —SO— or —SO$_2$—;

$A^2$ represents —CH= or —N=;

in the case where $L^{101}$ and $L^{102}$ each is a group represented by formula (GI)-LA, the substituent P represents a single bond, or a divalent linking group selected from the group consisting of —CH=CH—, —C≡C—, 1,4-phenylene, and a combination thereof;

in the case where one of $L^{101}$ and $L^{102}$ is a group represented by formula (GI)-LB, the substituent P is represented by *=CH—P$^1$-# or *=N—P$^1$-#, wherein * represents a linking position with the group represented by (GI)-LB, # represents a linking position with the group represented by (GI)-LA, and P$^1$ represents a single bond, or a divalent linking group selected from the group consisting of —CH=CH—, —C≡C—, 1,4-phenylene, and a combination thereof; and in the case where $L^{101}$ and $L^{102}$ each is a group represented by formula (GI)-LB, the substituent P represents a double bond, =CH—P$^1$—CH=, =N—P$^1$—CH=, or =N—P$^1$—N=.

(3) The liquid crystal composition described in the above item (1) or (2), wherein the liquid crystal R comprises a compound represented by formula (GII):

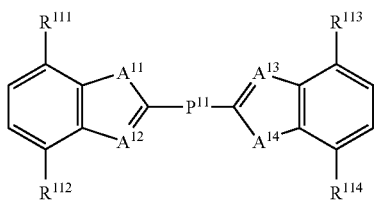

wherein $A^{11}$ and $A^{14}$ each independently represents —O—, —NH—, —S—, —CH$_2$—, —CO—, —SO— or —SO$_2$—;

$A^{12}$ and $A^{13}$ each independently represents —CH= or —N=;

$P^{11}$ represents a single bond, or a divalent linking group selected from the group consisting of —CH=CH—, —C≡C—, 1,4-phenylene, and a combination thereof, and $R^{111}$, $R^{112}$, $R^{113}$ and $R^{114}$ each independently is represented by formula (GIV):

$$*\text{-}L^{121}\text{-divalent cyclic group-}L^{122}\text{-divalent chain group-}Q^{21}$$

wherein * represents a position bonding to the benzene ring in formula (GII);

$L^{121}$ represents a single bond or a divalent linking group;

$L^{122}$ represents a single bond or a divalent linking group;

the divalent cyclic group represents a divalent linking group having at least one cyclic structure;

the divalent chain group represents an alkylene group, a substituted alkylene group, an alkenylene group, a substituted alkenylene group, an alkynylene group, or a substituted alkynylene group; and $Q^{21}$ represents a polymerizable group or a hydrogen atom.

(4) The liquid crystal composition described in any one of items (1) to (3), wherein the liquid crystal D comprises a compound represented by formula (D-2):

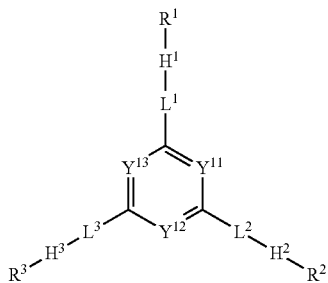

wherein $Y^{11}$, $Y^{12}$ and $Y^{13}$ each independently represents methine or a nitrogen atom; $H^1$, $H^2$ and $H^3$ each independently represents a divalent 5-membered cyclic group; $L^1$, $L^2$ and $L^3$ each independently represents a single bond or a divalent linking group; and $R^1$, $R^2$ and $R^3$ each independently represents an alkyl group, an alkenyl group, an alkynyl group, an aryl group, a substituted or unsubstituted amino group, an alkoxyl group, an aryloxy group, an acyl group, an alkoxycarbonyl group, an aryloxy-carbonyl group, an acyloxy group, an acylamino group, an alkoxycarbonylamino group, an aryloxycarbonylamino group, an alkylsulfonylamino group, an arylsulfonylamino group, a sulfamoyl group, a carbamoyl group, an alkylthio group, an arylthio group, an alkylsulfonyl group, an arylsulfonyl group, an alkylsulfinyl group, an arylsulfinyl group, a ureido group, a phosphoric acid amido group, a hydroxyl group, a mercapto group, a halogen atom, a cyano group, a sulfo group, a carboxyl group, a nitro group, a hydroxamic acid group, a sulfino group, a hydrazino group, an imino group, a heterocyclic group, or a silyl group.

(5) A retardation plate including: a transparent support; and an optical anisotropic layer, wherein the optical anisotropic layer is a layer formed from the liquid crystal composition described in any one of items (1) to (4).

(6) A retardation plate including an optical anisotropic layer formed from a liquid crystal composition, wherein the optical anisotropic layer is biaxial and has a retardation satisfying equation (III):

$$Re(450\text{ nm})/Re(550\text{ nm})<1.0$$

wherein $Re(\lambda)$ is a retardation value in a plane of the optical anisotropic layer at a wavelength $\lambda$.

(7) An elliptic polarizing plate including: a retardation plate according to the above item (5) or (6); and a polarizing film.

An exemplary embodiment of the invention can provide a liquid crystal composition whose retardation in arbitrary direction shows reciprocal dispersibility. Further, exemplary embodiments of the invention can provide a retardation plate using the liquid crystal composition and an elliptic polarizing plate using the retardation plate.

DETAILED DESCRIPTION OF THE INVENTION

An exemplary embodiment of a liquid crystal composition in the invention includes the mixture of at least one kind of liquid crystal R exhibiting a liquid crystal phase having a positive birefringence property, and at least one kind of liquid crystal D exhibiting a liquid crystal phase having a negative birefringence property.

In the invention, liquid crystal R and liquid crystal D are liquid crystal compositions each containing one or more liquid crystal compounds, and liquid crystal compositions containing only one liquid crystal compound are also included. (In the latter case, the liquid crystal R or D means a liquid crystal compound.) In the case of containing two or more liquid crystal compounds, it is possible to use in combination of a polymerizable liquid crystal compound and a non-polymerizable liquid crystal compound. It is also possible to use in combination of a low molecular weight liquid crystal compound and a high molecular weight liquid crystal compound.

Besides liquid crystal compounds, additives that can be used in forming an optical anisotropic layer described later (e.g., air interface orientation controllers, repelling preventives, polymerization initiators, polymerizable monomers, solvents and the like) may be contained. These additives may be added in the time of forming the liquid crystal composition of the invention by mixing liquid crystal R and liquid crystal D.

Whether the birefringence property of a liquid crystal phase is positive or negative can be judged with a polarizing microscope by conoscopic observation of a liquid crystal compound in the state of homeotropic orientation of the compound according to, e.g., the standard described in Seitaro Tsuboi, *Henko Kenbikyo* (*The Polarizing Microscope*), Chapter 3, Iwanami Shoten (1959).

<Liquid Crystal Composition R Exhibiting a Liquid Crystal Phase Having a Positive Birefringence Property>

Liquid crystal phases having a positive birefringence property are described in detail in *Ekisbo Binran* (*Liquid Crystal Handbook*), Chapter 2, Maruzen Co., Ltd. (2000), and, e.g., a nematic phase and a smectic A phase can be exemplified. In the invention, the liquid crystal phase exhibited by liquid crystal composition R is preferably a nematic phase.

The characteristic birefringence Δn (λ) at wavelength λ of the liquid crystal phase exhibited by the liquid crystal R in the invention satisfies the following equation (II):

$$\Delta n(450 \text{ nm})/\Delta n(550 \text{ nm}) < 1.0 \tag{II}$$

Liquid crystal phases generally do not satisfy the wavelength dispersibility of Δn represented by equation (II). For exhibiting such wavelength dispersibility of Δn, there are a method of adding an additive to a liquid crystal compound not satisfying equation (II), and a method of using a liquid crystal compound satisfying equation (II), and the latter method of using a liquid crystal compound satisfying equation (II) is preferred in the invention. For obtaining such a liquid crystal compound satisfying equation (II), it is necessary to well coincide the absorption wavelength of a liquid crystal compound and the direction of transition moment. Since Δn is a value obtained by subtracting the refractive index of an ordinary ray from the refractive index of an extraordinary ray, the subtracted value satisfies equation (II) when the wavelength dispersibility of an ordinary ray goes down rightward more than the wavelength dispersibility of the refractive index of an extraordinary ray (the inclination of Δn, taking the right side as long wavelength and the left side as short wavelength). As represented by Lorenz-Lorentz's formula, since the wavelength dispersibility of refractive index is closely related with the absorption of substance, if the absorption wavelength of an ordinary ray can be made longer so as to make the wavelength dispersibility of the ordinary ray further go down rightward, a molecule satisfying equation (II) can be designed.

In rod-like liquid crystal, the direction of an ordinary ray is the transverse direction of the molecule, and it is very difficult to make absorption transition wavelength of such a molecule longer in the transverse direction. The transition of absorption wavelength can be made longer generally by broadening π conjugation, but the breadth of a molecule is widen by such a method, so that a liquid crystal property is vanished.

For preventing such reduction of a liquid crystal property, it is possible to use a skeleton connecting two rod-like liquid crystals in the side directions as reported in William N. Thurms et al., *Liquid Crystals*, Vol. 25, p. 149 (1998). Since the skeleton connects two rod-like liquid crystals with an ethynyl group, the π conjugation of the benzene rings constituting the rod-like liquid crystals takes the form of conjugation with the π bonding of the ethynyl group (a tolan skeleton), so that the absorption wavelength of the molecule in the transverse direction can be made longer without impairing the liquid crystal property. However, the tolan skeleton is inclined by only about 60° to the long axis direction of the molecule (the direction of optical axis), in other words, the transition direction of absorption is inclined by only about 60°, not only the absorption wavelength in the ordinary ray direction but also the absorption wavelength in the extraordinary ray direction is made longer, so that such a skeleton hardly contributes to wavelength dispersibility.

It has been found that for making only the wavelength dispersibility of an ordinary ray go down rightward, it is necessary for the transition direction of absorption to be inclined preferably by 70 to 90° to the long axis direction of a molecule (the direction of optical axis), more preferably by 80 to 90°. The nearer the inclination angle to 90°, the more runs out the absorption in the extraordinary ray direction, so that only the wavelength dispersibility of an ordinary ray go down rightward and preferred.

As described above, the transition of absorption mainly contributable to the refractive index of an ordinary ray is longer in wavelength than the transition of absorption mainly contributable to the refractive index of an extraordinary ray, and a molecule whose transition direction of absorption mainly contributable to an ordinary ray is inclined by 70 to 90° to the long axis direction of the molecule (the direction of optical axis) is preferred. For the transition direction of absorption mainly contributable to an ordinary ray to be inclined by 70 to 90° to the long axis direction of the molecule (the direction of optical axis), it is preferred to have a partial structure of condensed ring of a 6-membered ring and an odd number-membered ring (a 3-membered ring, a 5-membered ring, a 7-membered ring, a 9-membered ring, etc.), and a compound represented by the following formula (GI) which is a condensed ring of a 6-membered ring and a 5-membered ring is especially preferred.

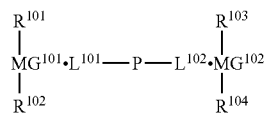

In formula (GI), $MG^{101}$ and $MG^{102}$ each represents a liquid crystal core part including from 2 to 8 cyclic groups for inducing the exhibition of a liquid crystal phase. The liquid crystal core part is a stiff part composed of a cyclic group and a linking part necessary to exhibit liquid crystal, as described in *Ekisho Binran* (*Liquid Crystal Handbook*), 3.2.2, Maruzen Co., Ltd. (2000).

As the cyclic groups, an aromatic ring, an aliphatic ring and a heterocyclic ring can be exemplified. The examples of the aromatic rings include a benzene ring and a naphthalene ring. The example of the aliphatic ring includes a cyclohexane ring. The examples of the heterocyclic rings include a pyridine ring, a pyrimidine ring, a thiophene ring, a 1,3-dioxane ring and a 1,3-dithian ring.

As the cyclic group having a benzene ring, 1,4-phenylene is preferred. As the cyclic groups having a naphthalene ring, naphthalene-1,5-diyl and naphthalene-2,6-diyl are preferred. As the cyclic group having a cyclohexane ring, 1,4-cyclohexylene is preferred. As the cyclic group having a pyridine ring, pyridine-2,5-diyl is preferred. As the cyclic group having a pyrimidine ring, pyrimidine-2,5-diyl is preferred. As the cyclic group having a thiophene ring, thiophene-2,5-diyl is preferred. As the cyclic group having a 1,3-dioxane ring, 1,3-dioxylene-2,5-diyl is preferred. As the skeleton having a 1,3-dithian ring, 1,3-dithianylene-2,5-diyl is preferred.

As the linking group, e.g., a single bond, —CH₂—CH₂—, —CH₂—O—, —CH=CH—, —C≡C—, —CH=N—, —N=N—, —CO—O—, —CO—NH—, —CO—S—, and —CH=CH—CO—O— can be exemplified.

As the liquid crystal core parts composed of these cyclic groups and linking groups, the liquid crystal core parts of the liquid crystal compounds exemplified in the following publications can be referred to, e.g., *Ekisho Binran* (*Liquid Crystal Handbook*), Chapter 3, Maruzen Co., Ltd. (2000), *Ekisho Device Handbook* (*Liquid Crystal Device Handbook*), Chapter 3, Nikkan Kogyo Shinbun-sha (1989), *Ekisho Zairyo* (*Liquid Crystal Materials*), Chapter 4, Kodansha Co., Ltd. (1991), *Kagaku Sosetsu* (*The Elements of Chemistry*), No. 22, "Ekisho no Kagaku (Chemistry of Liquid Crystals)", Chapters 1 to 7, Nippon Kagaku-kai (1994), and *Handbook of Liquid Crystals*, Vol. 2A and Vol. 2B, WILEY-VCH (1998). The liquid crystal core parts of the liquid crystal compounds that exhibit a nematic phase are particularly preferred.

The examples of $MG^{101}$ and $MG^{102}$ are shown below, wherein ** means the position linking to $R^{101}$ ($R^{103}$) or $R^{102}$ ($R^{104}$).

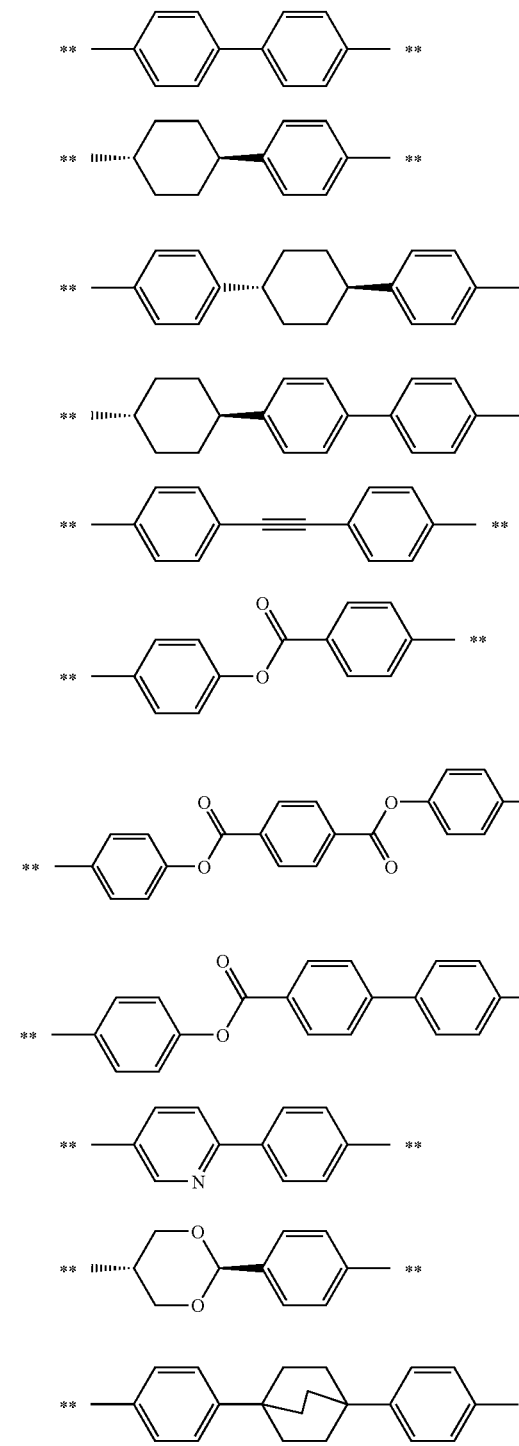

One of the cyclic groups composing $MG^{101}$ and $MG^{102}$ is substituted with $L^{101}$ and $L^{102}$.

$L^{101}$ and $L^{102}$ each represents a linking group substituted on the liquid crystal core part $MG^{101}$ and $MG^{102}$, and each is represented by the following formula (GI)-LA or (GI)-LB.

(GI)-LA:

$$*{-}A^1 \atop *{-}A^2 \!\!\!\!\!\! \diagup \!\!\! \# $$

(GI)-LB:

$$*{-}A^3 \atop *{-}A^4 \!\!\!\!\!\! \diagup \!\!\! \# \qquad *{-}A^3 \atop *{-}A^4 \!\!\!\!\!\! = \!\!\! \# $$

In the formulae, * means the position of substitution on the cyclic group constituting $MG^{101}$ or $MG^{102}$.

In the formulae, # means the position linking with P. $A^1$, $A^3$ and $A^4$ each represents —O—, —NH—, —S—, —CH$_2$—, —CO—, —SO— or —SO$_2$—. When $A^1$, $A^3$ and $A^4$ each represents —NH— or —CH$_2$—, the hydrogen atom may be substituted with other substituent. As such substituents, e.g., a halogen atom, an alkyl group having from 1 to 10 carbon atoms, an acyl group having 1 to 10 carbon atoms, and a cyano group can be exemplified. $A^1$ preferably represents —O—, —NH—, —S— or —CH$_2$—, and especially preferably represents —O— or —CH$_2$—. $A^3$ and $A^4$ each preferably represents —O—, —NH—, —S—, —CO—, —SO— or —SO$_2$—, and especially preferably represents —O—, —NH—, —S— or —CO—.

$A^2$ represents —CH= or —N=. When $A^2$ represents —CH=, the hydrogen atom may be substituted with other substituent. As such substituents, e.g., a halogen atom, an alkyl group having from 1 to 10 carbon atoms, an acyl group having 1 to 10 carbon atoms, and a cyano group can be exemplified. When $L^{101}$ and $L^{102}$ are groups represented by formula (GI)-LA, substituent P represents a single bond, or a divalent linking group selected from the group consisting of —CH=CH—, —C≡C—, 1,4-phenylene, and a combination thereof. According to combination, the absorption wavelength becomes too long and there is a possibility of discoloration to yellow, so that appropriate linking groups should be selected as P. P preferably represents a single bond, —CH=CH—, —CH=CH—CH=CH—, —CH=CH—C≡C—, —C≡C—, —C≡C—C≡C—, or 1,4-phenylene, and more preferably represents a single bond, —CH=CH—, —C≡C—, —C≡C—C≡C—, or 1,4-phenylene. When —CH=CH— or 1,4-phenylene is contained in P, the methine may be substituted with a nitrogen atom. Further, the hydrogen atoms of —CH=CH— and 1,4-phenylene may be substituted with other substituents. As such substituents, e.g., a halogen atom, an alkyl group having from 1 to 10 carbon atoms, an acyl group having 1 to 10 carbon atoms, and a cyano group can be exemplified.

When either $L^{101}$ or $L^{102}$ is a group represented by formula (GI)-LB, substituent P is represented by *=CH—$P^1$-# or *=N—$P^1$-# (where * represents the linking position with formula (GI)-LB, and # represents the linking position with formula (GI)-LA. According to combination, the absorption wavelength becomes too long and there is a possibility of discoloration to yellow, so that appropriate linking groups should be selected as $P^1$. $P^1$ preferably represents a single bond, —CH=CH—, —CH=CH—CH=CH—, —CH=CH—C≡C—, —C≡C—, —C≡C—C≡C—, or 1,4-phenylene, and more preferably represents a single bond, —CH=CH—, —C≡C—, —C≡C—C≡C—, or 1,4-phenylene. When —CH=CH— or 1,4-phenylene is contained in $P^1$, the methine may be substituted with a nitrogen atom. Further, the hydrogen atoms of —CH=CH— and 1,4-phenylene may be substituted with other substituents. As such substituents, e.g., a halogen atom, an alkyl group having from 1 to 10 carbon atoms, an acyl group having 1 to 10 carbon atoms, and a cyano group can be exemplified.

When $L^{101}$ and $L^{102}$ are groups represented by formula (GI)-LB, substituent P represents a double bond, =CH—$P^1$—CH=, =N—$P^1$—CH=, or =N—$P^1$—N=. $P^1$ has the same meaning as the above $P^1$.

The examples of $MG^{101}$ and $MG^{102}$ substituted with $L^{101}$ and $L^{102}$ are shown below (** means the position linking to $R^{101}$ ($R^{103}$) or $R^{102}$ ($R^{104}$), and # means the position to be linked with P).

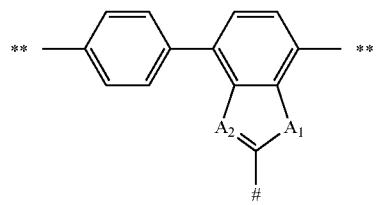
COL-1

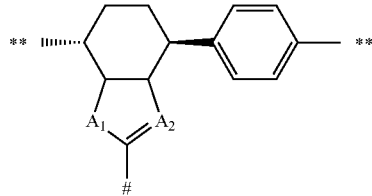
COL-2

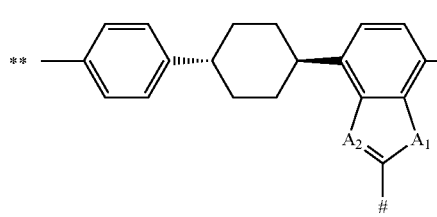
COL-3

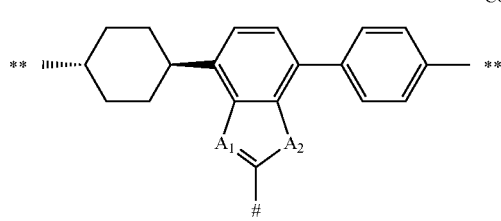
COL-4

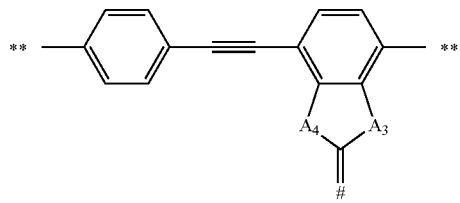
COL-5

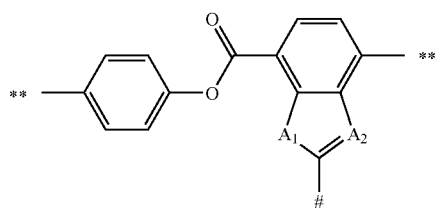
COL-6

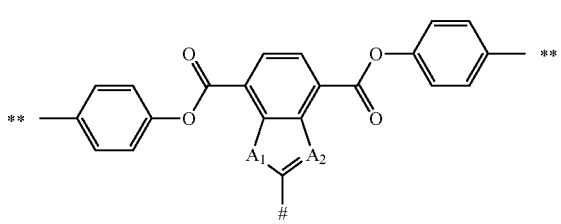
COL-7

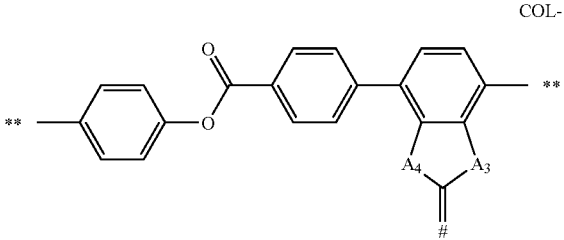
COL-8

-continued

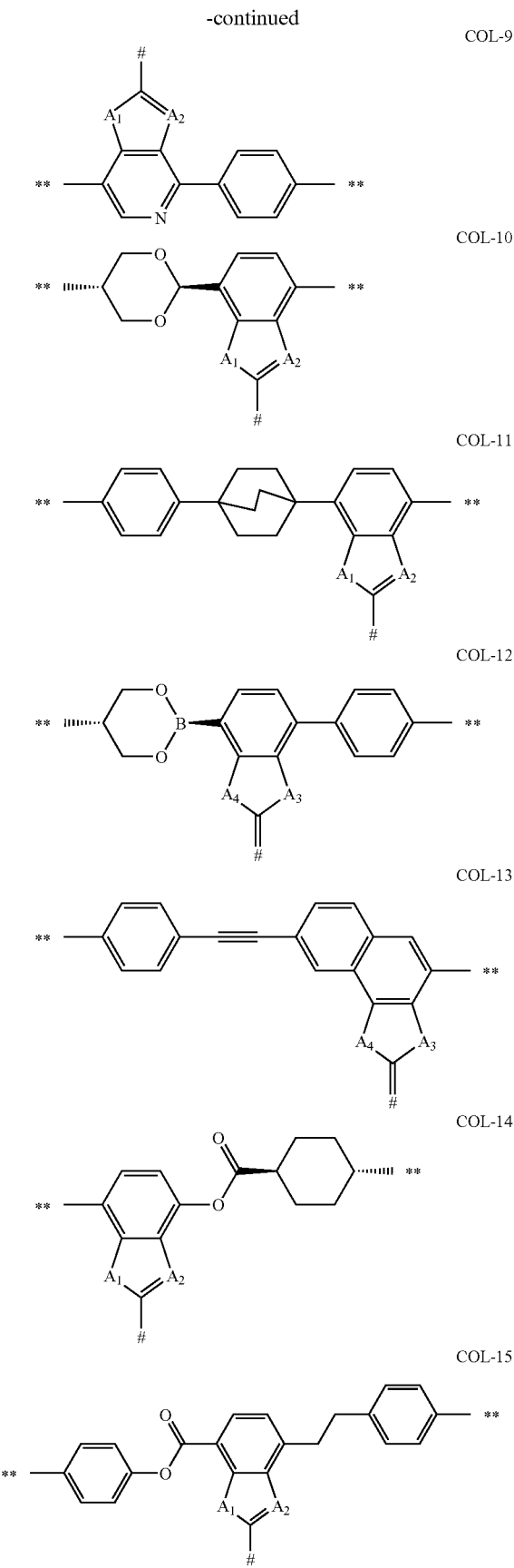

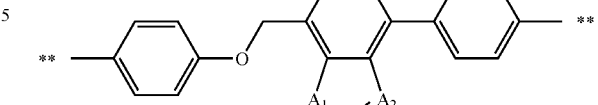

The cyclic groups constituting $MG^{101}$ and $MG^{102}$ may have substituents other than $L^{101}$ and $L^{102}$. The examples of the substituents include a halogen atom, a cyano group, a nitro group, an alkyl group having from 1 to 5 carbon atoms, a halogen-substituted alkyl group having from 1 to 5 carbon atoms, an alkoxyl group having from 1 to 5 carbon atoms, an alkylthio group having from 1 to 5 carbon atoms, an acyloxy group having from 2 to 6 carbon atoms, an alkoxycarbonyl group having from 2 to 6 carbon atoms, a carbamoyl group, an alkyl-substituted carbamoyl group having from 2 to 6 carbon atoms, and an acylamino group having from 2 to 6 carbon atoms.

$R^{101}$, $R^{102}$, $R^{103}$ and $R^{104}$ each represents a flexible substituent, a dipole-acting group, or a hydrogen-bonding group, which are substituted in the molecular long axis direction of the liquid crystal core part and induce the exhibition of a liquid crystal phase. The examples of the flexible substituents include an alkyl group having from 1 to 20 carbon atoms, an alkyloxy group having from 1 to 20 carbon atoms, an acyl group having from 2 to 20 carbon atoms, an alkoxycarbonyl group having from 2 to 20 carbon atoms, an acyloxy group having from 2 to 20 carbon atoms, an alkoxycarbonyloxy group having from 2 to 20 carbon atoms, an alkylthio group having from 1 to 20 carbon atoms, an amino group having from 1 to 20 carbon atoms, an acylamino group having from 2 to 20 carbon atoms, and an alkoxycarbonylamino group having from 2 to 20 carbon atoms. These flexible substituents may further be substituted with other substituents, and the examples of such other substituents include an alkyl group (e.g., a methyl group, an ethyl group, an isopropyl group, a tert-butyl group are exemplified), an alkenyl group (e.g., a vinyl group, an allyl group, a 2-butenyl group, a 3-pentenyl group, etc., are exemplified), an alkynyl group (e.g., a propargyl group, a 3-pentynyl group, etc., are exemplified), an aryl group (e.g., a phenyl group, a p-methylphenyl group, a naphthyl group, etc., are exemplified), a substituted or unsubstituted amino group (e.g., an unsubstituted amino group, a methylamino group, a dimethyl-amino group, a diethylamino group, an anilino group, etc., are exemplified), an alkoxyl group (e.g., a methoxy group, an ethoxy group, a butoxy group, etc., are exemplified), an aryloxy group (e.g., a phenyloxy group, a 2-naphthyloxy group, etc., are exemplified), an acyl group (e.g., an acetyl group, a benzoyl group, a formyl group, a pivaloyl group, etc., are exemplified), an alkoxycarbonyl group (e.g., a methoxy-carbonyl group, an ethoxycarbonyl group, etc., are exemplified), an aryloxycarbonyl group (e.g., a phenyloxy-carbonyl group, etc., are exemplified), an acyloxy group (e.g., an acetoxy group, a benzoyloxy group, etc., are exemplified), an acylamino group (e.g., an acetylamino group, a benzoylamino group, etc., are exemplified), an alkoxycarbonylamino group (e.g., a methoxycarbonylamino group, etc., are exemplified), an aryloxycarbonylamino group (e.g., a phenyloxycarbonylamino group, etc., are exemplified), an alkylsulfonylamino group (e.g., a methanesulfonylamino group, etc., are exemplified), an arylsulfonylamino group (e.g., a benzenesulfonylamino group, etc., are exemplified), a sulfamoyl group (e.g., a sulfamoyl group, an N-methylsulfamoyl group, an N,N-dimethyl-sulfamoyl group, an N-phenylsulfamoyl group, etc., are exemplified), a carbamoyl group (e.g., an unsubstituted carbamoyl group, an N-methylcarbamoyl group, an N,N-diethyl-carbamoyl group, an N-phenylcarbamoyl group, etc., are exemplified), an alkylthio group (e.g., a methylthio group, an ethylthio group, etc., are exemplified), an arylthio group (e.g., a phenylthio group, etc., are exemplified), an alkyl-sulfonyl group (e.g., a mesyl group, etc., are exemplified), an arylsulfonyl group (e.g., a tosyl group, etc., are exemplified), an alkylsulfinyl group (e.g., a methanesulfinyl group, etc., are exemplified), an arylsulfinyl group (e.g., a benzenesulfinyl group, etc., are exemplified), a ureido group (e.g., an unsubstituted ureido group, a 3-methylureido group, a 3-phenylureido group, etc., are exemplified), a phosphoric acid amide group (e.g., a diethylphosphoric acid amide group, a phenylphosphoric acid amide group, etc., are exemplified), a hydroxyl group, a mercapto group, a halogen atom (e.g., a fluorine atom, a chlorine atom, a bromine atom, an iodine atom are exemplified), a cyano group, a sulfo group, a carboxyl group, a nitro group, a hydroxamic acid group, a sulfino group, a hydrazino group, an imino group, a heterocyclic group (e.g., a heterocyclic group having a hetero atom, such as a nitrogen atom, an oxygen atom, a sulfur atom, etc., e.g., an imidazolyl group, a pyridyl group, a quinolyl group, a furyl group, a piperidyl group, a morpholino group, a benzoxazolyl group, a benzimidazolyl group, a benzothiazolyl group, etc., are exemplified), and a silyl group (e.g., a trimethylsilyl group, a triphenylsilyl group, etc., are exemplified). These substituents may further be substituted with these substituents.

The examples of the dipole-acting groups include a halogen atom, a cyano group, and a nitro group. The examples of the hydrogen-bonding groups include a carboxyl group and a hydroxyl group.

For providing the wavelength dispersibility of Δn represented by equation (II) to the compound represented by formula (GI), it is necessary to adjust (1) the absorption wavelength and the absorption strength mainly contributable to an extraordinary ray of the liquid crystal core part represented by $MG^{101}$ and $MG^{102}$, and (2) the absorption wavelength and the absorption strength mainly contributable to an ordinary ray of the part comprising the cyclic group forming $MG^{101}$ and $MG^{102}$ and $-L^{101}-P-L^{102}-$ of making the absorption wavelength in the transverse direction long. For satisfying equation (II), i.e., for the purpose of the wavelength dispersibility of an ordinary ray going down rightward more than the wavelength dispersibility of the refractive index of an extraordinary ray, it is essential that the absorption wavelength of (2) is longer than the absorption wavelength of (1). The absorption strength is also an important factor relating the wavelength dispersibility, but the refractive indexes of an ordinary ray and an extraordinary ray consist by the equilibrium of absorption wavelength and absorption strength, and it is difficult to actually measure the absorption wavelengths and absorption strengths of an ordinary ray and an extraordinary ray, therefore, it is very difficult to define both values. However, from the experiences, the absorption wavelength having the strongest absorption strength of (1) is preferably 320 nm or less, and more preferably 300 mm or less. Further, the absorption wavelength that is the strongest in the absorption strength of (2) is preferably 280 nm or more, and more preferably 300 nm or more. When the absorption wavelength of (2) is too long, unfavorable discoloration to yellow and the like occurs. Accordingly, it is preferred that the bottom of absorption does not exceed 400 nm. The difference in the absorption wavelength having the strongest absorption strength between (1) and (2) is preferably 20 nm or more, and more preferably 40 nm or more. It is also preferred that the absorption coefficient of the absorption wavelength that is the strongest in the absorption strength of (2) is 0.1 times or more the absorption coefficient of the absorption wavelength that is the strongest in the absorption strength of (1), and more preferably 0.2 times or more. However, there are many cases where the absorption wavelengths and the absorption strengths of (1) and (2) cannot be actually measured, further there are many cases having side-absorption, so that sometimes the above definition is not applied. As the compound that satisfies these conditions, a compound represented by the following formula (GII) is preferred.

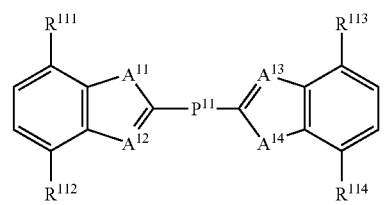

In formula (GI), $A^{11}$ and $A^{14}$ have the same meaning as $A^1$ defined in formula (GI). $A^{12}$ and $A^{13}$ have the same meaning as $A^2$ in formula (GI).

$P^{11}$ has the same meaning as $P^1$ in formula (GI).

The hydrogen atom of the benzene ring condensed of a 5-membered ring in formula (GII) may be substituted with other substituents. As such substituents, e.g., a halogen atom, an alkyl group having from 1 to 10 carbon atoms, an acyl group having 1 to 10 carbon atoms, and a cyano group can be exemplified. The methine of the benzene ring condensed of a 5-membered ring in formula (GII) may be substituted with a nitrogen atom.

$R^{111}$, $R^{112}$, $R^{113}$ and $R^{114}$ are each represented by the following formula (GIII):

In formula (GIII), * represents the position bonding to the benzene ring in formula (GII).

Q represents a polymerizable group or a hydrogen atom. Including the retardation plate of the invention, when a compound represented by formula (GI) is used in an optical film that the size of a phase difference is preferably not fluctuated by heat such as an optically compensatory film, Q is preferably a polymerizable group. The polymerization reaction is preferably addition polymerization (including ring-opening polymerization) or condensation polymerization. In other words, the polymerizable group is preferably a functional group capable of addition polymerization reaction or condensation polymerization reaction. The examples of the polymerizable groups are shown below.

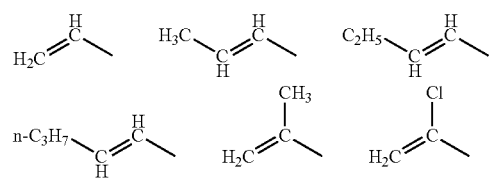

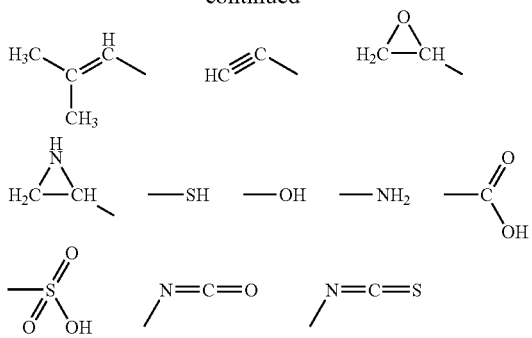

The polymerizable group is especially preferably a functional group capable of addition polymerization reaction. As such a polymerizable group, a polymerizable ethylenic unsaturated group or a ring-opening polymerizable group is preferred.

As the examples of the polymerizable ethylenic unsaturated groups, the compounds represented by the following formulae (M-1) to (M-6) are exemplified.

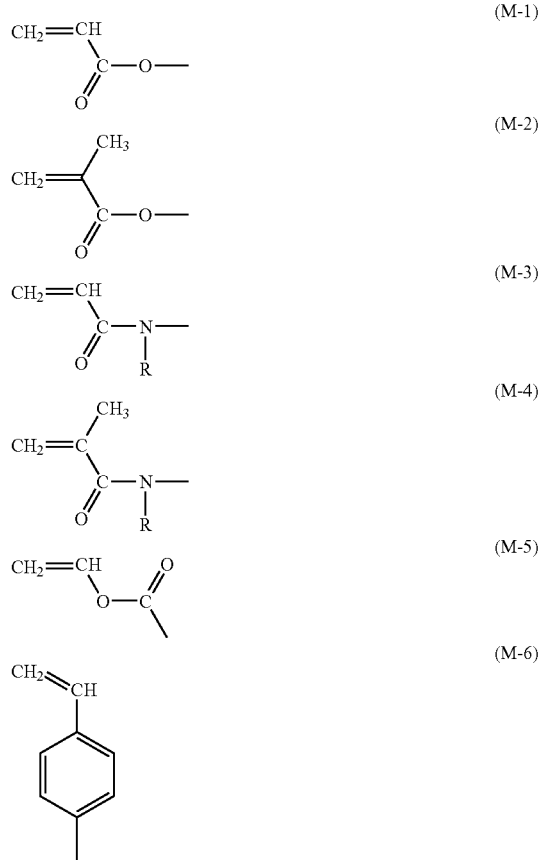

In formulae (M-3) and (M-4), R represents a hydrogen atom or a substituent. As the substituents, the groups represented by $R^1$, $R^2$ and $R^3$ described above are exemplified. R preferably represents a hydrogen atom or an alkyl group, and especially preferably represents a hydrogen atom or a methyl group.

Of formulae (M-1) to (M-6), (M-1) or (M-2) is preferred, and (M-1) is most preferred.

The preferred groups as the ring-opening polymerizable groups are cyclic ether groups, more preferred groups are an epoxy group and an oxetanyl group, and an epoxy group is most preferred.

In formula (GIII), $L^{111}$ represents a divalent linking group. $L^{111}$ preferably represents a divalent linking group selected from the group consisting of —O—, —S—, —C(=O)—, —NR$^7$—, a divalent chain group, a divalent cyclic group, and a combination of these groups. $R^7$ represents an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom.

The divalent chain group represented by $L^{111}$ is an alkylene group, a substituted alkylene group, an alkenylene group, a substituted alkenylene group, an alkynylene group, or a substituted alkynylene group. Of these groups, an alkylene group, a substituted alkylene group, an alkenylene group, and a substituted alkenylene group are preferred, and an alkylene group and an alkenylene group are more preferred.

The alkylene group as the divalent chain group represented by $L^{111}$ may be branched. The —CH$_2$— in the alkylene group may be substituted with, e.g., —O— or —S—. The carbon atom number of the alkylene group is preferably from 1 to 16, more preferably from 2 to 14, and most preferably from 2 to 12. The alkylene moiety of the substituted alkylene group is the same as the alkylene group described above. The examples of the substituents include an alkyl group and a halogen atom.

The alkenylene group as the divalent chain group represented by $L^{111}$ may have a substituted or unsubstituted alkylene group in the main chain, or may be branched. When the alkenylene group contains —CH$_2$—, the —CH$_2$— may be substituted with, e.g., —O— or —S—. The carbon atom number of the alkenylene group is preferably from 2 to 16, more preferably from 2 to 14, and most preferably from 2 to 12. The alkenylene moiety of the substituted alkenylene group is the same as the alkenylene group described above. The examples of the substituents include an alkyl group and a halogen atom.

The alkynylene group as the divalent chain group represented by $L^{111}$ may have a substituted or unsubstituted alkylene group in the main chain, or may be branched. When the alkynylene group contains —CH$_2$—, the —CH$_2$— may be substituted with, e.g., —O— or —S—. The carbon atom number of the alkynylene group is preferably from 2 to 16, more preferably from 2 to 14, and most preferably from 2 to 12. The alkynylene moiety of the substituted alkynylene group is the same as the alkynylene group described above. The examples of the substituents include an alkyl group and a halogen atom.

The specific examples of the divalent chain groups represented by $L^{111}$ include ethylene, trimethylene, tetramethylene, 1-methyltetramethylene, pentamethylene, hexamethylene, octamethylene, nonamethylene, decamethylene, undecamethylene, dodecamethylene, 2-butenylene and 2-butynylene.

The divalent cyclic group represented by $L^{111}$ is a divalent linking group having at least one cyclic structure. The divalent cyclic group is preferably a 5-, 6- or 7-membered ring, more preferably a 5- or 6-membered ring, and most preferably a 6-membered ring. The ring contained in the cyclic group may be a condensed ring. However, a monocyclic ring is preferred to a condensed ring. The ring contained in the cyclic group may be any of an aromatic ring, an aliphatic ring, and a heterocyclic ring. The examples of the aromatic rings include a benzene ring and a naphthalene ring. The examples of the aliphatic rings include a cyclohexane ring. The examples of the heterocyclic rings include a pyridine ring, a pyrimidine ring, a thiophene ring, a 1,3-dioxane ring and a 1,3-dithian ring.

Of the divalent cyclic groups represented by $L^{111}$, as the cyclic group having a benzene ring, 1,4-phenylene is preferred. As the cyclic groups having a naphthalene ring, naphthalene-1,5-diyl and naphthalene-2,6-diyl are preferred. As the cyclic group having a cyclohexane ring, 1,4-cyclohexylene is preferred. As the cyclic group having a pyridine ring, pyridine-2,5-diyl is preferred. As the cyclic group having a pyrimidine ring, pyrimidine-2,5-diyl is preferred. As the cyclic group having a thiophene ring, thiophene-2,5-diyl is preferred. As the cyclic group having a 1,3-dioxane ring, 1,3-dioxylene-2,5-diyl is preferred. As the skeleton having a 1,3-dithian ring, 1,3-dithianylene-2,5-diyl is preferred.

The divalent cyclic groups represented by $L^{111}$ may have a substituent. The examples of the substituents include a halogen atom, a cyano group, a nitro group, an alkyl group having from 1 to 16 carbon atoms, a halogen-substituted alkyl group having 1 to 16 carbon atoms, an alkoxyl group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl-substituted carbamoyl group having from 2 to 16 carbon atoms, and an acylamino group having from 2 to 16 carbon atoms.

The examples of the divalent linking groups represented by $L^{111}$ are shown below, where the right side is bonded to the benzene ring in formula (GII), and the left side is bonded to Q.

L-1: -divalent chain group-O-divalent cyclic group-

L-2: -divalent chain group-O-divalent cyclic group-CO—O—

L-3: -divalent chain group-O-divalent cyclic group-O—CO—

L-4: -divalent chain group-O-divalent cyclic group-CO—NR$^7$—

L-5: -divalent chain group-O-divalent cyclic group-divalent chain group-

L-6: -divalent chain group-O-divalent cyclic group-divalent chain group-CO—O—

L-7: -divalent chain group-O-divalent cyclic group-divalent chain group-O—CO—

L-8: -divalent chain group-O—CO-divalent cyclic group-

L-9: -divalent chain group-O—CO-divalent cyclic group-CO—O—

L-10: -divalent chain group-O—CO-divalent cyclic group-O—CO—

L-11: -divalent chain group-O—CO-divalent cyclic group-CO—NR$^7$—

L-12: -divalent chain group-O—CO-divalent cyclic group-divalent chain group-

L-13: -divalent chain group-O—CO-divalent cyclic group-divalent chain group-CO—O—

L-14: -divalent chain group-O—CO-divalent cyclic group-divalent chain group-O—CO—

L-15: -divalent chain group-CO—O-divalent cyclic group-

L-16: -divalent chain group-CO—O-divalent cyclic group-CO—O—

L-17: -divalent chain group-CO—O-divalent cyclic group-O—CO—

L-18: -divalent chain group-CO—O-divalent cyclic group-CO—NR$^7$—

L-19: -divalent chain group-CO—O-divalent cyclic group-divalent chain group-

L-20: -divalent chain group-CO—O-divalent cyclic group-divalent chain group-CO—O—

L-21: -divalent chain group-CO—O-divalent cyclic group-divalent chain group-O—CO—

L-22: -divalent chain group-O—CO—O-divalent cyclic group-

L-23: -divalent chain group-O—CO—O-divalent cyclic group-CO—O—

L-24: -divalent chain group-O—CO—O-divalent cyclic group-O—CO—

L-25: -divalent chain group-O—CO—O-divalent cyclic group-CO—NR$^7$—

L-26: -divalent chain group-O—CO—O-divalent cyclic group-divalent chain group-

L-27: -divalent chain group-O—CO—O-divalent cyclic group-divalent chain group-CO—O—

L-28: -divalent chain group-O—CO—O-divalent cyclic group-divalent chain group-O—CO—

L-29: -divalent chain group-

L-30: -divalent chain group-O—

L-31: -divalent chain group-CO—O—

L-32: -divalent chain group-O—CO—

L-33: -divalent chain group-CO—NR$^7$—

L-34: -divalent chain group-O-divalent chain group-

L-35: -divalent chain group-O-divalent chain group-O—

L-36: -divalent chain group-O-divalent chain group-CO—O—

L-37: -divalent chain group-O-divalent chain group-O—CO—

$R^{111}$, $R^{112}$, $R^{113}$ and $R^{114}$ are each more preferably represented by the following formula (GIV):

$$*\text{-}L^{121}\text{-divalent cyclic group-}L^{122}\text{-divalent chain group-}Q^{21}$$

In formula (GIV), * represents the position bonding to the benzene ring in formula (GII).

$L^{121}$ represents a single bond or a divalent linking group. When $L^{121}$ represents a divalent linking group, the divalent linking group is preferably selected from the group consisting of —O—, —S—, —C(=O)—; —NR$^7$—, —CH$_2$—, —CH=CH—, —C≡C—, and a combination of these groups. $R^7$ represents an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom.

$L^{121}$ preferably represents a single bond, *—O—CO—, *—CO—O—, *—CH$_2$—CH$_2$—, *—O—CH$_2$—, *—CH$_2$—O—, or *—CO—CH$_2$—CH$_2$— (where * represents the side of * in formula (GIV)), and $L^{121}$ especially preferably represents a single bond, *—O—CO— or *—CO—O—.

The divalent cyclic group in formula (GIV) is the same as the divalent cyclic group defined in formula (GIII).

As the divalent cyclic groups in formula (GIV), 1,4-phenylene, 1,4-cyclohexylene, pyridine-2,5-diyl, pyrimidine-2,5-diyl, and 1,3-dioxylene-2,5-diyl are preferred, and 1,4-phenylene, 1,4-cyclohexylene and 1,3-dioxylene-2,5-diyl are especially preferred.

The divalent cyclic groups in formula (GIV) may have a substituent, and as the substituents, a halogen atom (e.g., a fluorine atom, a chlorine atom, a bromine atom, an iodine atom), an alkyl group having from 1 to 8 carbon atoms, an alkyloxy group having from 1 to 8 carbon atoms, an acyl group having from 2 to 8 carbon atoms, an acyloxy group having from 2 to 8 carbon atoms, an alkoxycarbonyl group having from 2 to 8 carbon atoms, a nitro group, and a cyano group are preferred, and a halogen atom, an alkyl group having from 1 to 3 carbon atoms, an alkyloxy group having from 1 to 3 carbon atoms, an acyl group having from 2 to 4 carbon atoms, an acyloxy group having from 2 to 4 carbon atoms, an alkoxycarbonyl group having from 2 to 4 carbon atoms, and a cyano group are especially preferred.

$L^{122}$ represents a single bond or a divalent linking group. When $L^{122}$ represents a divalent linking group, the divalent linking group is preferably selected from the group consisting of —O—, —S—, —C(=O)—, —NR$^7$—, and a combination of these groups. $R^7$ represents an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom.

$L^{122}$ preferably represents a single bond, *—O—, *—O—CO—, *—CO—O—, *—O—CO—O—, *—CO—, *—S—, or *—NR$^7$— (where * represents the position linking with the divalent cyclic group in formula (GIV)), and $L^{122}$ especially preferably represents a single bond, *—O—, *—O—CO—, *—CO—O—, or *—O—CO—O—.

The divalent cyclic group in formula (GIV) is the same as the divalent cyclic group defined in formula (GIII).

As the divalent chain group in formula (GIV), a substituted or unsubstituted alkylene group having from 1 to 16 carbon atoms, a substituted or unsubstituted alkenylene group having from 2 to 16 carbon atoms, or a substituted or unsubstituted alkynylene group having from 2 to 16 carbon atoms is preferred, and a substituted or unsubstituted alkylene group having from 1 to 12 carbon atoms is especially preferred. As the substituent of the chain group, an alkyl group having from 1 to 5 carbon atoms or a halogen atom is preferred. The most preferred divalent chain group is an unsubstituted alkylene group having from 1 to 12 carbon atoms.

$Q^{21}$ represents a polymerizable group or a hydrogen atom. As the polymerizable group, —O—CO—C(R$^6$)=CH$_2$ is preferred. $R^6$ represents a hydrogen atom or a methyl group, and preferably represents a hydrogen atom.

In the invention, of the compounds represented by formula (GI), the compounds represented by formula (GII) in which $R^{111}$, $R^{112}$, $R^{113}$ and $R^{114}$ are each represented by formula (GIV) are preferred.

The specific examples of the compounds represented by formula (GI) or (GII) are shown below.

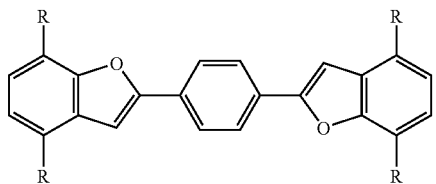

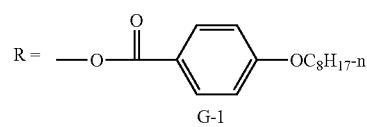
G-1

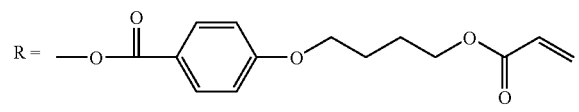
G-2

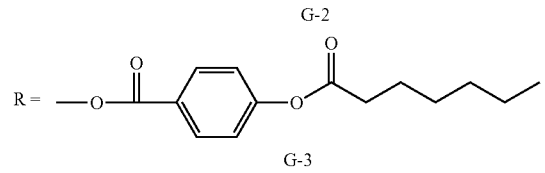
G-3

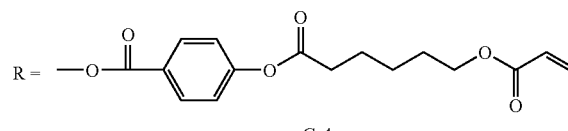
G-4

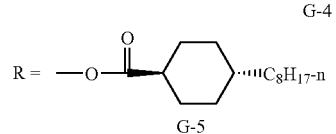
G-5

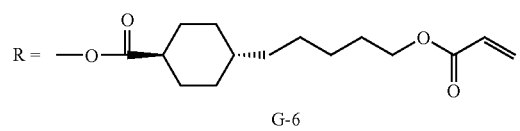
G-6

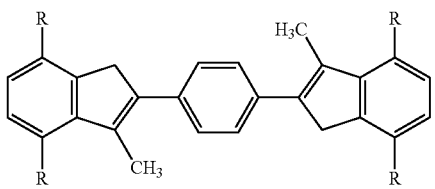

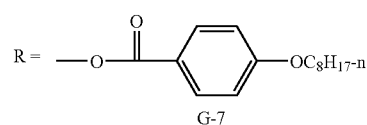
G-7

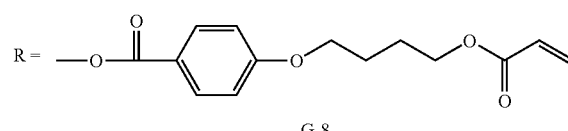
G-8

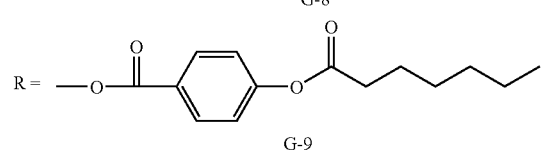
G-9

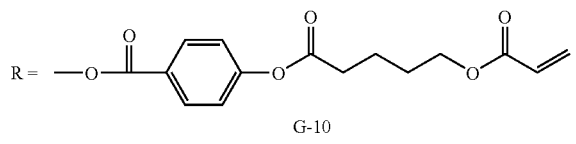
G-10
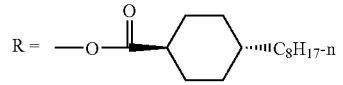
G-11
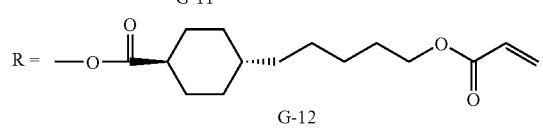
G-12
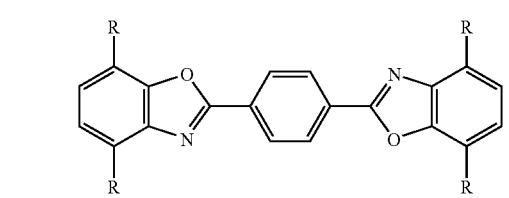
G-13
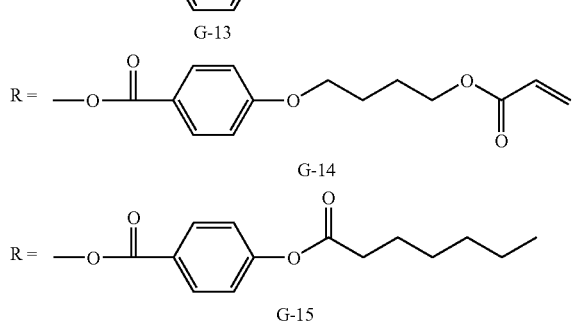
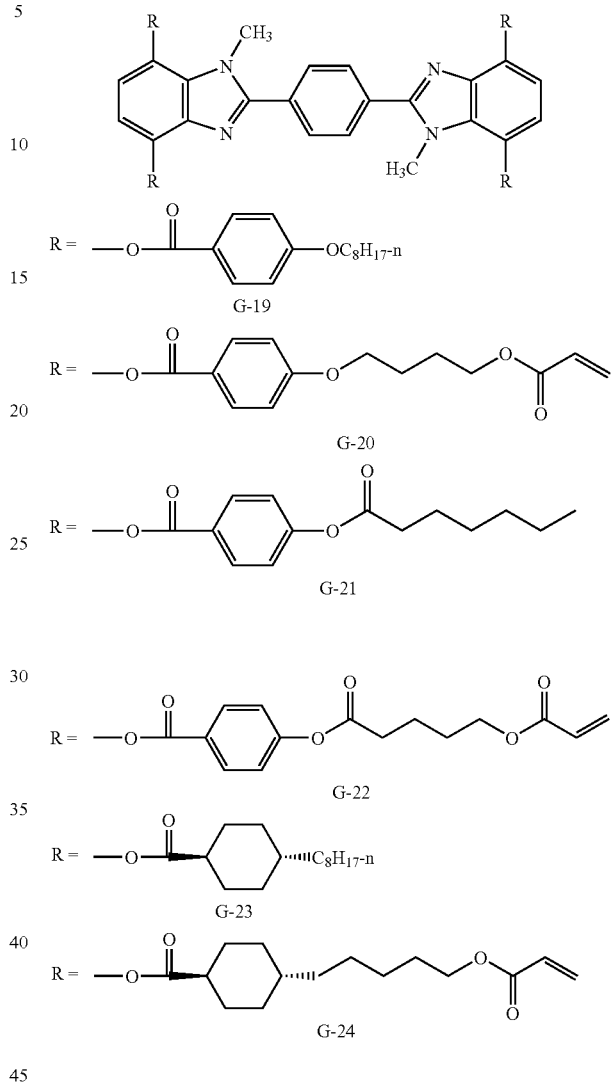
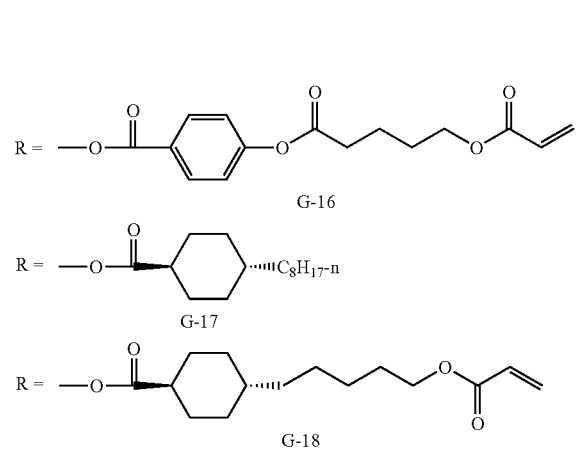
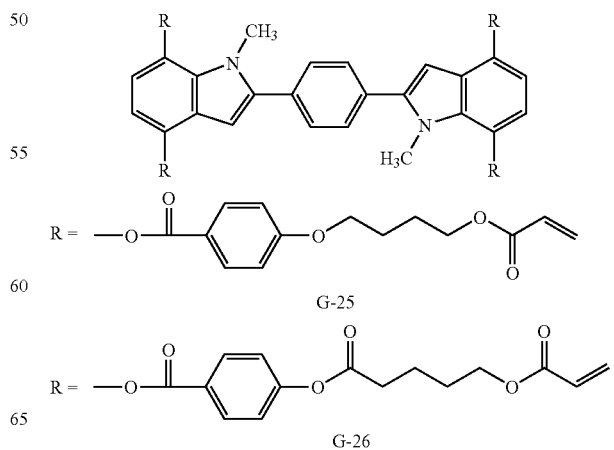

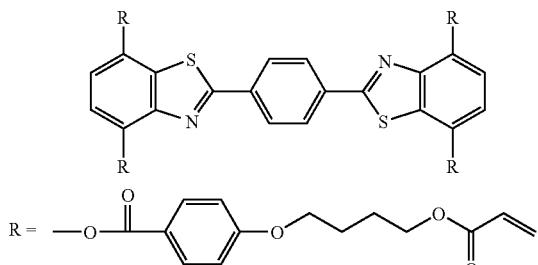
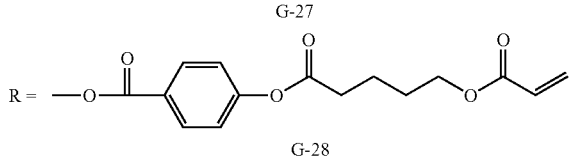
G-27
G-28
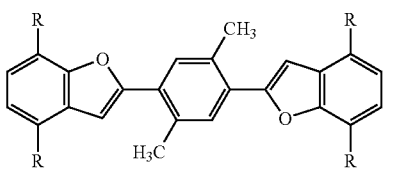
G-33
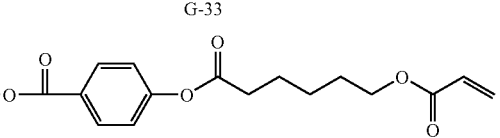
G-34
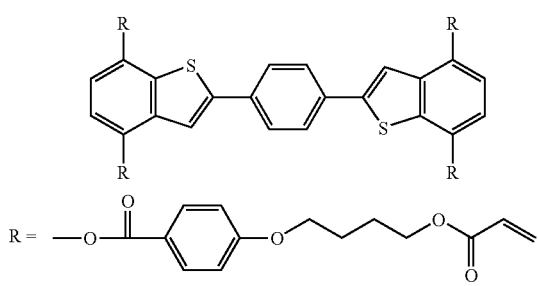
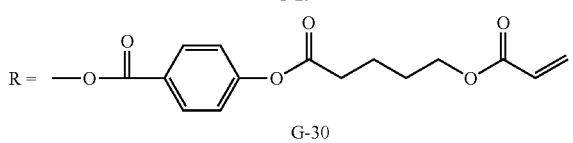
G-29
G-30
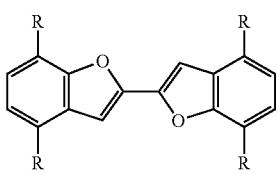
G-35
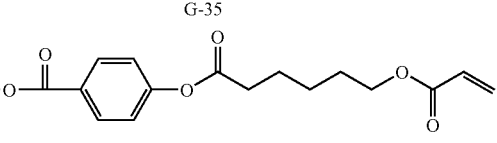
G-36
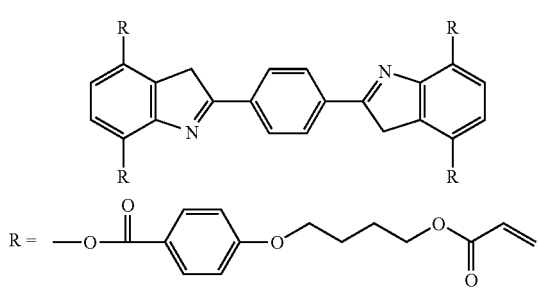
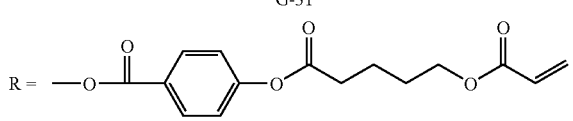
G-31
G-32
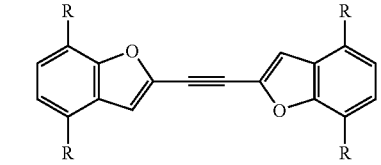
G-37
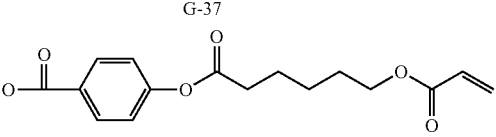
G-38

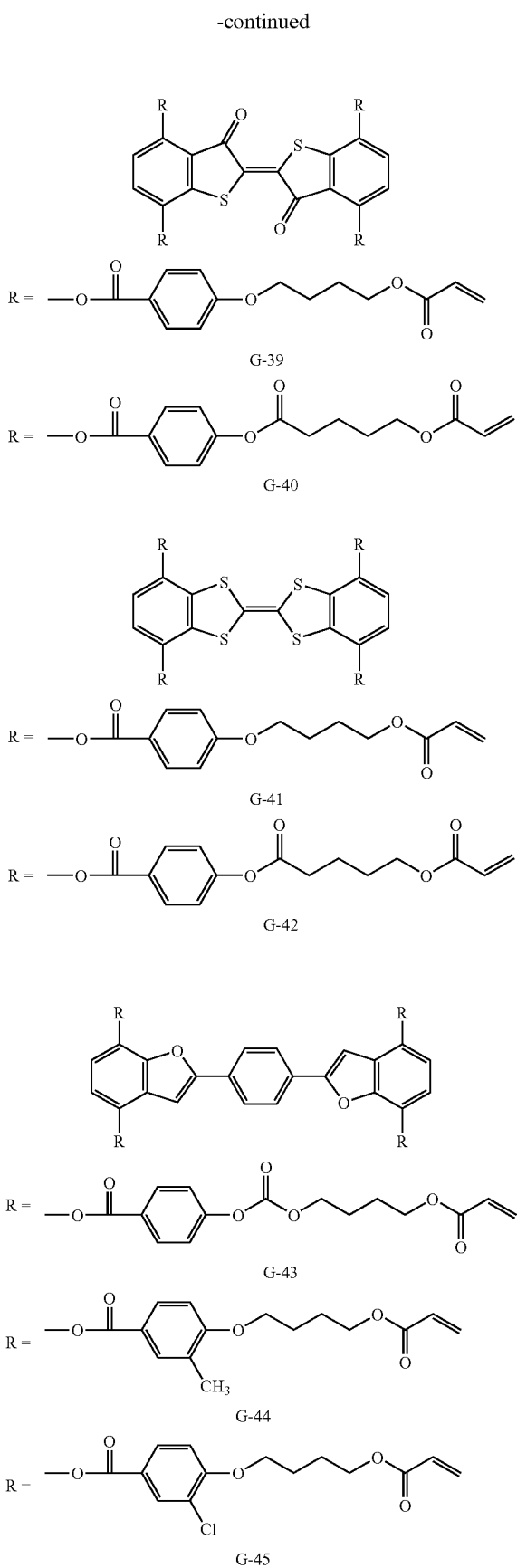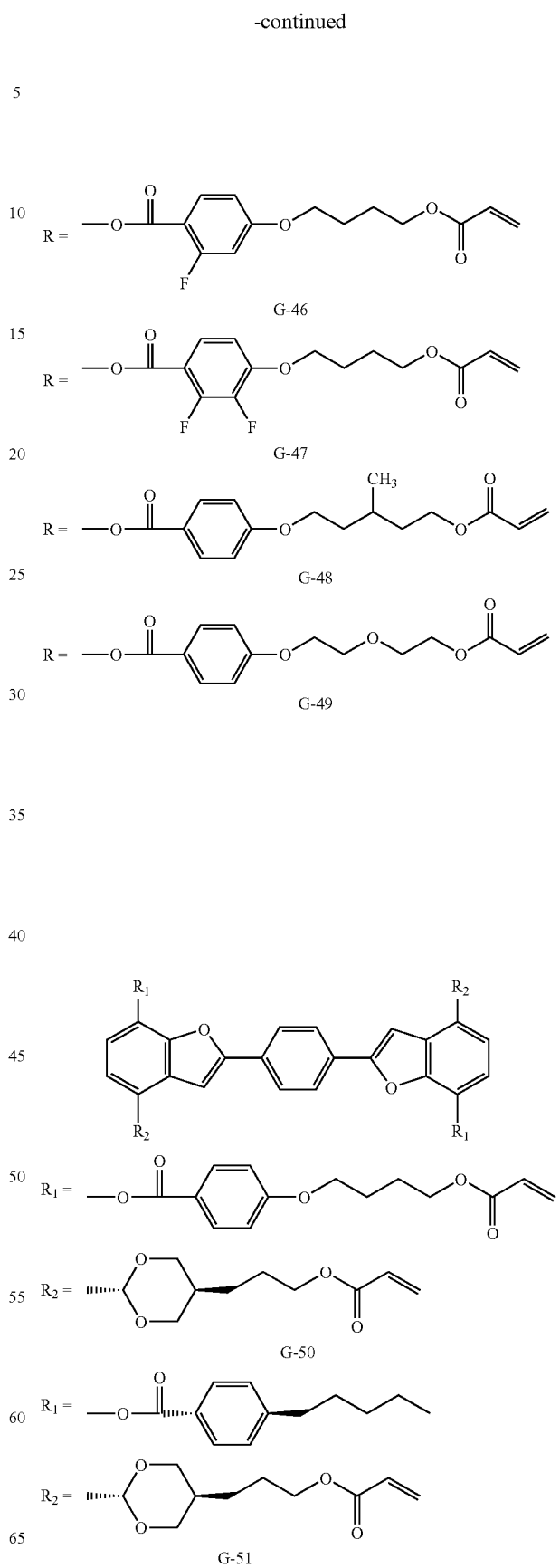

-continued

G-52, G-53, G-54, G-55, G-56, G-57, G-58, G-59, G-60, G-61, G-62

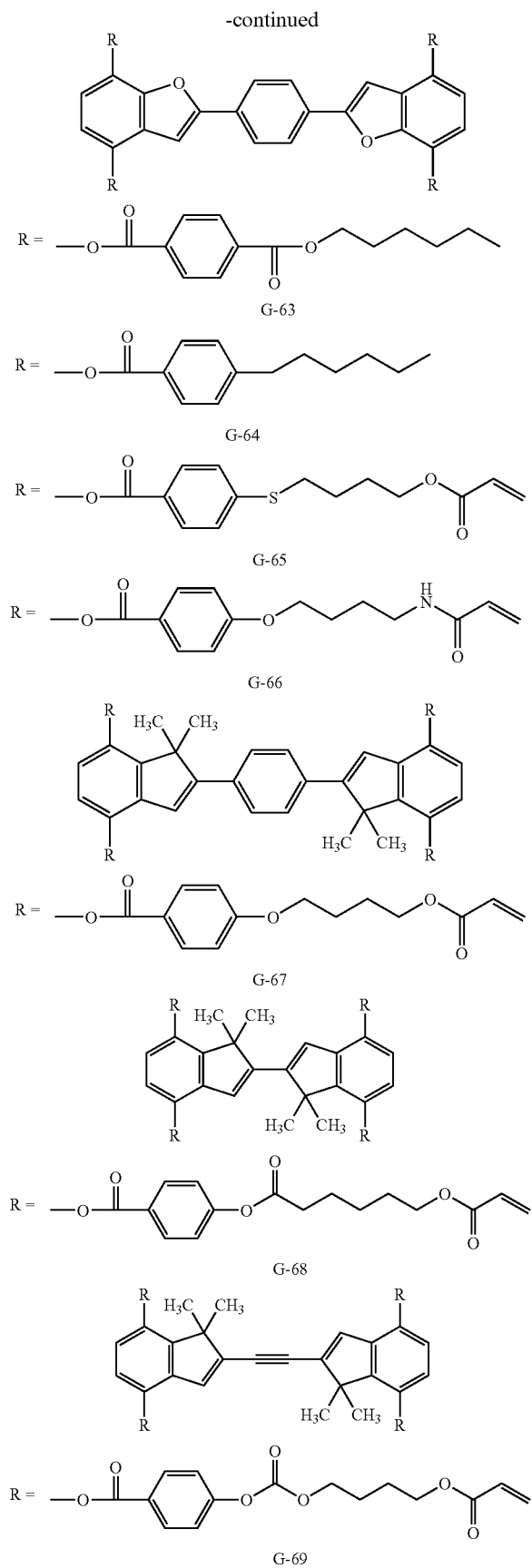

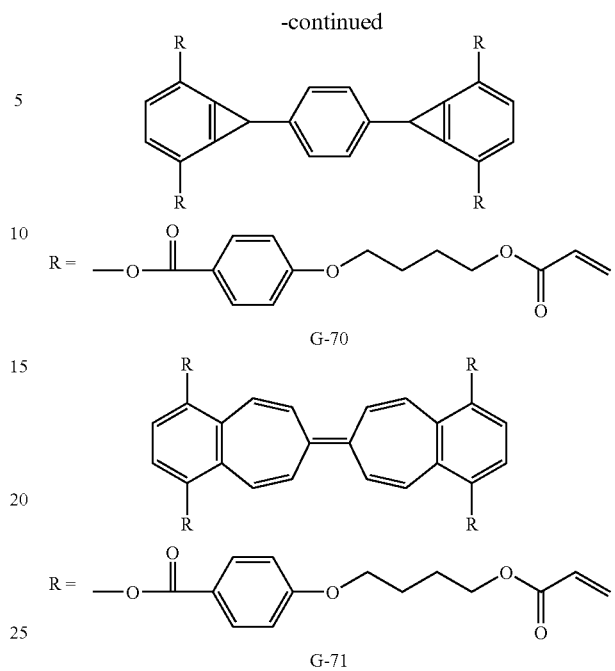

The wavelength dispersibilities of the liquid crystal compounds in the invention are hardly dependent upon temperature if the liquid crystal phase is the same, but for clarifying the invention, the value satisfying the following formula (II) is regarded as a value measured at temperature lower than the least upper bound of the temperature where a phase changes by 20° C. Further, the value is regarded as a value measured at temperature lower than the least upper bound of the temperature of a liquid crystal phase by 10° C. in the case of the range of liquid crystal temperature being 20° C. or less, a value measured at temperature lower than the least upper bound of the temperature of a liquid crystal phase by 5° C. in the case of the range of liquid crystal temperature being 10° C. or less, and a value measured at temperature lower than the least upper bound by 2° C. in the case of the range of liquid crystal temperature being 5° C. or less.

$$\Delta n(450\ nm)/\Delta n(550\ nm)<1.0 \tag{II}$$

The preferred range of the wavelength dispersibility of Δn differs according to the use of the liquid crystal compound, so that the range cannot be limited unconditionally, but as the more preferred range of the wavelength dispersibility of Δn, it is preferred to satisfy the following equations (II)-1 and (II)-2.

$$0.60<\Delta n(450\ nm)/\Delta n(550\ nm)<0.99 \tag{II-1}$$

$$1.01<\Delta n(650\ nm)/\Delta n(550\ nm)<1.35 \tag{II-2}$$

In the equations, Δn (450), Δn (550) and Δn (650) represent Δn at 450 nm, 550 nm and 650 nm respectively, provided that each measured wavelength contains errors within ±10 nm.

It is preferred for the liquid crystal compound in the invention to have a polymerizable group, and it is more preferred to have a polymerizable group at the terminal of the molecule of the compound. To have polymerizable group is preferred for the reason that the fluctuation of a phase difference due to heat can be prevented when used in a retardation plate.

As measuring method of Δn of liquid crystal, a method of using a wedge type liquid crystal cell as described, e.g., in *Ekisho Binran* (*Liquid Crystal Handbook*), 2.4.13, Maruzen Co., Ltd. (2000) can be exemplified. In the method, Δn of each wavelength is found by using three kinds of band pass filters of 450 nm, 550 nm and 650 nm. When a liquid crystal compound has a polymerizable group, there are cases where polymerization reaction occurs in a wedge type liquid crystal cell, so that measurement is difficult. In such a case, it is preferred to add a polymerization inhibitor to the liquid crystal compound before measurement. Further, Δn can be found (according to the equation of Δn=Re/d (d is a film thickness)), in the state that a liquid crystal is uniformly orientated, by finding Re (i.e., retardation value) at each wavelength and separately measuring a film thickness with an apparatus capable of measuring a phase difference such as KOBRA (manufactured by Oji Scientific Instruments).

<Liquid Crystal Composition D Exhibiting a Liquid Crystal Phase Having a Negative Birefringence Property>

As a liquid crystal phase having a negative birefringence property, e.g., a discotic nematic phase, a columnar phase and a columnar lamella phase exhibited by liquid crystal compounds having a disc-like shape can be exemplified. In the invention, as a liquid crystal phase having a negative birefringence property, a discotic nematic phase is especially preferred.

On the other hand, such liquid crystal phases are known that are difficult to judge whether they are uniaxial liquid crystal phases or biaxial liquid crystal phases. For example, the liquid crystal phases described in D. Demus and J. Goodby, *Handbook of Liquid Crystals*, Vol. 2B, "Low Molecular Weight Liquid Crystals II", pp. 933-943, WILEY-VCH, can be said to be liquid crystal phases that are difficult to be judged. Such liquid crystal phases that are difficult to be judged whether they are uniaxial liquid crystal phases or biaxial liquid crystal phases are also included in liquid crystal phases having a negative birefringence property.

The liquid crystal compounds for use in liquid crystal D exhibiting a liquid crystal phase having a negative birefringence property may be low molecular weight liquid crystal compounds or may be high molecular weight liquid crystal compounds, but low molecular weight liquid crystal compounds are preferred in the point of the compatibility of liquid crystal D with liquid crystal R.

Liquid crystal D exhibiting a liquid crystal phase having a negative birefringence property for use in the invention are described in various literatures, e.g., C. Destrade et al., *Mol. Crys. Liq. Crys.*, Vol. 71, p. 111 (1981), compiled by Nippon Kagaku-kai, *Kikan Kagaku Sosetsu* (*Quarterly Elements of Chemistry*), No. 22, "Ekisho no Kagaku (Chemistry of Liquid Crystals)", Chapters 5, 10, Clause 2 (1994), B. Kohne et al., *Angew. Chem. Soc. Chem. Comm.*, p. 1794 (1985), and J. Zhanget et al., *J. Am. Chem. Soc.*, Vol. 116, p. 2655 (1994).

It is preferred for the liquid crystal compound for use in liquid crystal D exhibiting a liquid crystal phase having a negative birefringence property to have a polymerizable group, and it is more preferred to have a polymerizable group at the terminal of the molecule of the compound. To have a polymerizable group is preferred for the reasons that the fluctuation of a phase difference due to heat can be prevented when used as the liquid crystal composition of the invention in a retardation plate, and, as described above, the phase separation from liquid crystal R can be prevented as well. Liquid crystal D is preferably a compound represented by the following formula (D):

In formula (D), D represents a disc-like core, L represents a divalent linking group, Q represents a polymerizable group, and n represents an integer of from 3 to 12. The examples of the disc-like cores (D) represented by the above formula are shown below. In the following examples, LQ (or QL) means a combination of a divalent linking group (L) and a polymerizable group (Q). The specific examples (D1) to (D16) of formula (D) are shown below.

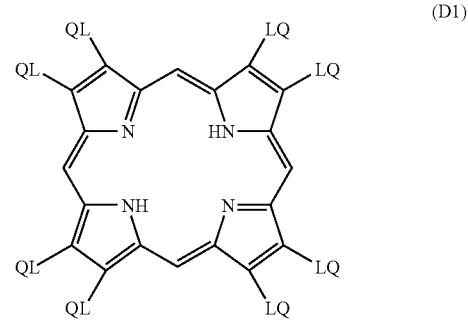

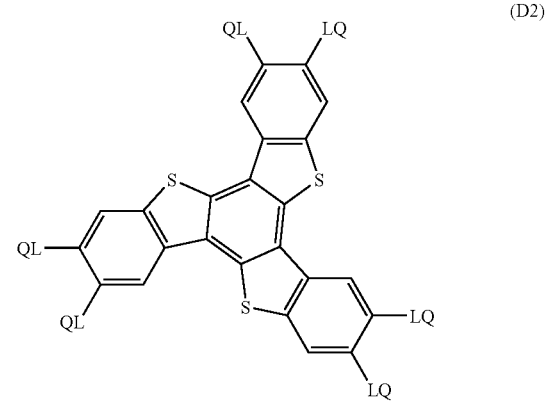

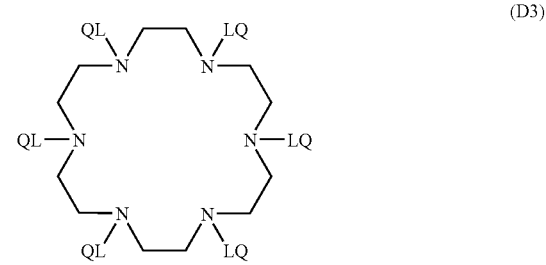

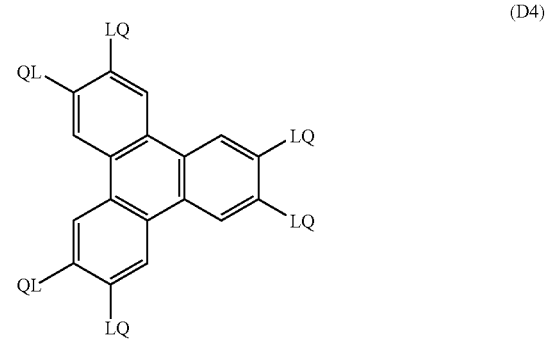

-continued
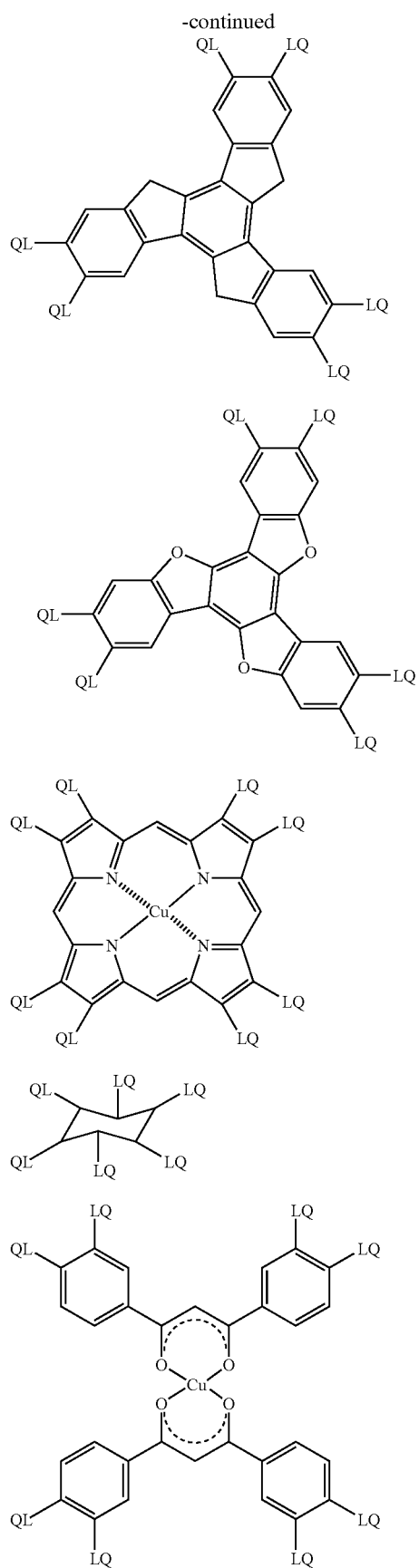
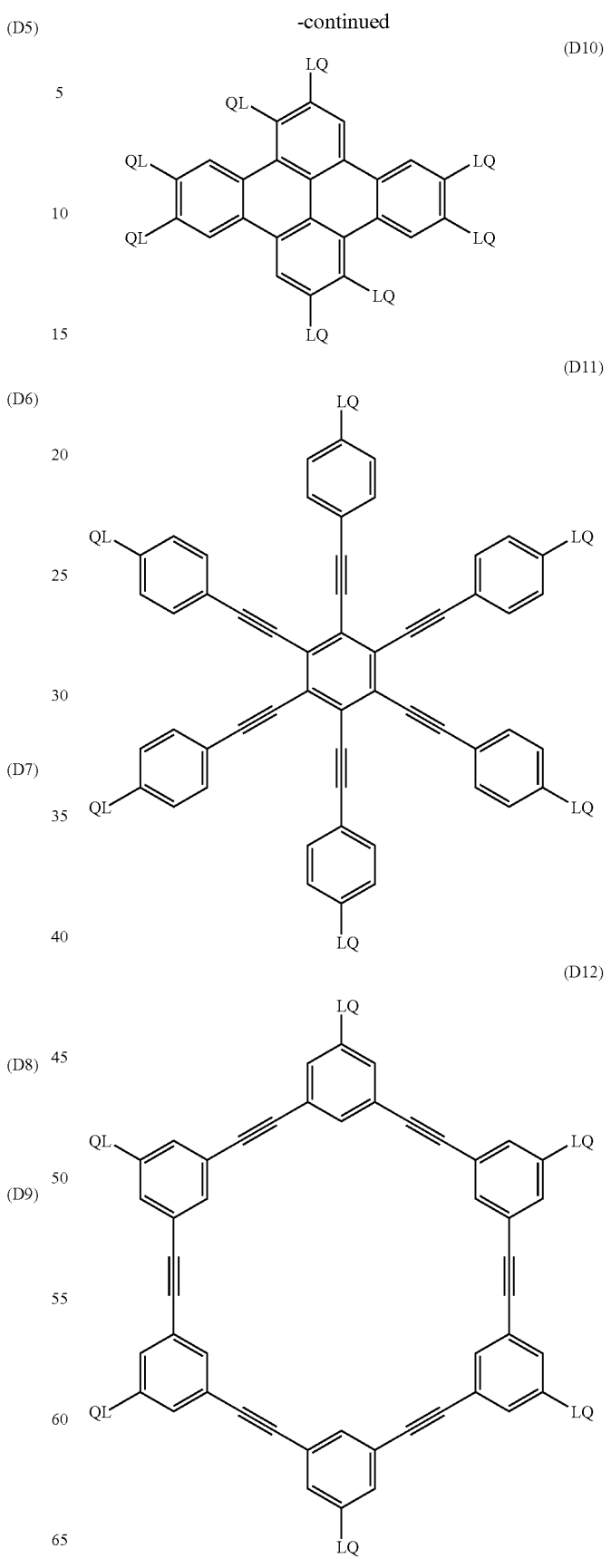

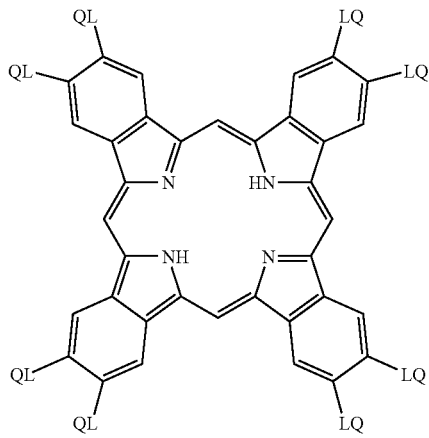

(D13)

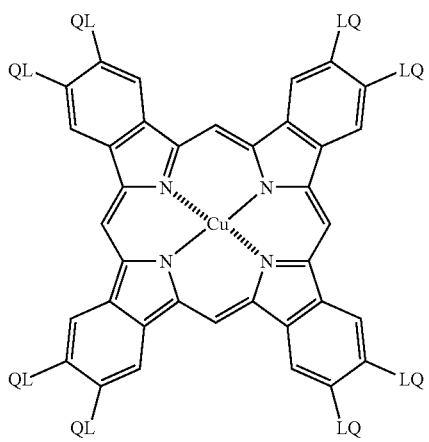

(D14)

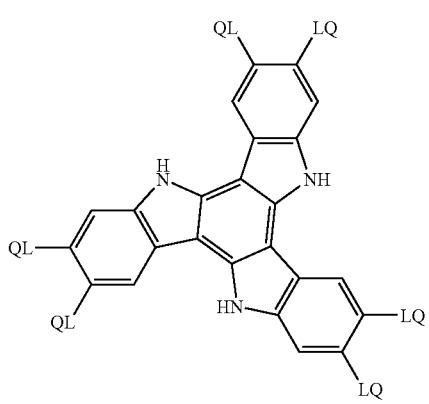

(D15)

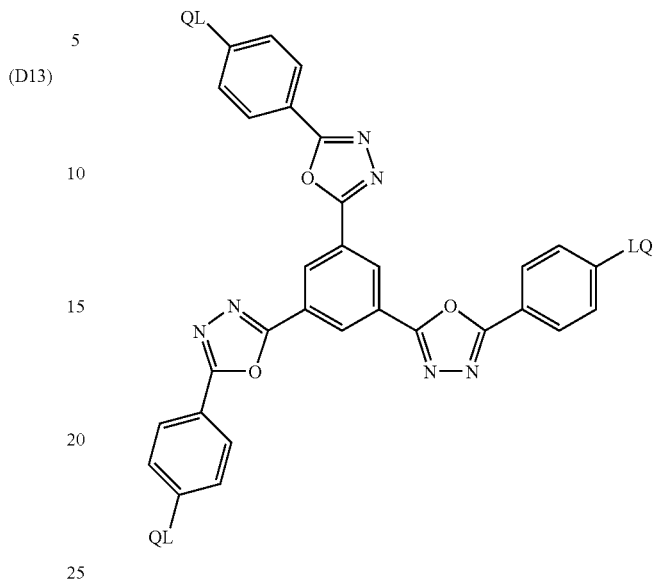

(D16)

L in formula (D) is preferably a divalent linking group selected from the group consisting of an alkylene group, an alkenylene group, an arylene group, —C(=O)—, —NH—, —O—, —S— and a combination of these groups. L is more preferably a group comprising the combination of at least two divalent groups selected from the group consisting of an alkylene group, an alkenylene group, an arylene group, —C(=O)—, —NH—, —O— and —S—. L is most preferably a group comprising the combination of at least two divalent groups selected from the group consisting of an alkylene group, an alkenylene group, an arylene group, —C(=O)— and —O—. The carbon atom number of the alkylene group is preferably from 1 to 12. The carbon atom number of the alkenylene group is preferably from 2 to 12. The carbon atom number of the arylene group is preferably from 6 to 10. These alkylene, alkenylene and arylene groups may each have a substituent (e.g., an alkyl group, a halogen atom, a cyano group, an alkoxyl group, an acyloxy group).

The examples of divalent linking groups (L) are shown below. In each of the following formulae, the left side is bonded to a disc-like core (D) and the right side is bonded to a polymerizable group (Q). AL means an alkylene group or an alkenylene group and AR means an arylene group.

L1: -AL-C(=O)—O-AL-

L2: -AL-C(=O)—O-AL-O—

L3: -AL-C(=O)—O-AL-O-AL-

L4: -AL-C(=O)—O-AL-O—C(=O)—

L5: —C(=O)-AR-O-AL-

L6: —C(=O)-AR-O-AL-O—

L7: —C(=O)-AR-O-AL-O—C(=O)—

L8: —C(=O)—NH-AL-

L9: —NH-AL-O—

L10: —NH-AL-O—C(=O)—

L11: —O-AL-

L12: —O-AL-O—

L13: —O-AL-O—C(=O)—

L14: —O-AL-O—C(=O)—NH-AL-

L15: —O-AL-S-AL-

L16: —O—C(=O)-AL-AR-O-AL-O—C(=O)—

L17: —O—C(=O)-AR-O-AL-C(=O)—

L18: —O—C(=O)-AR-O-AL-O—C(=O)—

L19: —O—C(=O)-AR-O-AL-O-AL-O—C(=O)—

L20: —O—C(=O)-AR-O-AL-O-AL-O-AL-O—C(=O)—

L21: —S-AL-

L22: —S-AL-O—

L23: —S-AL-O—C(=O)—

L24: —S-AL-S-AL-

L25: —S-AR-AL-

A polymerizable group (Q) in formula (D) is not especially restricted. When the liquid crystal composition in the invention is polymerized, the polymerizable group can be determined according to the kind of polymerization reaction.

The specific examples of preferred polymerizable groups (Q) are the same as the examples in the liquid crystal R exhibiting a liquid crystal phase having a positive birefringence property, and the examples of more preferred polymerizable groups (Q) are also the same as in the liquid crystal R exhibiting a liquid crystal phase having a positive birefringence property In formula (D), n represents an integer of from 3 to 12. A specific numeral is determined according to the kind of disc-like core (D). n is especially preferably an integer of from 3 to 6, and most preferably 3. A plurality of L and Q in combination may be different, but preferably the same.

As a compound having a disc-like shape, two or more kinds of discotic liquid crystal compounds may be used in combination. For example, a molecule having a polymerizable group (Q) and a molecule not having (Q) may be used in combination.

A non-polymerizable discotic liquid crystal compound is preferably a compound obtained by replacing the polymerizable group (Q) in the above polymerizable discotic liquid crystal compound with a hydrogen atom or an alkyl group. That is, a non-polymerizable discotic liquid crystal compound is preferably a compound represented by the following formula:

D(-L-R)$_n$

In the formula, D represents a disc-like core, L represents a divalent linking group, R represents a hydrogen atom or an alkyl group, and n represents an integer of from 3 to 12. The examples of the disc-like cores (D) are the same as the examples of the above polymerizable discotic liquid crystal compounds, except for changing LQ (or QL) to LR (or RL). The examples of the divalent linking groups (L) are also the same as the examples of the above polymerizable discotic liquid crystal compounds. The alkyl group represented by R is preferably an alkyl group having from 1 to 40 carbon atoms, and more preferably from 1 to 30. Chain alkyl groups are preferred to cyclic alkyl groups, and straight chain alkyl groups are preferred to branched chain alkyl groups. R is especially preferably a hydrogen atom or a straight chain alkyl group having from 1 to 30 carbon atoms.

The liquid crystal compound for use in liquid crystal D exhibiting a liquid crystal phase having a negative birefringence property is more preferably a compound represented by the following formula (D-2):

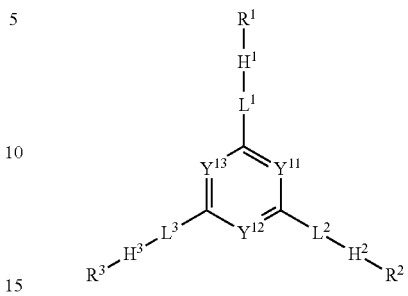

In formula (D-2), $Y^{11}$, $Y^{12}$ and $Y^{13}$ each represents methine or a nitrogen atom.

When $Y^{11}$, $Y^{12}$ and $Y^{13}$ each represents methine, the methine may have a substituent. The examples of the substituents include an alkyl group (e.g., a methyl group, an ethyl group, an isopropyl group, a tert-butyl group are exemplified), an alkenyl group (e.g., a vinyl group, an allyl group, a 2-butenyl group, a 3-pentenyl group, etc., are exemplified), an alkynyl group (e.g., a propargyl group, a 3-pentynyl group, etc., are exemplified), an aryl group (e.g., a phenyl group, a p-methylphenyl group, a naphthyl group, etc., are exemplified), a substituted or unsubstituted amino group (e.g., an unsubstituted amino group, a methylamino group, a dimethylamino group, a diethylamino group, an anilino group, etc., are exemplified), an alkoxyl group (e.g., a methoxy group, an ethoxy group, a butoxy group, etc., are exemplified), an aryloxy group (e.g., a phenyloxy group, a 2-naphthyloxy group, etc., are exemplified), an acyl group (e.g., an acetyl group, a benzoyl group, a formyl group, a pivaloyl group, etc., are exemplified), an alkoxycarbonyl group (e.g., a methoxy-carbonyl group, an ethoxycarbonyl group, etc., are exemplified), an aryloxycarbonyl group (e.g., a phenyloxy-carbonyl group, etc., are exemplified), an acyloxy group (e.g., an acetoxy group, a benzoyloxy group, etc., are exemplified), an acylamino group (e.g., an acetylamino group, a benzoylamino group, etc., are exemplified), an alkoxycarbonylamino group (e.g., a methoxycarbonylamino group, etc., are exemplified), an aryloxycarbonylamino group (e.g., a phenyloxycarbonylamino group, etc., are exemplified), an alkylsulfonylamino group (e.g., a methanesulfonylamino group, etc., are exemplified), an arylsulfonylamino group (e.g., a benzenesulfonylamino group, etc., are exemplified), a sulfamoyl group (e.g., a sulfamoyl group, an N-methylsulfamoyl group, an N,N-dimethyl-sulfamoyl group, an N-phenylsulfamoyl group, etc., are exemplified), a carbamoyl group (e.g., an unsubstituted carbamoyl group, an N-methylcarbamoyl group, an N,N-diethyl-carbamoyl group, an N-phenylcarbamoyl group, etc., are exemplified), an alkylthio group (e.g., a methylthio group, an ethylthio group, etc., are exemplified), an arylthio group (e.g., a phenylthio group, etc., are exemplified), an alkyl-sulfonyl group (e.g., a mesyl group, etc., are exemplified), an arylsulfonyl group (e.g., a tosyl group, etc., are exemplified), an alkylsulfinyl group (e.g., a methanesulfinyl group, etc., are exemplified), an arylsulfinyl group (e.g., a benzenesulfinyl group, etc., are exemplified), a ureido group (e.g., an unsubstituted ureido group, a 3-methylureido group, a 3-phenylureido group, etc., are exemplified), a phosphoric acid amide group (e.g., a diethylphosphoric acid amide group, a phenylphosphoric acid amide group, etc., are exemplified), a hydroxyl group, a mercapto group, a halogen atom (e.g., a fluorine atom, a chlorine atom, a bromine atom, an iodine atom are exemplified), a cyano group, a sulfo group, a carboxyl group, a nitro group, a hydroxamic acid group, a sulfino group, a hydrazino group, an imino group, a heterocyclic group (e.g., a heterocyclic group having a hetero atom, such as a nitrogen atom, an oxygen atom, a sulfur atom, etc., e.g., an imidazolyl group, a pyridyl group, a quinolyl group, a furyl group, a piperidyl group, a morpholino group, a benzoxazolyl group, a benzimidazolyl group, a benzothiazolyl group, etc., are exemplified), and a silyl group (e.g., a trimethylsilyl group, a triphenylsilyl group, etc., are exemplified). These substituents may further be substituted with these substituents.

Of these substituents, as the substituents of the methine, an alkyl group, an alkoxyl group, an aryloxy group, an acyl group, an alkoxycarbonyl group, an acyloxy group, an acylamino group, an alkoxycarbonylamino group, an alkylthio group, an arylthio group, a halogen atom and a cyano group are preferred, an alkyl group, an alkoxyl group, an alkoxycarbonyl group, an acyloxy group, a halogen atom and a cyano group are more preferred, and an alkyl group having from 1 to 12 carbon atoms, an alkoxyl group having from 1 to 12 carbon atoms, an alkoxycarbonyl group having from 2 to 12 carbon atoms, an acyloxy group having from 2 to 12 carbon atoms, a halogen atom and a cyano group are most preferred.

It is most preferred that all of $Y^{11}$, $Y^{12}$ and $Y^{13}$ represent methine, and the methine is most preferably unsubstituted methine.

In formula (D-2), $L^1$, $L^2$ and $L^3$ each represents a single bond or a divalent linking group. When $L^1$, $L^2$ and $L^3$ represent a divalent linking group, each divalent linking group is preferably selected from the group consisting of —O—, —S—, —C(=O)—, —NR$^7$—, —CH=CH—, —C≡C—, a divalent cyclic group, and a combination thereof. R$^7$ represents an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom.

The divalent cyclic group represented by $L^1$, $L^2$ and $L^3$ is a divalent linking group having at least one cyclic structure. The ring in the divalent cyclic group is preferably a 5-, 6- or 7-membered ring, more preferably a 5- or 6-membered ring, and most preferably a 6-membered ring. The ring contained in the cyclic group may be a condensed ring. However, a monocyclic ring is preferred to a condensed ring. The ring contained in the cyclic group may be any of an aromatic ring, an aliphatic ring, and a heterocyclic ring. The examples of the aromatic rings include a benzene ring and a naphthalene ring. The examples of the aliphatic rings include a cyclohexane ring. The examples of the heterocyclic rings include a pyridine ring and a pyrimidine ring. The cyclic groups are preferably an aromatic ring group and a heterocyclic ring group.

Of the divalent cyclic groups represented by $L^1$, $L^2$ and $L^3$, as the cyclic group having a benzene ring, 1,4-phenylene is preferred. As the cyclic groups having a naphthalene ring, naphthalene-1,5-diyl and naphthalene-2,6-diyl are preferred. As the cyclic group having a cyclohexane ring, 1,4-cyclohexylene is preferred. As the cyclic group having a pyridine ring, pyridine-2,5-diyl is preferred. As the cyclic group having a pyrimidine ring, pyrimidine-2,5-diyl is preferred.

The divalent cyclic groups represented by $L^1$, $L^2$ and $L^3$ may have a substituent. The examples of the substituents include a halogen atom, a cyano group, a nitro group, an alkyl group having from 1 to 16 carbon atoms, a halogen-substituted alkyl group having 1 to 16 carbon atoms, an alkoxyl group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl-substituted carbamoyl group having from 2 to 16 carbon atoms, and an acylamino group having from 2 to 16 carbon atoms.

$L^1$, $L^2$ and $L^3$ each preferably represents a single bond, *—O—CO—, *—CO—O—, *—CH=CH—, *—C≡C—, *-divalent cyclic group-, *—O—CO-divalent cyclic group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH—, or *-divalent cyclic group-C≡C—. $L^1$, $L^2$ and $L^3$ especially preferably represent a single bond, *—CH=CH—, *—C≡C—, *—CH=CH-divalent cyclic group-, or *—C≡C-divalent cyclic group-, where * represents the position to be bonded to the 6-membered ring containing $Y^{11}$, $Y^{12}$ and $Y^{13}$ in formula (D-2).

$H^1$, $H^2$ and $H^3$ each represents a divalent 5-membered cyclic group.

As the divalent 5-membered cyclic group, a hetero ring is preferred. As the hetero atoms, e.g., an oxygen atom, a nitrogen atom, a sulfur atom, a boron atom and a phosphorus atom can be exemplified. An oxygen atom, a nitrogen atom, and a sulfur atom are especially preferred, and hetero rings containing a nitrogen atom and an oxygen atom are particularly preferred.

It is preferred for the divalent 5-membered cyclic group to have at least one methine, and more preferred to have two methines. It is especially preferred that the hydrogen atom of the methine is replaced with $L^1$, $L^2$, $L^3$ or $R^1$, $R^2$, $R^3$.

As the examples of the divalent 5-membered cyclic groups, thiophene-2,5-diyl, furan-2,5-diyl, oxazole-2,5-diyl, imidazole-2,5-diyl, 1,3,4-oxadiazole-2,5-aryl, and tetrahydrofuran-2,4-diyl can be exemplified.

The divalent 5-membered cyclic group may have a substituent. As the substituents, the same substituents as described in $Y^{11}$, $Y^{12}$ and $Y^{13}$ can be exemplified.

In formula (D-2), $R^1$, $R^2$ and $R^3$ each represents an alkyl group (e.g., a methyl group, an ethyl group, an isopropyl group, a tert-butyl group are exemplified), an alkenyl group (e.g., a vinyl group, an allyl group, a 2-butenyl group, a 3-pentenyl group, etc., are exemplified), an alkynyl group (e.g., a propargyl group, a 3-pentynyl group, etc., are exemplified), an aryl group (e.g., a phenyl group, a p-methylphenyl group, a naphthyl group, etc., are exemplified), a substituted or unsubstituted amino group (e.g., an unsubstituted amino group, a methylamino group, a dimethylamino group, a diethylamino group, an anilino group, etc., are exemplified), an alkoxyl group (e.g., a methoxy group, an ethoxy group, a butoxy group, etc., are exemplified), an aryloxy group (e.g., a phenyloxy group, a 2-naphthyloxy group, etc., are exemplified), an acyl group (e.g., an acetyl group, a benzoyl group, a formyl group, a pivaloyl group, etc., are exemplified), an alkoxycarbonyl group (e.g., a methoxycarbonyl group, an ethoxycarbonyl group, etc., are exemplified), an aryloxycarbonyl group (e.g., a phenyloxycarbonyl group, etc., are exemplified), an acyloxy group (e.g., an acetoxy group, a benzoyloxy group, etc., are exemplified), an acylamino group (e.g., an acetylamino group, a benzoylamino group, etc., are exemplified), an alkoxy-carbonylamino group (e.g., a methoxycarbonylamino group, etc., are exemplified), an aryloxycarbonylamino group (e.g., a phenyloxycarbonylamino group, etc., are exemplified), an alkylsulfonylamino group (e.g., a methanesulfonylamino group, etc., are exemplified), an arylsulfonylamino group (e.g., a benzenesulfonylamino group, etc., are exemplified), a sulfamoyl group (e.g., a sulfamoyl group, an N-methylsulfamoyl group, an N,N-dimethylsulfamoyl group, an N-phenylsulfamoyl group, etc., are exemplified), a carbamoyl group (e.g., an unsubstituted carbamoyl group, an N-methylcarbamoyl group, an N,N-diethylcarbamoyl group, an N-phenylcarbamoyl group, etc., are exemplified), an alkylthio group (e.g., a methylthio group, an ethylthio group, etc., are exemplified), an arylthio group (e.g., a phenylthio group, etc., are exemplified), an alkyl-sulfonyl group (e.g., a mesyl group, etc., are exemplified), an arylsulfonyl group (e.g., a tosyl group, etc., are exemplified), an alkylsulfinyl group (e.g., a methanesulfinyl group, etc., are exemplified), an arylsulfinyl group (e.g., a benzenesulfinyl group, etc., are exemplified), a ureido group (e.g., an unsubstituted ureido group, a 3-methylureido group, a 3-phenylureido group, etc., are exemplified), a phosphoric acid amide group (e.g., a diethylphosphoric acid amide group, a phenylphosphoric acid amide group, etc., are exemplified), a hydroxyl group, a mercapto group, a halogen atom (e.g., a fluorine atom, a chlorine atom, a bromine atom, an iodine atom are exemplified), a cyano group, a sulfo group, a carboxyl group, a nitro group, a hydroxamic acid group, a sulfino group, a hydrazino group, an imino group, a heterocyclic group (e.g., a heterocyclic group having a hetero atom, such as a nitrogen atom, an oxygen atom, a sulfur atom, etc., e.g., an imidazolyl group, a pyridyl group, a quinolyl group, a furyl group, a piperidyl group, a morpholino group, a benzoxazolyl group, a benzimidazolyl group, a benzothiazolyl group, etc., are exemplified), or a silyl group (e.g., a trimethylsilyl group, a triphenylsilyl group, etc., are exemplified). These substituents may further be substituted with these substituents.

$R^1$, $R^2$ and $R^3$ are each more preferably represented by the following formula (III):

*-$L^{11}$-Q

In formula (III), * represents the position bonding to $H^1$, $H^2$ or $H^3$ in formula (D-2).

Q represents a polymerizable group or a methyl group. Including the retardation plate of the invention, when a compound represented by formula (D-2) is used in an optical film that the size of a phase difference is preferably not fluctuated by heat such as an optically compensatory film, Q is preferably a polymerizable group. The polymerization reaction is preferably addition polymerization (including ring-opening polymerization) or condensation polymerization. In other words, the polymerizable group is preferably a functional group capable of addition polymerization reaction or condensation polymerization reaction. The examples of the polymerizable groups are shown below.

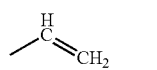
q1

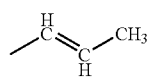
q2

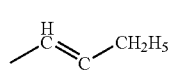
q3

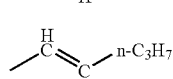
q4

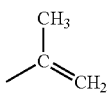
q5

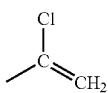
q6

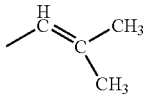
q7

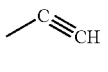
q8

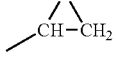
q9

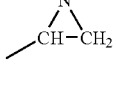
q10

q11

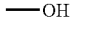
q12

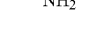
q13

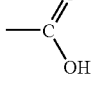
q14

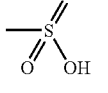
q15

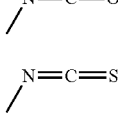
q16

q17

Of the above compounds, q1 to q10 are preferred, and q1 to q8 are more preferred.

The polymerizable group is especially preferably a functional group capable of addition polymerization reaction. As such a polymerizable group, a polymerizable ethylenic unsaturated group or a ring-opening polymerizable group is preferred.

As the examples of the polymerizable ethylenic unsaturated groups, the compounds represented by the following formulae (M-1) to (M-6) are exemplified.

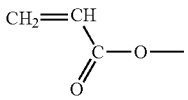
(M-1)

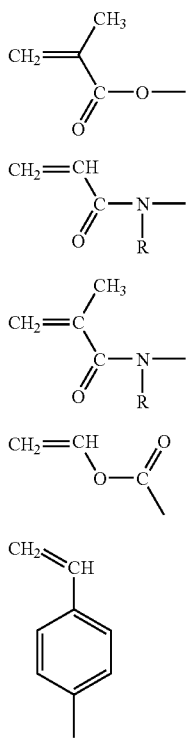

In formulae (M-3) and (M-4), R represents a hydrogen atom or an alkyl group, and preferably a hydrogen atom or a methyl group.

Of formulae (M-1) to (M-6), (M-1) or (M-2) is preferred, and (M-1) is most preferred.

Preferred groups as the ring-opening polymerizable groups are cyclic ether groups, more preferred groups are an epoxy group and an oxetanyl group, and an epoxy group is most preferred.

In formula (III), $L^{11}$ represents a divalent linking group. $L^{11}$ preferably represents a divalent linking group selected from the group consisting of —O—, —S—, —C(=O)—, —NR$^7$—, a divalent chain group, a divalent cyclic group, and a combination of these groups. $R^7$ represents an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom.

The divalent chain group represented by $L^{11}$ is an alkylene group, a substituted alkylene group, an alkenylene group, a substituted alkenylene group, an alkynylene group, or a substituted alkynylene group. Of these groups, an alkylene group, a substituted alkylene group, an alkenylene group, and a substituted alkenylene group are preferred, and an alkylene group and an alkenylene group are more preferred.

The alkylene group as the divalent chain group represented by $L^{11}$ may be branched. The carbon atom number of the alkylene group is preferably from 1 to 16, more preferably from 2 to 14, and most preferably from 2 to 12. The alkylene moiety of the substituted alkylene group is the same as the alkylene group described above. The examples of the substituents include a halogen atom.

The alkenylene group as the divalent chain group represented by $L^{11}$ may have a substituted or unsubstituted alkylene group in the main chain, or may be branched. The carbon atom number of the alkenylene group is preferably from 2 to 16, more preferably from 2 to 14, and most preferably from 2 to 12. The alkenylene moiety of the substituted alkenylene group is the same as the alkenylene group described above. The examples of the substituents include a halogen atom.

The alkynylene group as the divalent chain group represented by $L^{11}$ may have a substituted or unsubstituted alkylene group in the main chain. The carbon atom number of the alkynylene group is preferably from 2 to 16, more preferably from 2 to 14, and most preferably from 2 to 12. The alkynylene moiety of the substituted alkynylene group is the same as the alkynylene group described above. The examples of the substituents include a halogen atom.

The specific examples of the divalent chain groups represented by $L^{11}$ include ethylene, trimethylene, tetramethylene, 1-methyl-1,4-butylene, pentamethylene, hexamethylene, octamethylene, nonamethylene, decamethylene, undecamethylene, dodecamethylene, 2-butenylene and 2-butynylene.

The divalent cyclic group represented by $L^{11}$ is a divalent linking group having at least one cyclic structure. The divalent cyclic group is preferably a 5-, 6- or 7-membered ring, more preferably a 5- or 6-membered ring, and most preferably a 6-membered ring. The ring contained in the cyclic group may be a condensed ring. However, a monocyclic ring is preferred to a condensed ring. The ring contained in the cyclic group may be any of an aromatic ring, an aliphatic ring, and a heterocyclic ring. The examples of the aromatic rings include a benzene ring and a naphthalene ring. The examples of the aliphatic rings include a cyclohexane ring. The examples of the heterocyclic rings include a pyridine ring and a pyrimidine ring.

Of the divalent cyclic groups represented by $L^{11}$, as the cyclic group having a benzene ring, 1,4-phenylene is preferred. As the cyclic groups having a naphthalene ring, naphthalene-1,5-diyl and naphthalene-2,6-diyl are preferred. As the cyclic group having a cyclohexane ring, 1,4-cyclohexylene is preferred. As the cyclic group having a pyridine ring, pyridine-2,5-diyl is preferred. As the cyclic group having a pyrimidine ring, pyrimidine-2,5-diyl is preferred.

The divalent cyclic groups represented by $L^{11}$ may have a substituent. The examples of the substituents include a halogen atom, a cyano group, a nitro group, an alkyl group having from 1 to 16 carbon atoms, a halogen-substituted alkyl group having 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl-substituted carbamoyl group having from 2 to 16 carbon atoms, and an acylamino group having from 2 to 16 carbon atoms.

$R^1$, $R^2$ and $R^3$ are each more preferably represented by the following formula (IV):

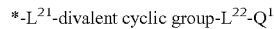

In formula (IV), * represents the position bonding to $H^1$, $H^2$ or $H^3$ in formula (D-2).

$Q^1$ has the same meaning as Q defined in formula (III).

$L^{21}$ represents a single bond or a divalent linking group. When $L^{21}$ represents a divalent linking group, the divalent linking group is preferably selected from the group consisting of —O—, —S—, —C(=O)—, —NR$^7$—, —CH=CH—, —C≡C—, and a combination of these groups. $R^7$ represents an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom.

$L^{21}$ preferably represents a single bond, *—O—CO—, *—CO—O—, *—CH=CH—, or *—C≡C— (where * represents * in formula (IV)).

The divalent cyclic group in formula (IV) is the same as the divalent cyclic group defined in formula (III).

$L^{22}$ in formula (IV) is the same as $L^{11}$ defined in formula (III).

The examples of the divalent linking groups represented by $L^{22}$ are shown below, where the right side is bonded to the divalent cyclic group in formula (IV), and the left side is bonded to $Q^1$.

L-1: -divalent chain group-O-divalent cyclic group-

L-2: -divalent chain group-O-divalent cyclic group-CO—O—

L-3: -divalent chain group-O-divalent cyclic group-O—CO—

L-4: -divalent chain group-O-divalent cyclic group-CO—$NR_7$—

L-5: -divalent chain group-O-divalent cyclic group-divalent chain group-

L-6: -divalent chain group-O-divalent cyclic group-divalent chain group-CO—O—

L-7: -divalent chain group-O-divalent cyclic group-divalent chain group-O—CO—

L-8: -divalent chain group-O—CO-divalent cyclic group-

L-9: -divalent chain group-O—CO-divalent cyclic group-CO—O—

L-10: -divalent chain group-O—CO-divalent cyclic group-O—CO—

L-11: -divalent chain group-O—CO-divalent cyclic group-CO—$NR_7$—

L-12: -divalent chain group-O—CO-divalent cyclic group-divalent chain group-

L-13: -divalent chain group-O—CO-divalent cyclic group-divalent chain group-CO—O—

L-14: -divalent chain group-O—CO-divalent cyclic group-divalent chain group-O—CO—

L-15: -divalent chain group-CO—O-divalent cyclic group-

L-16: -divalent chain group-CO—O-divalent cyclic group-CO—O—

L-17: -divalent chain group-CO—O-divalent cyclic group-O—CO—

L-18: -divalent chain group-CO—O-divalent cyclic group-CO—$NR_7$—

L-19: -divalent chain group-CO—O-divalent cyclic group-divalent chain group-

L-20: -divalent chain group-CO—O-divalent cyclic group-divalent chain group-CO—O—

L-21: -divalent chain group-CO—O-divalent cyclic group-divalent chain group-O—CO—

L-22: -divalent chain group-O—CO—O-divalent cyclic group-

L-23: -divalent chain group-O—CO—O-divalent cyclic group-CO—O—

L-24: -divalent chain group-O—CO—O-divalent cyclic group-O—CO—

L-25: -divalent chain group-O—CO—O-divalent cyclic group-CO—$NR_7$—

L-26: -divalent chain group-O—CO—O-divalent cyclic group-divalent chain group-

L-27: -divalent chain group-O—CO—O-divalent cyclic group-divalent chain group-CO—O—

L-28: -divalent chain group-O—CO—O-divalent cyclic group-divalent chain group-O—CO—

L-29: -divalent chain group-

L-30: -divalent chain group-O—

L-31: -divalent chain group-CO—O—

L-32: -divalent chain group-O—CO—

L-33: -divalent chain group-CO—$NR_7$—

L-34: -divalent chain group-O-divalent chain group-

L-35: -divalent chain group-O-divalent chain group-O—

L-36: -divalent chain group-O-divalent chain group-CO—O—

L-37: -divalent chain group-O-divalent chain group-O—CO—

Of the above linking groups, L-2, L-3, L-9, L-10, L-16, L-17, L-23, L-24, L-30, L-31, L-32, L-35, L-36 and L-37 are preferred.

In formula (D-2), $R^1$, $R^2$ and $R^3$ are each most preferably represented by the following formula (V):

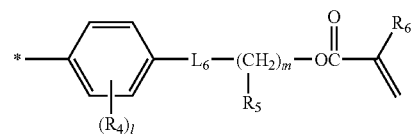

In formula (V), * represents the position bonding to $H^1$, $H^2$ or $H^3$ in formula (D-2).

$R^4$ each represents a halogen atom (preferably a fluorine atom, a chlorine atom, a bromine atom, an iodine atom), an alkyl group having from 1 to 8 carbon atoms, an alkyloxy group having from 1 to 8 carbon atoms, an acyl group having from 2 to 8 carbon atoms, an acyloxy group having from 2 to 8 carbon atoms, an alkoxycarbonyl group having from 2 to 8 carbon atoms, a nitro group or a cyano group, and $R_4$ each preferably represents a halogen atom, an alkyl group having from 1 to 3 carbon atoms, an alkyloxy group having from 1 to 3 carbon atoms, an acyl group having from 2 to 4 carbon atoms, an acyloxy group having from 2 to 4 carbon atoms, an alkoxycarbonyl group having from 2 to 4 carbon atoms, or a cyano group.

l represents an integer of from 0 to 4, preferably 0 or 1, and most preferably 0. When l is 2 or more, a plurality of groups represented by $R_4$ may be different from each other.

$L_6$ represents —O—, —CO—O—, —O—CO—, —O—CO—O— or —$CH_2$, and  represents the position bonding to the benzene ring in formula (V).

$R_5$ represents a hydrogen atom, a methyl group, an ethyl group, or a propyl group, more preferably a hydrogen atom or a methyl group, and most preferably a hydrogen atom.

m represents an integer of from 2 to 16, and preferably an integer of from 2 to 12.

$R_6$ represents a hydrogen atom or a methyl group, and preferably a hydrogen atom.

The liquid crystal compounds for use in the invention in liquid crystal D exhibiting a liquid crystal phase having a negative birefringence property are especially preferably the compounds represented by the following formula (I) and formula (DI) described later.

Formula (I):

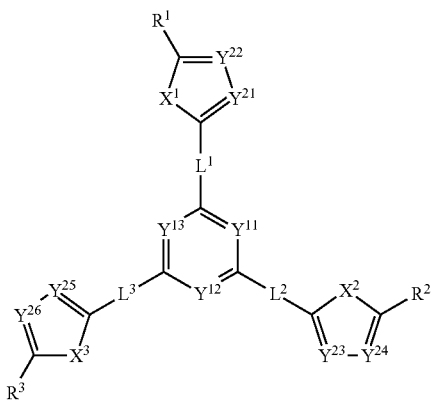

In formula (I), $Y^{11}, Y^{12}, Y^{13}, Y^{21}, Y^{22}, Y^{23}, Y^{24}, Y^{25}$ and $Y^{26}$ each represents methine or a nitrogen atom.

When $Y^{11}, Y^{12}, Y^{13}, Y^{21}, Y^{22}, Y^{23}, Y^{24}, Y^{25}$ and $Y^{26}$ each represents methine, the methine may have a substituent. The examples of the substituents are the same as the examples of $Y^{11}, Y^{12}$ and $Y^{13}$ in formula (D-2).

In formula (I), $X^1$, $X^2$ and $X^3$ each represents an oxygen atom, a sulfur atom, methylene or imino. When $X^1$, $X^2$ and $X^3$ each represents methylene or imino, they may have a substituent. As the examples of the substituents, those described above as the substituents of the methine are preferably used. These substituents may further be substituted, and the substituents in that case are also the same as the substituents that the substituents of the methine may have.

The definition and preferred examples of $L^1$, $L^2$ and $L^3$ are the same as those in formula (D-2).

The definition and preferred examples of $R^1$, $R^2$ and $R^3$ are the same as those in formula (D-2).

In the invention, of the compounds represented by formula (I), the compounds represented by formula (II) in which $R^1$, $R^2$ and $R^3$ are each represented by formula (V) are preferred.

As liquid crystal phases exhibited by the compound represented by formula (I) and a liquid crystal composition containing the compound, those described above as the liquid crystal phases satisfying equation (II) are exemplified. Of these liquid crystal phases, a columnar phase and a discotic nematic phase are preferred, and a discotic nematic phase is especially preferred. Liquid crystal phases that are exhibited in the range of from 30 to 300° C. are preferred, and more preferably in the range of from 50 to 250° C.

The specific examples of the compounds represented by formula (I) or (II) are shown below, but the invention is not restricted thereto.

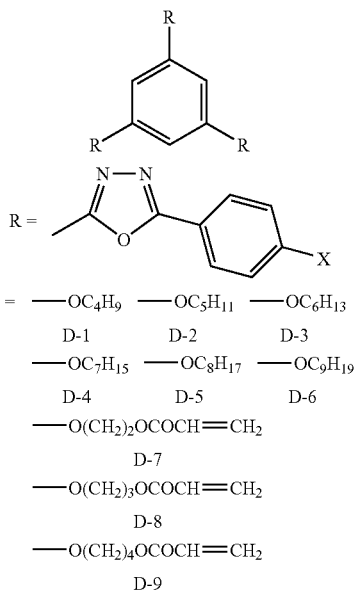

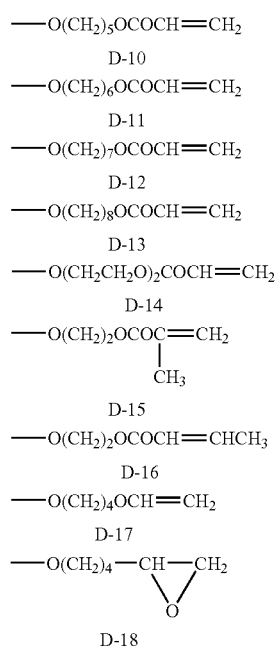

-continued

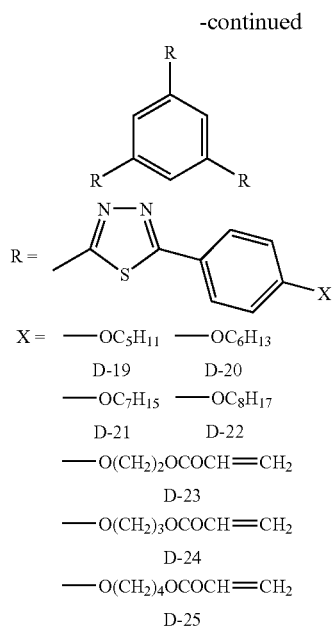

X = —OC₅H₁₁   —OC₆H₁₃
      D-19        D-20
    —OC₇H₁₅   —OC₈H₁₇
      D-21        D-22
    —O(CH₂)₂OCOCH=CH₂
              D-23
    —O(CH₂)₃OCOCH=CH₂
              D-24
    —O(CH₂)₄OCOCH=CH₂
              D-25

—O(CH₂CH₂O)₂COCH=CH₂
           D-26
—O(CH₂)₂OCOC(CH₃)=CH₂
           D-27
—O(CH₂)₄OCH=CH₂
           D-28
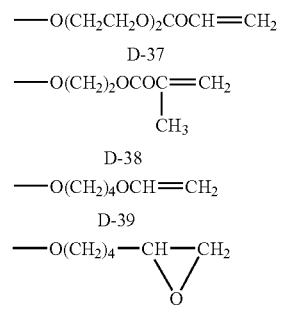
           D-29

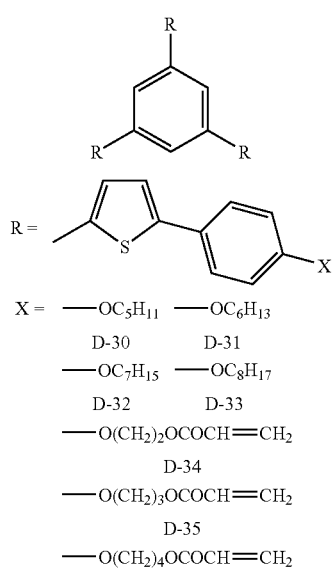

X = —OC₅H₁₁   —OC₆H₁₃
      D-30        D-31
    —OC₇H₁₅   —OC₈H₁₇
      D-32        D-33
    —O(CH₂)₂OCOCH=CH₂
              D-34
    —O(CH₂)₃OCOCH=CH₂
              D-35
    —O(CH₂)₄OCOCH=CH₂
              D-36

-continued

—O(CH₂CH₂O)₂COCH=CH₂
           D-37
—O(CH₂)₂OCOC(CH₃)=CH₂
           D-38
—O(CH₂)₄OCH=CH₂
           D-39
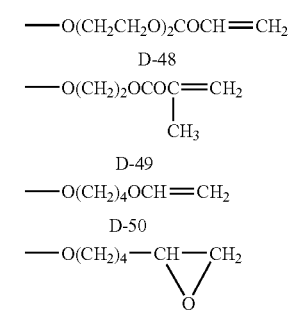
           D-40

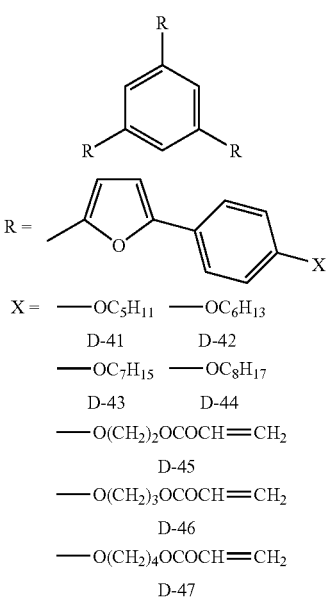

X = —OC₅H₁₁   —OC₆H₁₃
      D-41        D-42
    —OC₇H₁₅   —OC₈H₁₇
      D-43        D-44
    —O(CH₂)₂OCOCH=CH₂
              D-45
    —O(CH₂)₃OCOCH=CH₂
              D-46
    —O(CH₂)₄OCOCH=CH₂
              D-47

—O(CH₂CH₂O)₂COCH=CH₂
           D-48
—O(CH₂)₂OCOC(CH₃)=CH₂
           D-49
—O(CH₂)₄OCH=CH₂
           D-50
—O(CH₂)₄—CH—CH₂
            \ /
             O
           D-51

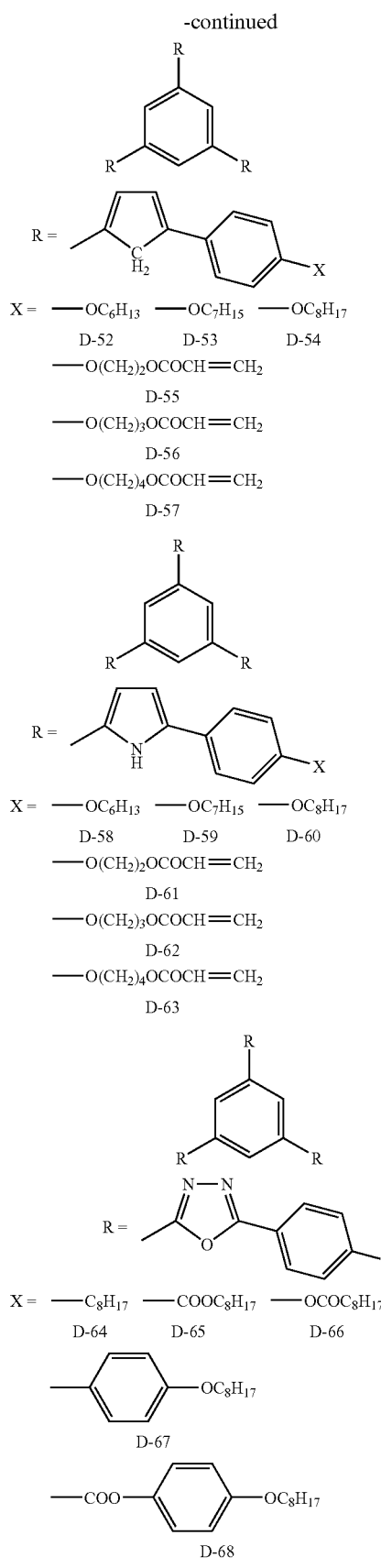
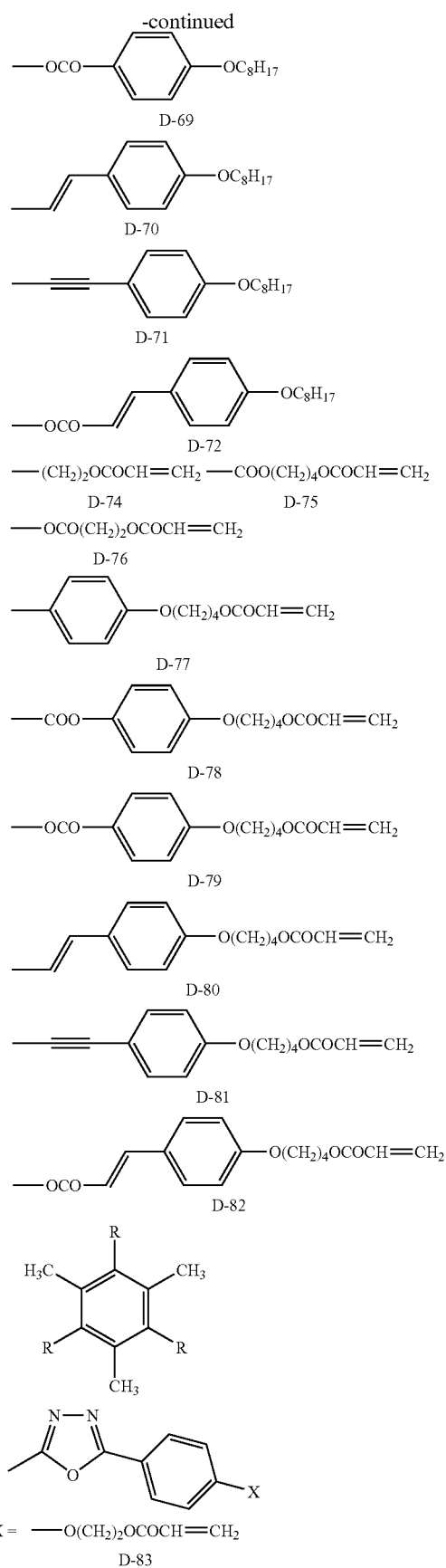

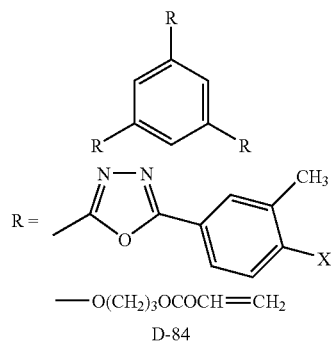
D-84
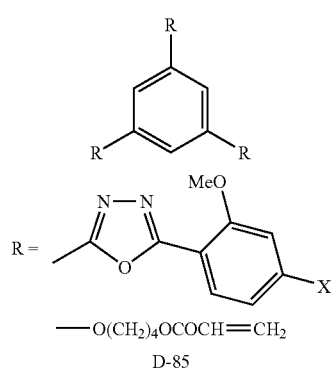
D-85
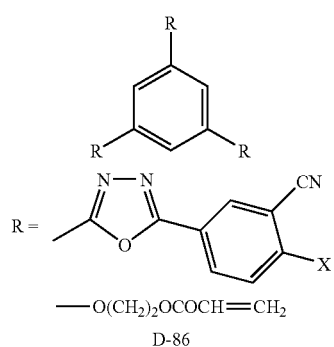
D-86
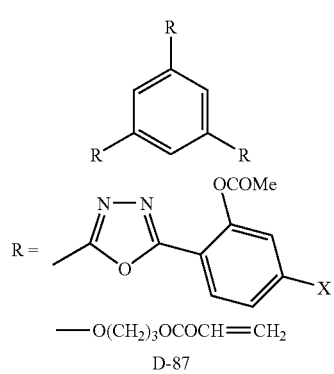
D-87
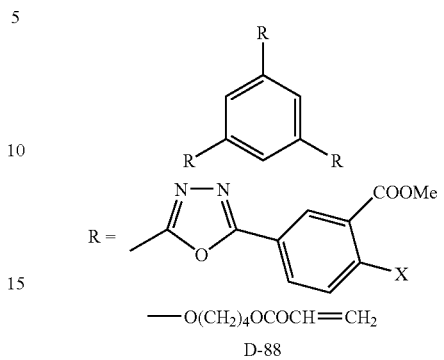
D-88
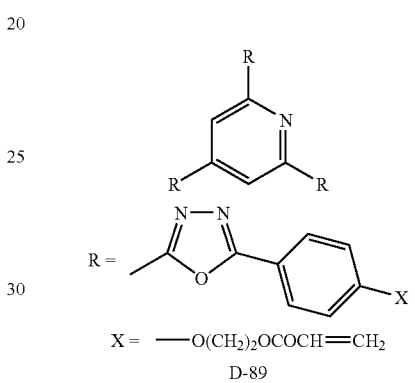
D-89
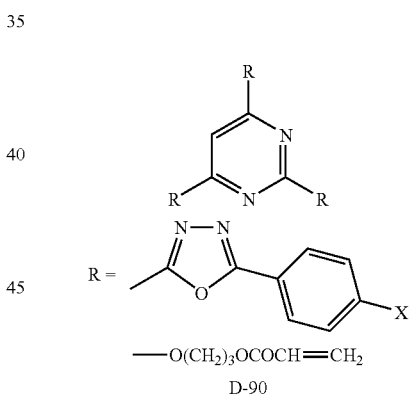
D-90
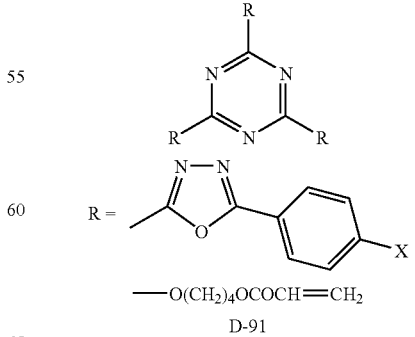
D-91

-continued
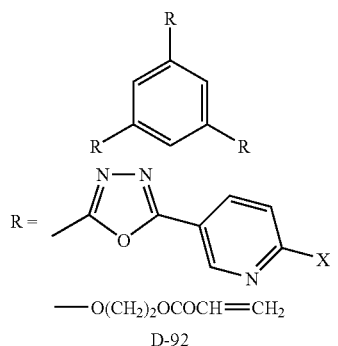
—O(CH₂)₂OCOCH=CH₂
D-92
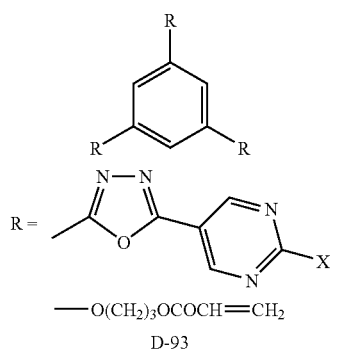
—O(CH₂)₃OCOCH=CH₂
D-93
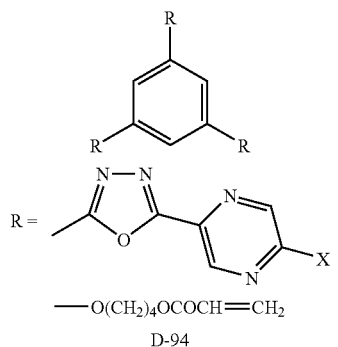
—O(CH₂)₄OCOCH=CH₂
D-94
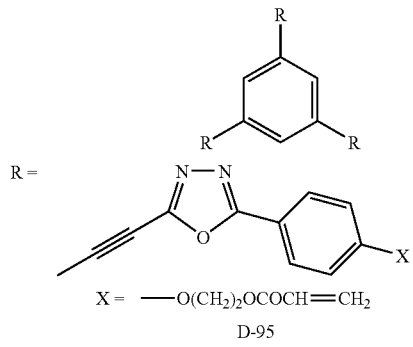
X = —O(CH₂)₂OCOCH=CH₂
D-95
—OC₆H₁₃
D-96
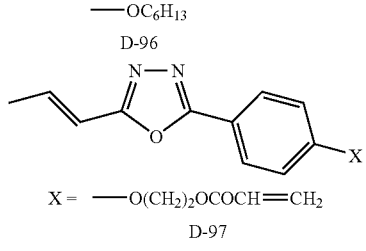
X = —O(CH₂)₂OCOCH=CH₂
D-97
-continued
—OC₆H₁₃
D-98
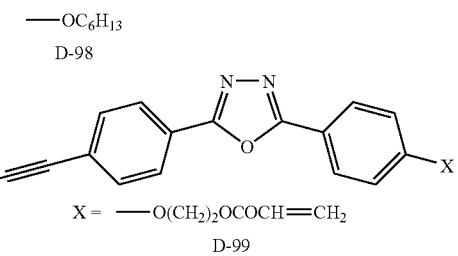
X = —O(CH₂)₂OCOCH=CH₂
D-99
—OC₆H₁₃
D-100
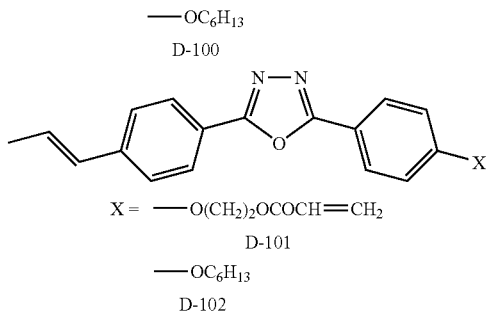
X = —O(CH₂)₂OCOCH=CH₂
D-101
—OC₆H₁₃
D-102
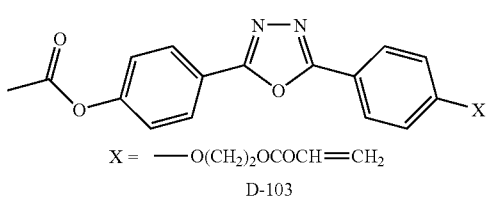
X = —O(CH₂)₂OCOCH=CH₂
D-103
—OC₆H₁₃
D-104
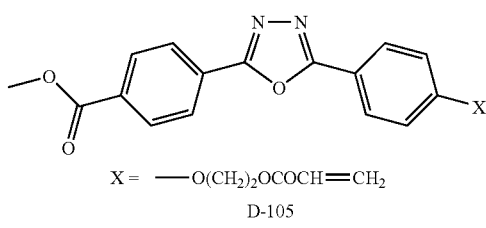
X = —O(CH₂)₂OCOCH=CH₂
D-105
—OC₆H₁₃
D-106
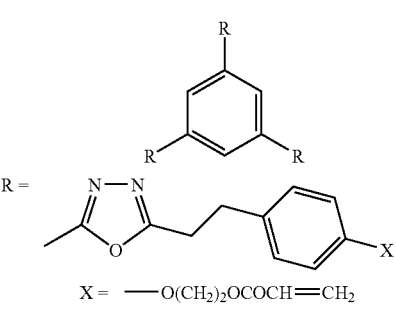
X = —O(CH₂)₂OCOCH=CH₂
D-107
—OC₆H₁₃
D-108

-continued

X = —O(CH₂)₂OCOCH=CH₂
D-109
—OC₆H₁₃
D-110

X = —O(CH₂)₂OCOCH=CH₂
D-111
—OC₆H₁₃
D-112

X = —O(CH₂)₂OCOCH=CH₂
D-113
—OC₆H₁₃
D-114

X = —O(CH₂)₂OCOCH=CH₂
D-115
—OC₆H₁₃
D-116

R =

X = —O(CH₂)₂OCOCH=CH₂
D-117
—OC₆H₁₃
D-118

-continued

X = —O(CH₂)₂OCOCH=CH₂
D-119
—OC₆H₁₃
D-120

X = —O(CH₂)₂OCOCH=CH₂
D-121
—OC₆H₁₃
D-122

X = —O(CH₂)₂OCOCH=CH₂
D-123
—OC₆H₁₃
D-124

X = —O(CH₂)₂OCOCH=CH₂
D-125
—OC₆H₁₃
D-126

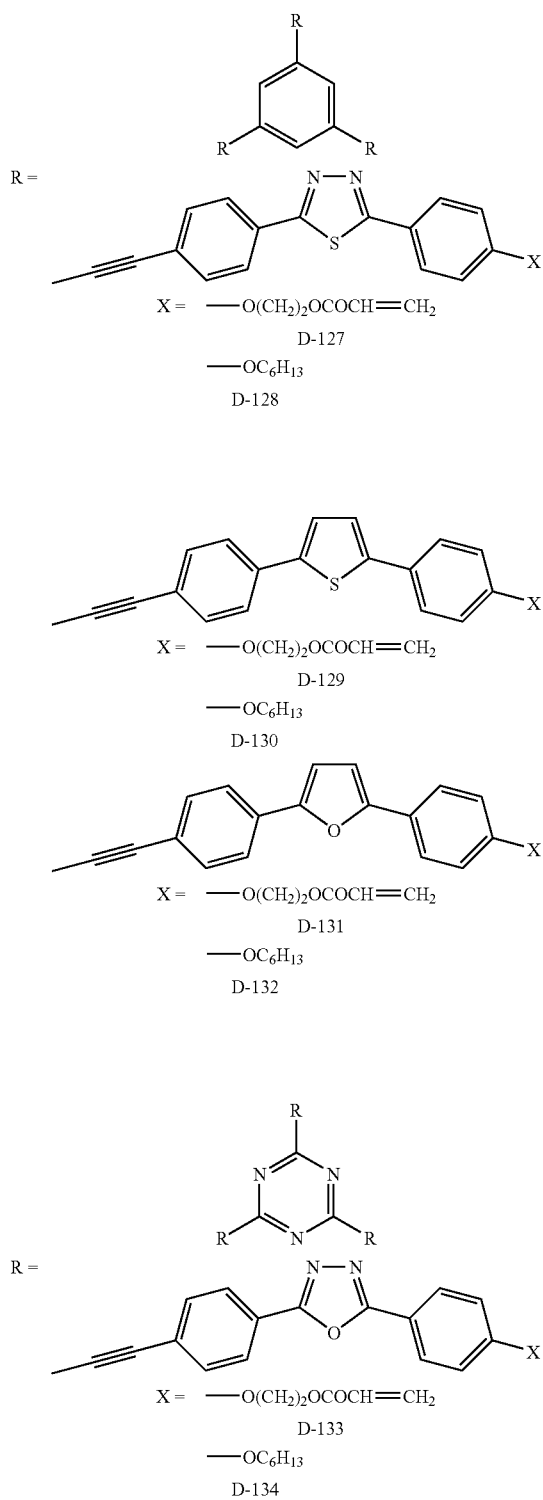

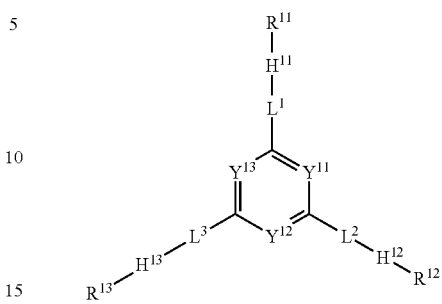

The liquid crystal compound for use in the invention in liquid crystal D exhibiting a liquid crystal phase having a negative birefringence property is especially preferably a compound represented by the following formula (DI):

In formula (DI), $Y^{11}$, $Y^{12}$ and $Y^{13}$ each represents a carbon atom or a nitrogen atom.

When $Y^{11}$, $Y^{12}$ and $Y^{13}$ each represents a carbon atom, the carbon atom may have a substituent. Here, "the atom may have a substituent" means that the hydrogen atom moiety bonded to the moiety of the atom of the cyclic structure containing the atom may be substituted with other group (hereinafter the same). As the substituents that the carbon atom may have, an alkyl group, an alkoxyl group, an aryloxy group, an acyl group, an alkoxycarbonyl group, an acyloxy group, an acylamino group, an alkoxycarbonylamino group, an alkylthio group, an arylthio group, a halogen atom, and a cyano group are exemplified as preferred examples. Of these substituents, an alkyl group, an alkoxyl group, an alkoxycarbonyl group, an acyloxy group, a halogen atom, and a cyano group are more preferred, and an alkyl group having from 1 to 12 carbon atoms, an alkoxyl group having from 1 to 12 carbon atoms, an alkoxycarbonyl group having from 2 to 12 carbon atoms, an acyloxy group having from 2 to 12 carbon atoms, a halogen atom, and a cyano group are most preferred.

It is more preferred that all of $Y^{11}$, $Y^{12}$ and $Y^{13}$ represent a carbon atom, and most preferably the carbon atom is unsubstituted.

In formula (DI), $L^1$, $L^2$ and $L^3$ each represents a single bond or a divalent linking group. When $L^1$, $L^2$ and $L^3$ represent a divalent linking group, each divalent linking group is preferably selected from the group consisting of —O—, —S—, —C(=O)—, —NR$^7$—, —CH=CH—, —C≡C—, a divalent cyclic group, and a combination thereof. $R^7$ represents an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom.

The divalent cyclic group represented by $L^1$, $L^2$ and $L^3$ is a divalent linking group (hereinafter sometimes referred to as a cyclic group) having at least one cyclic structure. The cyclic group is preferably a 5-, 6- or 7-membered ring, more preferably a 5- or 6-membered ring, and most preferably a 6-membered ring. The ring contained in the cyclic group may be a condensed ring. However, a monocyclic ring is preferred to a condensed ring. The ring contained in the cyclic group may be any of an aromatic ring, an aliphatic ring, and a heterocyclic ring. As the aromatic ring, a benzene ring and a naphthalene ring are exemplified as preferred examples. As the aliphatic ring, a cyclohexane ring is exemplified as a preferred example. As the heterocyclic ring, a pyridine ring and a pyrimidine ring are exemplified as preferred examples. The cyclic groups are preferably the aromatic ring group and the heterocyclic ring group. Further, the divalent cyclic group in the invention is more preferably a divalent linking group comprising a cyclic structure alone (provided that a substituent is included, hereinafter the same).

Of the divalent cyclic groups represented by $L^1$, $L^2$ and $L^3$, as the cyclic group having a benzene ring, a 1,4-phenylene group is preferred. As the cyclic groups having a naphthalene ring, a naphthalene-1,5-diyl group and a naphthalene-2,6-diyl group are preferred. As the cyclic group having a cyclohexane ring, a 1,4-cyclohexylene group is preferred. As the cyclic group having a pyridine ring, a pyridine-2,5-diyl group is preferred. As the cyclic group having a pyrimidine ring, a pyrimidine-2,5-diyl group is preferred.

The divalent cyclic groups represented by $L^1$, $L^2$ and $L^3$ may have a substituent. The examples of the substituents include a halogen atom, a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having 1 to 16 carbon atoms, an alkoxyl group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, a carbamoyl group substituted with an alkyl group having from 2 to 16 carbon atoms, and an acylamino group having from 2 to 16 carbon atoms.

$L^1$, $L^2$ and $L^3$ each preferably represents a single bond, *—O—CO—, *—CO—O—, *—CH=CH—, *—C≡C—, *-divalent cyclic group-, *—O—CO-divalent cyclic group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH—, or *-divalent cyclic group-C≡C—. $L^1$, $L^2$ and $L^3$ especially preferably represent a single bond, *—CH=CH—, *—C≡C—, *—CH=CH-divalent cyclic group-, or *—C≡C-divalent cyclic group-, and most preferably a single bond, where * represents the position bonding to the side of the 6-membered ring containing $Y^{11}$, $Y^{12}$ and $Y^{13}$ in formula (DI).

$H^{11}$, $H^{12}$ and $H^{13}$ each represents the following formula (DI-A) or (DI-B).

Formula (DI-A):

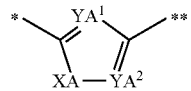

In formula (DI-A), $YA^1$ and $YA^2$ each represents a carbon atom or a nitrogen atom. It is preferred that at least either $YA^1$ or $YA^2$ represents a nitrogen atom, and more preferably both represent a nitrogen atom. XA represents an oxygen atom, a sulfur atom, a carbon atom, or a nitrogen atom, and preferably an oxygen atom. * represents the position bonding to the side of $L^1$, $L^2$ or $L^3$ in formula (DI), and ** represents the position bonding to the side of $R^{11}$, $R^{12}$ or $R^{13}$ in formula (DI).

Formula (DI-B):

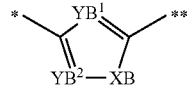

In formula (DI-B), $YB^1$ and $YB^2$ each represents a carbon atom or a nitrogen atom. It is preferred that at least either $YB^1$ or $YB^2$ represents a nitrogen atom, and more preferably both represent a nitrogen atom. XB represents an oxygen atom, a sulfur atom, a carbon atom, or a nitrogen atom, and preferably represents an oxygen atom. * represents the position bonding to the side of $L^1$, $L^2$ or $L^3$ in formula (DI), and ** represents the position bonding to the side of $R^{11}$, $R^{12}$ or $R^{13}$ in formula (DI).

$R^{11}$, $R^{12}$ and $R^{13}$ each represents the following formula (DI-R):

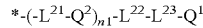

In formula (DI-R), * represents the position bonding to $H^{11}$, $H^{12}$ or $H^{13}$ in formula (DI).

$L^{21}$ represents a single bond or a divalent linking group. When $L^{21}$ represents a divalent linking group, the divalent linking group is preferably selected from the group consisting of —O—, —S—, —C(=O)—, —NR$^7$—, —CH=CH—, —C≡C—, and a combination of these groups. $R^7$ represents an alkyl group having from 1 to 7 carbon atoms or a hydrogen atom, preferably an alkyl group having from 1 to 4 carbon atoms or a hydrogen atom, more preferably a methyl group, an ethyl group or a hydrogen atom, and most preferably a hydrogen atom.

$L^{21}$ preferably represents a single bond, *—O—CO—, *—CO—O—, *—CH=CH—, or *—C≡C— (where *** represents the side of * in formula (DI-R)), and more preferably represents a single bond.

$Q^2$ represents a divalent group (a cyclic group) having at least one cyclic structure. The cyclic group is preferably a 5-, 6- or 7-membered ring, more preferably a 5- or 6-membered ring, and most preferably a 6-membered ring. The cyclic structure contained in the cyclic group may be a condensed ring. However, a monocyclic ring is preferred to a condensed ring. The ring contained in the cyclic group may be any of an aromatic ring, an aliphatic ring, and a heterocyclic ring. As the aromatic ring, a benzene ring and a naphthalene ring are exemplified as preferred examples. As the aliphatic ring, a cyclohexane ring is exemplified as a preferred example. As the heterocyclic ring, a pyridine ring and a pyrimidine ring are exemplified as preferred examples.

Of the divalent cyclic groups represented by $Q^1$, as the cyclic group having a benzene ring, a 1,4-phenylene group is preferred. As the cyclic groups having a naphthalene ring, a naphthalene-1,5-diyl group and a naphthalene-2,6-diyl group are preferred. As the cyclic group having a cyclohexane ring, a 1,4-cyclohexylene group is preferred. As the cyclic group having a pyridine ring, a pyridine-2,5-diyl group is preferred. As the cyclic group having a pyrimidine ring, a pyrimidine-2,5-diyl group is preferred. Of these groups, a 1,4-phenylene group and a 1,4-cyclohexylene group are especially preferred.

$Q^2$ may have a substituent. The examples of the substituents include a halogen atom (a fluorine atom, a chlorine atom, a bromine atom, an iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having 1 to 16 carbon atoms, an alkoxyl group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl-substituted carbamoyl group having from 2 to 16 carbon atoms, and an acylamino group having from 2 to 16 carbon atoms. Of these substituents, a halogen atom, a cyano group, an alkyl group having from 1 to 6 carbon atoms, and a halogen-substituted alkyl group having 1 to 6 carbon atoms are preferred, a halogen atom, an alkyl group having from 1 to 4 carbon atoms, and a halogen-substituted alkyl group having 1 to 4 carbon atoms are more preferred, and a halogen atom, an alkyl group having from 1 to 3 carbon atoms, and a trifluoromethyl group are still more preferred.

n1 represents an integer of from 0 to 4, preferably from 1 to 3, and more preferably 1 or 2.

$L^{22}$ represents —O—, —O—CO—, —CO—O—, —O—CO—O—, —S—, —N(R)—, —CH$_2$—, —CH=CH— or —C≡C—, and  represents the position bonding to the side of $Q^2$.

$L^{22}$ preferably represents —O—; —O—CO—, —CO—O—, —O—CO—O—, —CH$_2$—, —CH=CH— or —C≡C—, and more preferably represents —O—, —O—CO—, —O—CO—O—, or **—CH$_2$—.

$L^{23}$ represents a divalent linking group selected from the group consisting of —O—, —S—, —C(=O)—, —NH—, —CH$_2$—, —CH=CH—, —C≡C—, and a combination thereof. The hydrogen atoms of —NH—, —CH$_2$— and —CH=CH— may be may be substituted with a substituent. As the examples of preferred substituents, a halogen atom, a cyano group, a nitro group, an alkyl group having from 1 to 6 carbon atoms, a halogen-substituted alkyl group having from 1 to 6 carbon atoms, an alkoxyl group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl-substituted carbamoyl group having from 2 to 6 carbon atoms, and an acylamino group having from 2 to 6 carbon atoms are exemplified. A halogen atom and an alkyl group having from 1 to 6 carbon atoms are more preferred.

$L^{23}$ is preferably selected from the group consisting of —O—, —C(=O)—, —CH$_2$—, —CH=CH—, —C≡C—, and a combination thereof. It is preferred that $L^{23}$ has from 1 to 20 carbon atoms, more preferably from 2 to 14 carbon atoms. It is preferred that $L^{23}$ has from 1 to 16 —CH$_2$—, and more preferably from 2 to 12 —CH$_2$—.

$Q^1$ represents a polymerizable group or a hydrogen atom. When the compound in the invention is used in an optical film that the size of a phase difference is preferably not fluctuated by heat such as an optically compensatory film, $Q^1$ is preferably a polymerizable group. The polymerization reaction is preferably addition polymerization (including ring-opening polymerization) or condensation polymerization. That is, the polymerizable group is preferably a functional group capable of addition polymerization reaction or condensation polymerization reaction. The examples of the polymerizable groups are shown below.

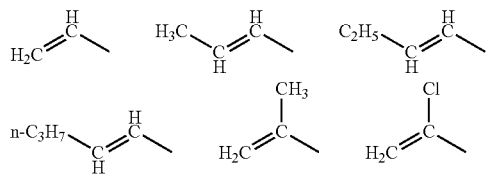

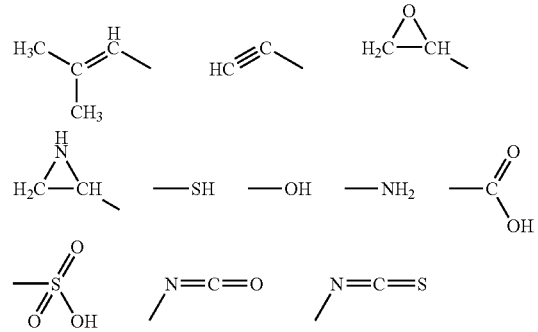

The polymerizable group is especially preferably a functional group capable of addition polymerization reaction. As such a polymerizable group, a polymerizable ethylenic unsaturated group or a ring-opening polymerizable group is preferred.

As the examples of the polymerizable ethylenic unsaturated groups, the compounds represented by the following formulae (M-1) to (M-6) are exemplified.

(M-1)

(M-2)

(M-3)

(M-4)

(M-5)

(M-6)

In formulae (M-3) and (M-4), R represents a hydrogen atom or an alkyl group, and preferably a hydrogen atom or a methyl group.

Of formulae (M-1) to (M-6), (M-1) or (M-2) is preferred, and (M-1) is most preferred.

The preferred groups as the ring-opening polymerizable groups are cyclic ether groups, more preferred groups are an epoxy group and an oxetanyl group, and an epoxy group is most preferred.

The compound represented by formula (DI) is more preferably represented by the following formula (DII):

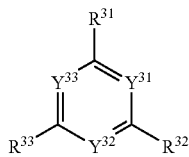

In formula (DII), $Y^{31}$, $Y^{32}$ and $Y^{33}$ each represents a carbon atom or a nitrogen atom, and they have the same meaning as $Y^{11}$, $Y^{12}$ and $Y^{13}$ in formula (DI), and the preferred range is also the same.

In formula (DII), $R^{31}$, $R^{32}$ and $R^{33}$ each represents the following formula (DII-R):

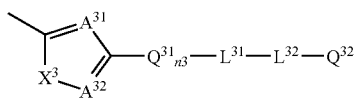

In formula (DII-R), $A^{31}$ and $A^{32}$ each represents a carbon atom or a nitrogen atom. It is preferred that at least either $A^{31}$ or $A^{32}$ represents a nitrogen atom, and more preferably both represent a nitrogen atom. $X^3$ represents an oxygen atom, a sulfur atom, a carbon atom, or a nitrogen atom, and preferably an oxygen atom.

$Q^{31}$ represents a divalent group having a 6-membered cyclic structure (hereinafter sometimes referred to as a 6-membered cyclic group). The 6-membered ring may be a condensed ring. However, a monocyclic ring is preferred to a condensed ring. The ring contained in the 6-membered cyclic group may be any of an aromatic ring, an aliphatic ring, and a heterocyclic ring. As the aromatic ring, a benzene ring and a naphthalene ring are exemplified as preferred examples. As the aliphatic ring, a cyclohexane ring is exemplified as a preferred example. As the heterocyclic ring, a pyridine ring and a pyrimidine ring are exemplified as preferred examples.

Of the cyclic groups represented by $Q^{31}$, as the 6-membered cyclic group having a benzene ring, a 1,4-phenylene group is preferred. As the cyclic structure having a naphthalene ring, a naphthalene-1,5-diyl group and a naphthalene-2,6-diyl group are preferred. As the cyclic structure having a cyclohexane ring, a 1,4-cyclohexylene group is preferred. As the cyclic structure having a pyridine ring, a pyridine-2,5-diyl group is preferred. As the cyclic structure having a pyrimidine ring, a pyrimidine-2,5-diyl group is preferred. Of these groups, a 1,4-phenylene group and a 1,4-cyclohexylene group are especially preferred.

The cyclic structure represented by $Q^{31}$ may have a substituent. The examples of the substituents include a halogen atom (a fluorine atom, a chlorine atom, a bromine atom, an iodine atom), a cyano group, a nitro group, an alkyl group having from 1 to 16 carbon atoms, an alkenyl group having from 2 to 16 carbon atoms, an alkynyl group having from 2 to 16 carbon atoms, a halogen-substituted alkyl group having 1 to 16 carbon atoms, an alkoxyl group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl-substituted carbamoyl group having from 2 to 16 carbon atoms, and an acylamino group having from 2 to 16 carbon atoms. Of these substituents of the 6-membered cyclic group, a halogen atom, a cyano group, an alkyl group having from 1 to 6 carbon atoms, and a halogen-substituted alkyl group having 1 to 6 carbon atoms are preferred, a halogen atom, an alkyl group having from 1 to 4 carbon atoms, and a halogen-substituted alkyl group having 1 to 4 carbon atoms are more preferred, and a halogen atom, an alkyl group having from 1 to 3 carbon atoms, and a trifluoromethyl group are still more preferred.

n3 represents an integer of from 1 to 3, and preferably 1 or 2.

$L^{31}$ represents *—O—, *—O—CO—, *—CO—O—, *—O—CO—O—, *—S—, *—N(R)—, *—CH$_2$—, *—CH=CH— or *—C≡C—, and * represents the position bonding to the side of $Q^{31}$, specifically $L^{31}$ has the same meaning as $L^{22}$ in formula (DI-R), and the preferred range is also the same.

$L^{32}$ represents a divalent linking group selected from the group consisting of —O—, —S—, —C(=O)—, —NH—, —CH$_2$—, —CH=CH—, —C≡C—, and a combination thereof, specifically $L^{32}$ has the same meaning as $L^{23}$ in formula (DI-R), and the preferred range is also the same.

$Q^{32}$ in formula (DII-R) has the same meaning as $Q^1$ in formula (DI-R).

The specific examples of the compounds represented by formula (DI) are shown below, but the invention is not restricted to these compounds.

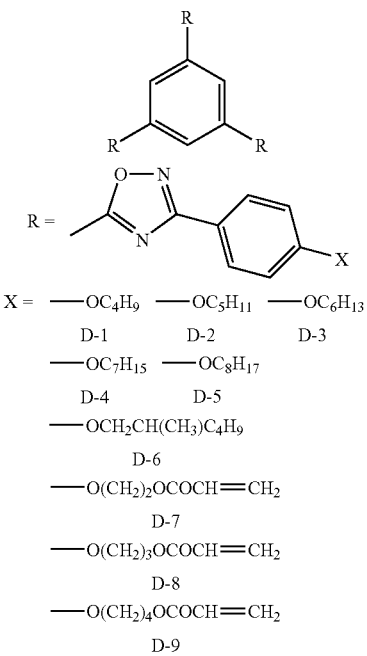

-continued

—O(CH₂)₅OCOCH=CH₂
D-10
—O(CH₂)₆OCOCH=CH₂
D-11
—O(CH₂)₇OCOCH=CH₂
D-12
—O(CH₂)₈OCOCH=CH₂
D-13
—O(CH₂)₂C(CH₃)OCOCH=CH₂
D-14
—O(CH₂)₃C(CH₃)OCOCH=CH₂
D-15
—O(CH₂CH₂O)₂COCH=CH₂
D-16

—O(CH₂)₄OCOC(CH₃)=CH₂
D-17

—O(CH₂)₄OCOCH=CHCH₃
D-18

—O(CH₂)₄OCH=CH₂
D-19

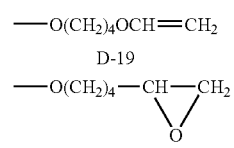
D-20

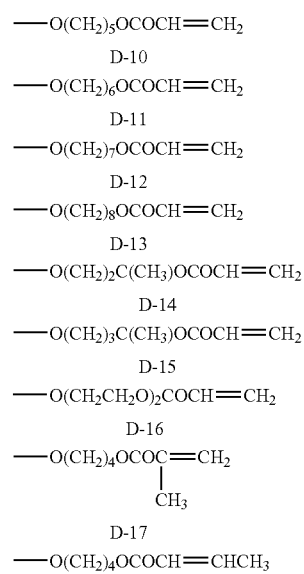

X = —OCOC₄H₉   —OCOC₅H₁₁   —OCOC₆H₁₃
    D-21         D-22          D-23

—OCO(CH₂)₂OCOCH=CH₂
D-24
—OCO(CH₂)₃OCOCH=CH₂
D-25
—OCO(CH₂)₄OCOCH=CH₂
D-26
—OCO(CH₂)₅OCOCH=CH₂
D-27

-continued

—OCO(CH₂)₆OCOCH=CH₂
D-28
—OCO(CH₂)₇OCOCH=CH₂
D-29
—OCO(CH₂)₂C(CH₃)OCOCH=CH₂
D-30

—OCO(CH₂)₂OCOC(CH₃)=CH₂
D-31

—OCO(CH₂)₂OCOCH=CHCH₃
D-32

—OCO(CH₂)₄OCH=CH₂
D-33

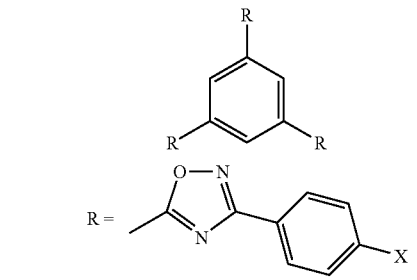
D-34

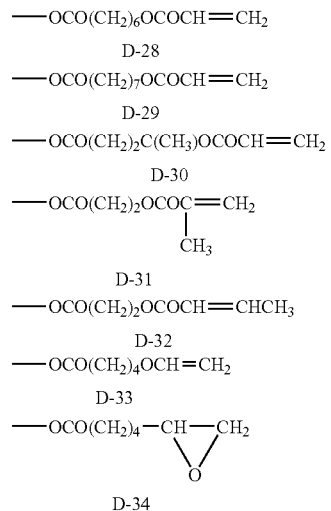

X = —OCOOC₄H₉   —OCOOC₅H₁₁   —OCOOC₆H₁₃
    D-35         D-36           D-37

—OCOO(CH₂)₂OCOCH=CH₂
D-38
—OCOO(CH₂)₃OCOCH=CH₂
D-39
—OCOO(CH₂)₄OCOCH=CH₂
D-40
—OCOO(CH₂)₅OCOCH=CH₂
D-41
—OCOO(CH₂)₆OCOCH=CH₂
D-42
—OCOO(CH₂)₇OCOCH=CH₂
D-43
—OCOOC(CH₃)CH₂CH₂OCOCH=CH₂
D-44
—OCOOC(CH₂CH₂O)₂COCH=CH₂
D-45

—OCOO(CH₂)₂OCOC(CH₃)=CH₂
D-46

—OCOO(CH₂)₂OCOCH=CHCH₃
D-47
—OCOO(CH₂)₄OCH=CH₂
D-48

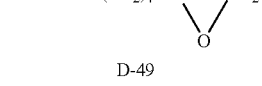
D-49

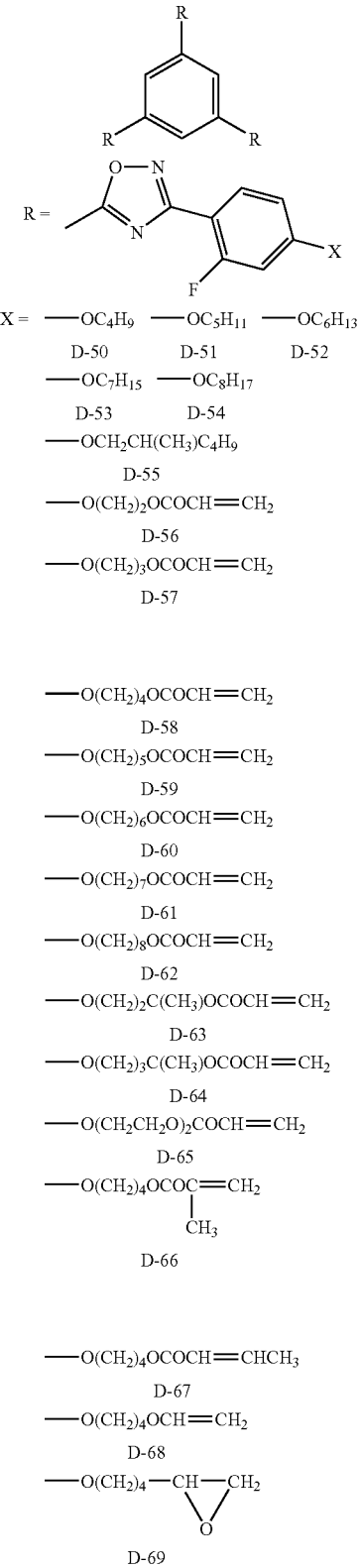

X =  —OC$_4$H$_9$   —OC$_5$H$_{11}$   —OC$_6$H$_{13}$
      D-50          D-51            D-52
     —OC$_7$H$_{15}$  —OC$_8$H$_{17}$
      D-53          D-54
     —OCH$_2$CH(CH$_3$)C$_4$H$_9$
      D-55
     —O(CH$_2$)$_2$OCOCH=CH$_2$
      D-56
     —O(CH$_2$)$_3$OCOCH=CH$_2$
      D-57

—O(CH$_2$)$_4$OCOCH=CH$_2$
 D-58
—O(CH$_2$)$_5$OCOCH=CH$_2$
 D-59
—O(CH$_2$)$_6$OCOCH=CH$_2$
 D-60
—O(CH$_2$)$_7$OCOCH=CH$_2$
 D-61
—O(CH$_2$)$_8$OCOCH=CH$_2$
 D-62
—O(CH$_2$)$_2$C(CH$_3$)OCOCH=CH$_2$
 D-63
—O(CH$_2$)$_3$C(CH$_3$)OCOCH=CH$_2$
 D-64
—O(CH$_2$CH$_2$O)$_2$COCH=CH$_2$
 D-65
—O(CH$_2$)$_4$OCOC=CH$_2$
              |
              CH$_3$
 D-66

—O(CH$_2$)$_4$OCOCH=CHCH$_3$
 D-67
—O(CH$_2$)$_4$OCH=CH$_2$
 D-68
—O(CH$_2$)$_4$—CH—CH$_2$
              \ /
               O
 D-69

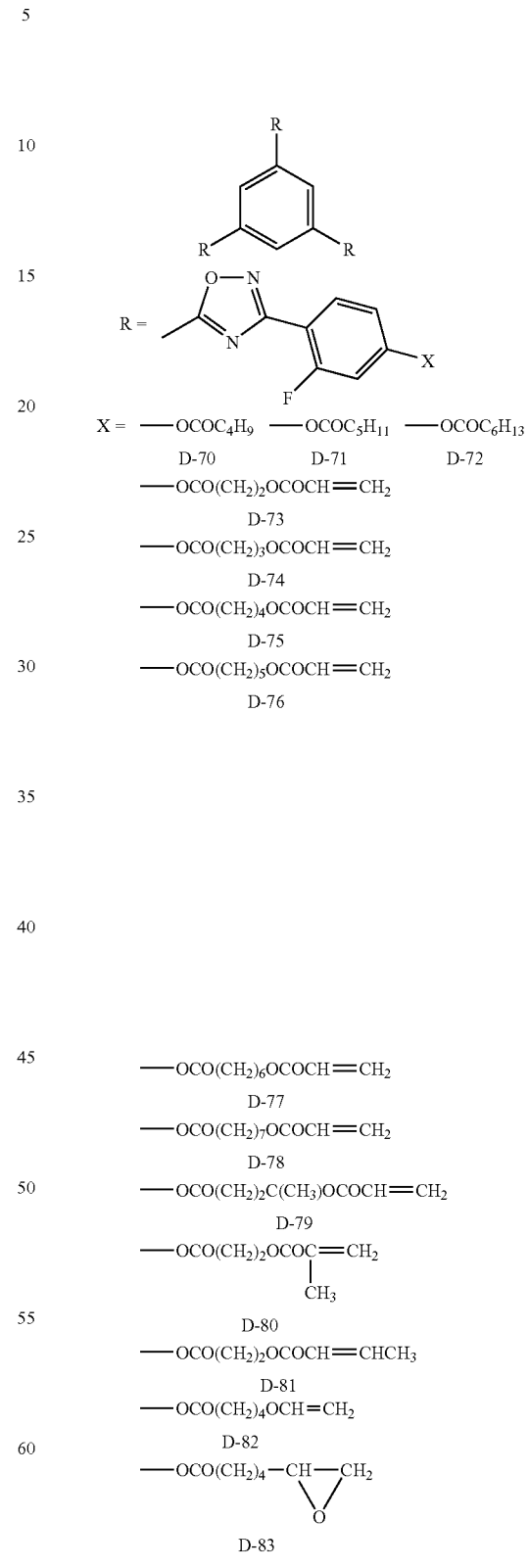

X =  —OCOC$_4$H$_9$   —OCOC$_5$H$_{11}$   —OCOC$_6$H$_{13}$
      D-70           D-71              D-72
     —OCO(CH$_2$)$_2$OCOCH=CH$_2$
      D-73
     —OCO(CH$_2$)$_3$OCOCH=CH$_2$
      D-74
     —OCO(CH$_2$)$_4$OCOCH=CH$_2$
      D-75
     —OCO(CH$_2$)$_5$OCOCH=CH$_2$
      D-76

—OCO(CH$_2$)$_6$OCOCH=CH$_2$
 D-77
—OCO(CH$_2$)$_7$OCOCH=CH$_2$
 D-78
—OCO(CH$_2$)$_2$C(CH$_3$)OCOCH=CH$_2$
 D-79
—OCO(CH$_2$)$_2$OCOC=CH$_2$
              |
              CH$_3$
 D-80
—OCO(CH$_2$)$_2$OCOCH=CHCH$_3$
 D-81
—OCO(CH$_2$)$_4$OCH=CH$_2$
 D-82
—OCO(CH$_2$)$_4$—CH—CH$_2$
                \ /
                 O
 D-83

-continued

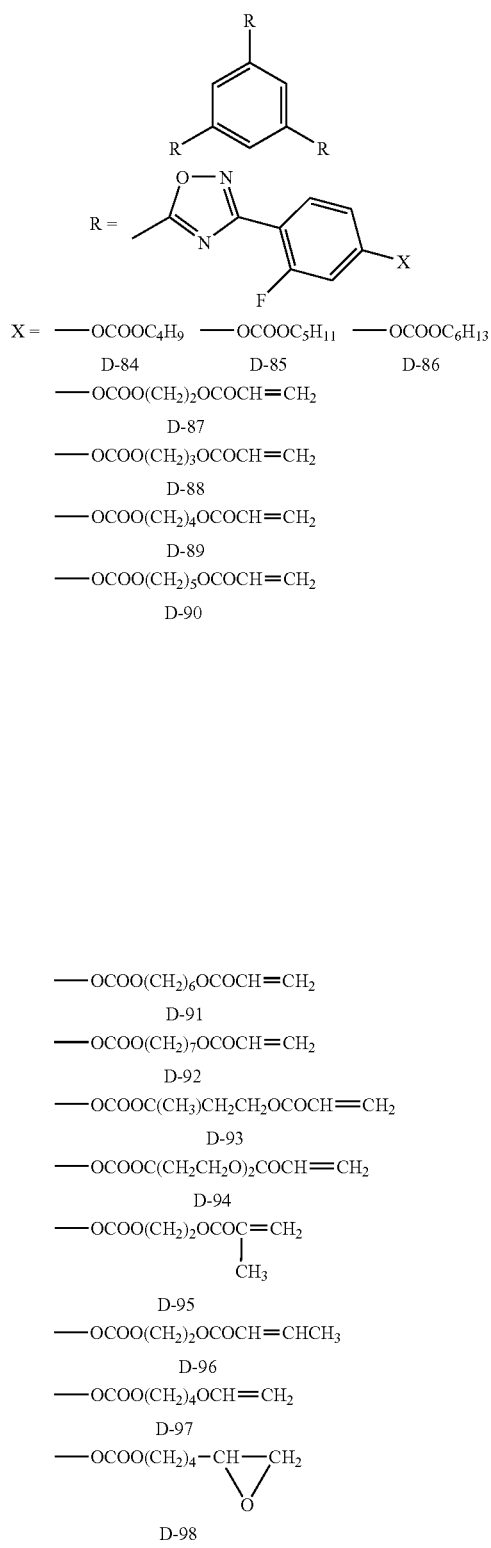

X = —OCOOC₄H₉  —OCOOC₅H₁₁  —OCOOC₆H₁₃
      D-84          D-85           D-86
—OCOO(CH₂)₂OCOCH=CH₂
D-87
—OCOO(CH₂)₃OCOCH=CH₂
D-88
—OCOO(CH₂)₄OCOCH=CH₂
D-89
—OCOO(CH₂)₅OCOCH=CH₂
D-90

—OCOO(CH₂)₆OCOCH=CH₂
D-91
—OCOO(CH₂)₇OCOCH=CH₂
D-92
—OCOOC(CH₃)CH₂CH₂OCOCH=CH₂
D-93
—OCOOC(CH₂CH₂O)₂COCH=CH₂
D-94
—OCOO(CH₂)₂OCOC(CH₃)=CH₂
D-95
—OCOO(CH₂)₂OCOCH=CHCH₃
D-96
—OCOO(CH₂)₄OCH=CH₂
D-97
—OCOO(CH₂)₄—CH—CH₂
              \\O/
D-98

-continued

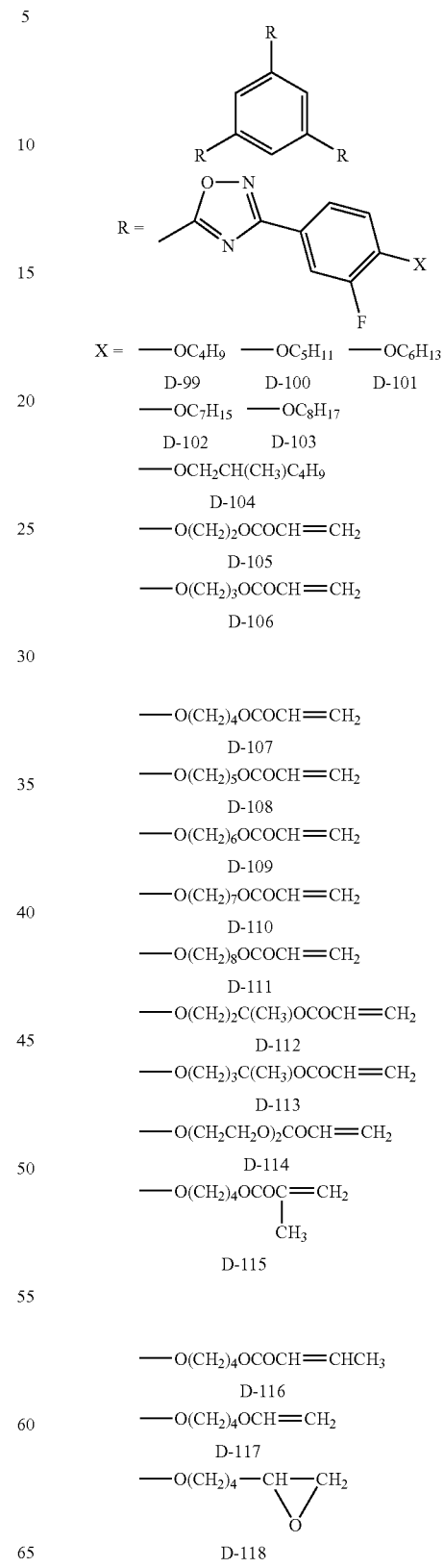

X = —OC₄H₉   —OC₅H₁₁   —OC₆H₁₃
    D-99      D-100      D-101
    —OC₇H₁₅   —OC₈H₁₇
    D-102     D-103
—OCH₂CH(CH₃)C₄H₉
D-104
—O(CH₂)₂OCOCH=CH₂
D-105
—O(CH₂)₃OCOCH=CH₂
D-106

—O(CH₂)₄OCOCH=CH₂
D-107
—O(CH₂)₅OCOCH=CH₂
D-108
—O(CH₂)₆OCOCH=CH₂
D-109
—O(CH₂)₇OCOCH=CH₂
D-110
—O(CH₂)₈OCOCH=CH₂
D-111
—O(CH₂)₂C(CH₃)OCOCH=CH₂
D-112
—O(CH₂)₃C(CH₃)OCOCH=CH₂
D-113
—O(CH₂CH₂O)₂COCH=CH₂
D-114
—O(CH₂)₄OCOC(CH₃)=CH₂
D-115
—O(CH₂)₄OCOCH=CHCH₃
D-116
—O(CH₂)₄OCH=CH₂
D-117
—O(CH₂)₄—CH—CH₂
          \\O/
D-118

-continued

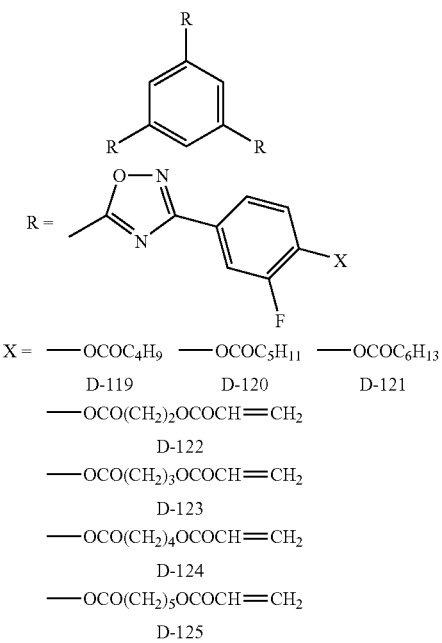

X= —OCOC$_4$H$_9$  —OCOC$_5$H$_{11}$  —OCOC$_6$H$_{13}$
D-119  D-120  D-121

—OCO(CH$_2$)$_2$OCOCH=CH$_2$
D-122

—OCO(CH$_2$)$_3$OCOCH=CH$_2$
D-123

—OCO(CH$_2$)$_4$OCOCH=CH$_2$
D-124

—OCO(CH$_2$)$_5$OCOCH=CH$_2$
D-125

—OCO(CH$_2$)$_6$OCOCH=CH$_2$
D-126

—OCO(CH$_2$)$_7$OCOCH=CH$_2$
D-127

—OCO(CH$_2$)$_2$C(CH$_3$)OCOCH=CH$_2$
D-128

—OCO(CH$_2$)$_2$OCOC=CH$_2$
            |
           CH$_3$
D-129

—OCO(CH$_2$)$_2$OCOCH=CHCH$_3$
D-130

—OCO(CH$_2$)$_4$OCH=CH$_2$
D-131

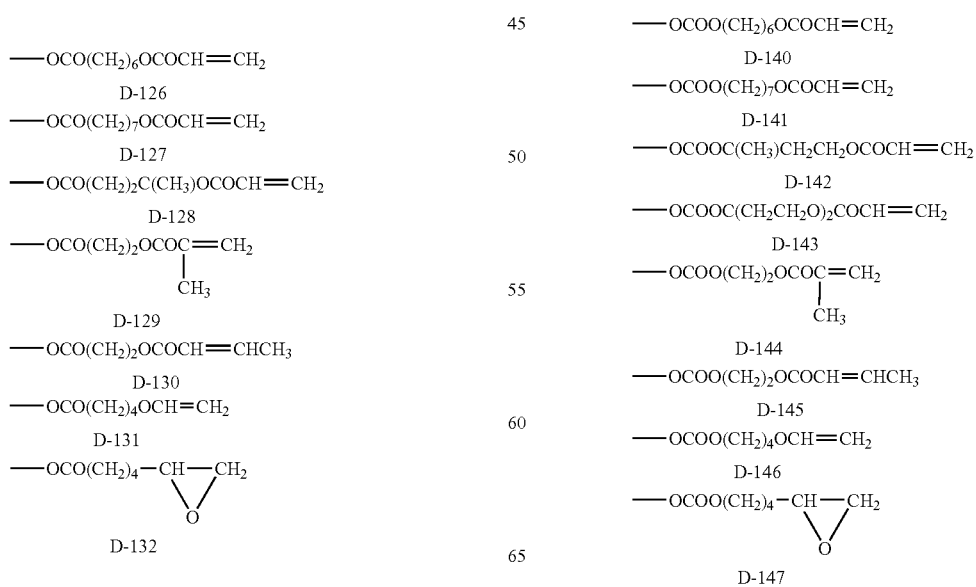

D-132

-continued

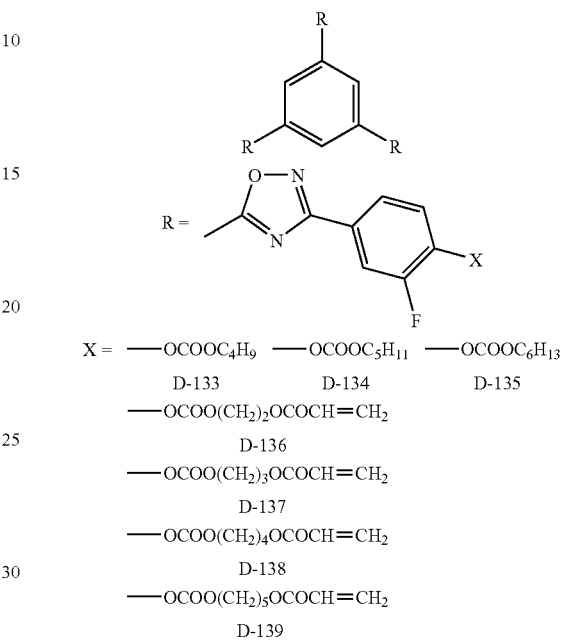

X= —OCOOC$_4$H$_9$  —OCOOC$_5$H$_{11}$  —OCOOC$_6$H$_{13}$
D-133  D-134  D-135

—OCOO(CH$_2$)$_2$OCOCH=CH$_2$
D-136

—OCOO(CH$_2$)$_3$OCOCH=CH$_2$
D-137

—OCOO(CH$_2$)$_4$OCOCH=CH$_2$
D-138

—OCOO(CH$_2$)$_5$OCOCH=CH$_2$
D-139

—OCOO(CH$_2$)$_6$OCOCH=CH$_2$
D-140

—OCOO(CH$_2$)$_7$OCOCH=CH$_2$
D-141

—OCOOC(CH$_3$)CH$_2$CH$_2$OCOCH=CH$_2$
D-142

—OCOOC(CH$_2$CH$_2$O)$_2$COCH=CH$_2$
D-143

—OCOO(CH$_2$)$_2$OCOC=CH$_2$
             |
            CH$_3$
D-144

—OCOO(CH$_2$)$_2$OCOCH=CHCH$_3$
D-145

—OCOO(CH$_2$)$_4$OCH=CH$_2$
D-146

—OCOO(CH$_2$)$_4$—CH—CH$_2$
                \ /
                 O
D-147

-continued

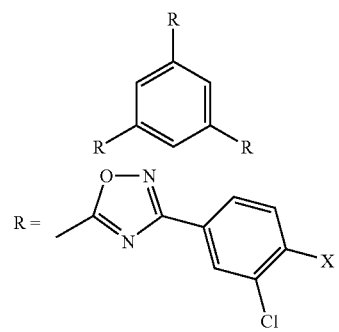

X = —OC$_6$H$_{13}$  —OCOC$_5$H$_{11}$  —OCOOC$_4$H$_9$
D-148     D-149       D-150
—O(CH$_2$)$_4$OCOCH=CH$_2$
D-151
—O(CH$_2$)$_6$OCOCH=CH$_2$
D-152
—OCO(CH$_2$)$_3$OCOCH=CH$_2$
D-153
—OCO(CH$_2$)$_4$OCOCH=CH$_2$
D-154

—OCOO(CH$_2$)$_2$OCOCH=CH$_2$
D-155
—OCOO(CH$_2$)$_4$OCOCH=CH$_2$
D-156

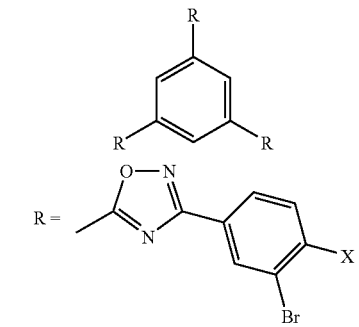

X = —OC$_6$H$_{13}$  —OCOC$_5$H$_{11}$  —OCOOC$_4$H$_9$
D-157     D-158       D-159
—O(CH$_2$)$_4$OCOCH=CH$_2$
D-160
—O(CH$_2$)$_6$OCOCH=CH$_2$
D-161
—OCO(CH$_2$)$_3$OCOCH=CH$_2$
D-162
—OCO(CH$_2$)$_4$OCOCH=CH$_2$
D-163

—OCOO(CH$_2$)$_2$OCOCH=CH$_2$
D-164
—OCOO(CH$_2$)$_4$OCOCH=CH$_2$
D-165

-continued

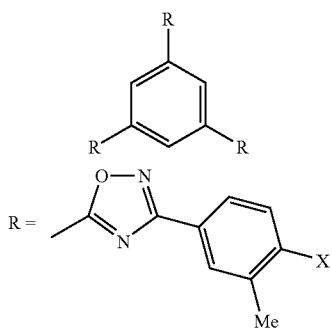

X = —OC$_6$H$_{13}$  —OCOC$_5$H$_{11}$  —OCOOC$_4$H$_9$
D-166     D-167       D-168
—O(CH$_2$)$_4$OCOCH=CH$_2$
D-169
—O(CH$_2$)$_6$OCOCH=CH$_2$
D-170
—OCO(CH$_2$)$_3$OCOCH=CH$_2$
D-171
—OCO(CH$_2$)$_4$OCOCH=CH$_2$
D-172

—OCOO(CH$_2$)$_2$OCOCH=CH$_2$
D-173
—OCOO(CH$_2$)$_4$OCOCH=CH$_2$
D-174

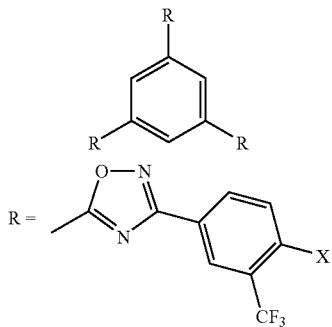

X = —OC$_6$H$_{13}$  —OCOC$_5$H$_{11}$  —OCOOC$_4$H$_9$
D-175     D-176       D-178
—O(CH$_2$)$_4$OCOCH=CH$_2$
D-179
—O(CH$_2$)$_6$OCOCH=CH$_2$
D-180
—OCO(CH$_2$)$_3$OCOCH=CH$_2$
D-181
—OCO(CH$_2$)$_4$OCOCH=CH$_2$
D-182

—OCOO(CH$_2$)$_2$OCOCH=CH$_2$
D-183
—OCOO(CH$_2$)$_4$OCOCH=CH$_2$
D-184

-continued

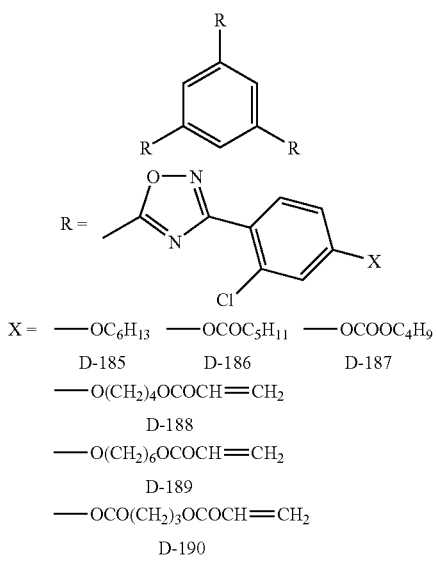

X = —OC₆H₁₃  —OCOC₅H₁₁  —OCOOC₄H₉
   D-185      D-186       D-187
—O(CH₂)₄OCOCH=CH₂
   D-188
—O(CH₂)₆OCOCH=CH₂
   D-189
—OCO(CH₂)₃OCOCH=CH₂
   D-190
—OCO(CH₂)₄OCOCH=CH₂
   D-191

—OCOO(CH₂)₂OCOCH=CH₂
   D-192
—OCOO(CH₂)₄OCOCH=CH₂
   D-193

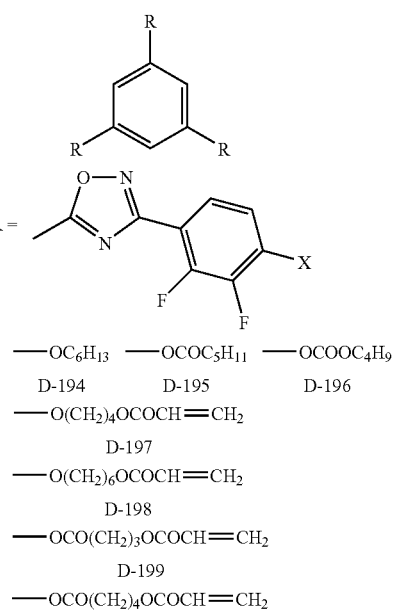

X = —OC₆H₁₃  —OCOC₅H₁₁  —OCOOC₄H₉
   D-194      D-195       D-196
—O(CH₂)₄OCOCH=CH₂
   D-197
—O(CH₂)₆OCOCH=CH₂
   D-198
—OCO(CH₂)₃OCOCH=CH₂
   D-199
—OCO(CH₂)₄OCOCH=CH₂
   D-200

—OCOO(CH₂)₂OCOCH=CH₂
   D-201
—OCOO(CH₂)₄OCOCH=CH₂
   D-202

-continued

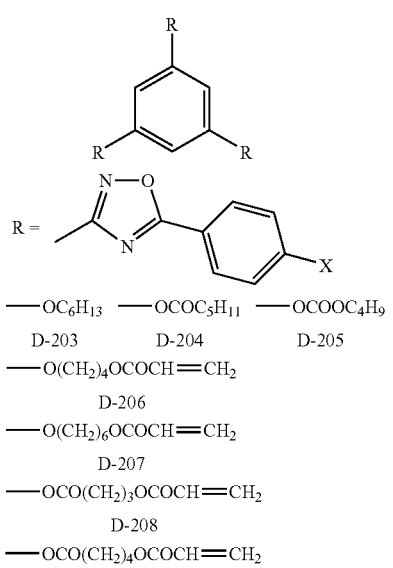

X = —OC₆H₁₃  —OCOC₅H₁₁  —OCOOC₄H₉
   D-203      D-204       D-205
—O(CH₂)₄OCOCH=CH₂
   D-206
—O(CH₂)₆OCOCH=CH₂
   D-207
—OCO(CH₂)₃OCOCH=CH₂
   D-208
—OCO(CH₂)₄OCOCH=CH₂
   D-209

—OCOO(CH₂)₂OCOCH=CH₂
   D-210
—OCOO(CH₂)₄OCOCH=CH₂
   D-211

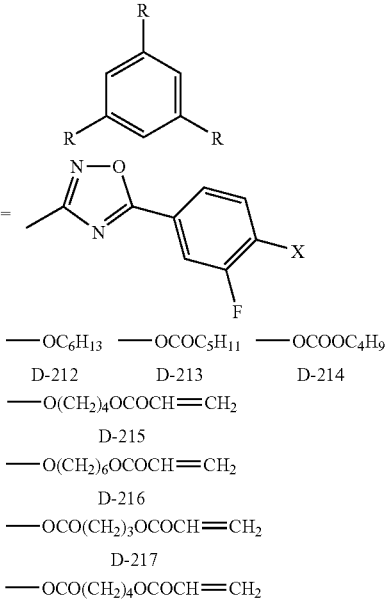

X = —OC₆H₁₃  —OCOC₅H₁₁  —OCOOC₄H₉
   D-212      D-213       D-214
—O(CH₂)₄OCOCH=CH₂
   D-215
—O(CH₂)₆OCOCH=CH₂
   D-216
—OCO(CH₂)₃OCOCH=CH₂
   D-217
—OCO(CH₂)₄OCOCH=CH₂
   D-218

—OCOO(CH₂)₂OCOCH=CH₂
   D-219
—OCOO(CH₂)₄OCOCH=CH₂
   D-220

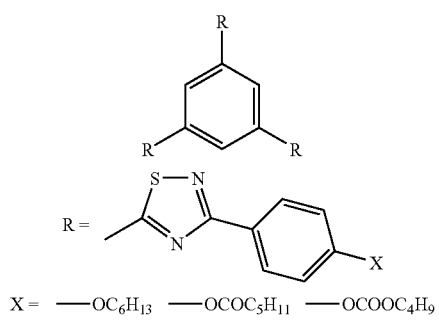
X = —OC₆H₁₃  —OCOC₅H₁₁  —OCOOC₄H₉
     D-221       D-222         D-223
—O(CH₂)₆OCOCH=CH₂
     D-224
—OCO(CH₂)₃OCOCH=CH₂
     D-225
—OCOO(CH₂)₄OCOCH=CH₂
     D-226
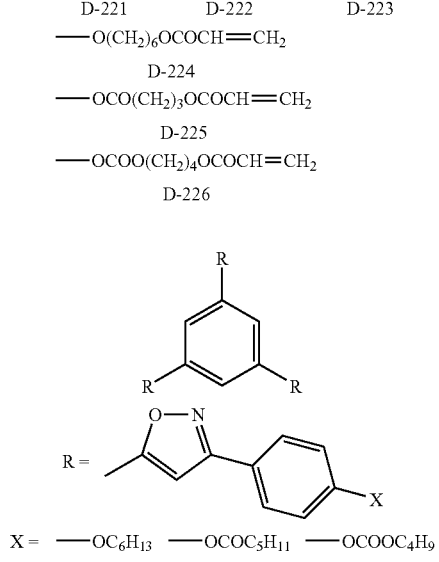
X = —OC₆H₁₃  —OCOC₅H₁₁  —OCOOC₄H₉
     D-227       D-228         D-229
—O(CH₂)₆OCOCH=CH₂
     D-230
—OCO(CH₂)₃OCOCH=CH₂
     D-231
—OCOO(CH₂)₄OCOCH=CH₂
     D-232
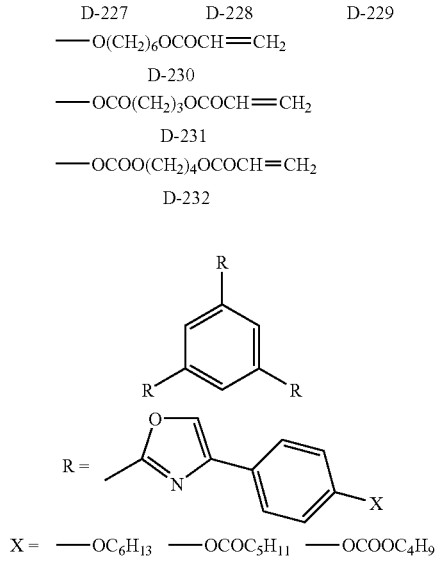
X = —OC₆H₁₃  —OCOC₅H₁₁  —OCOOC₄H₉
     D-233       D-234         D-235
—O(CH₂)₆OCOCH=CH₂
     D-236
—OCO(CH₂)₃OCOCH=CH₂
     D-237
—OCOO(CH₂)₄OCOCH=CH₂
     D-238
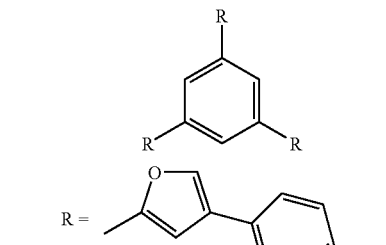
—O(CH₂)₆OCOCH=CH₂
     D-239
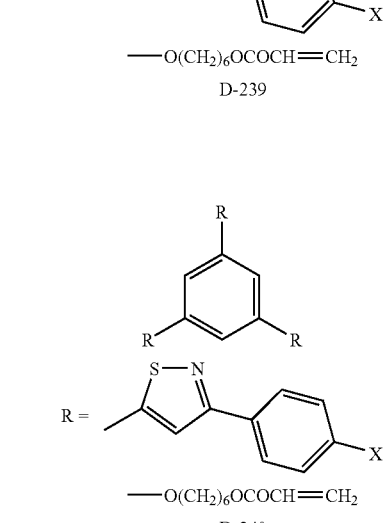
—O(CH₂)₆OCOCH=CH₂
     D-240
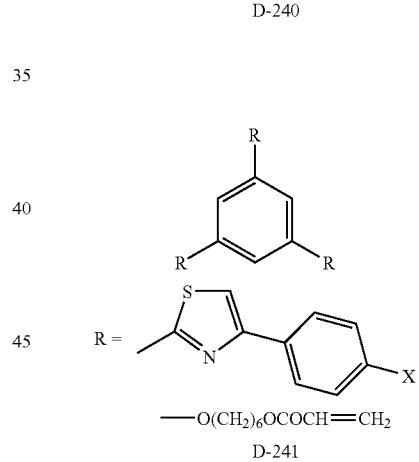
—O(CH₂)₆OCOCH=CH₂
     D-241
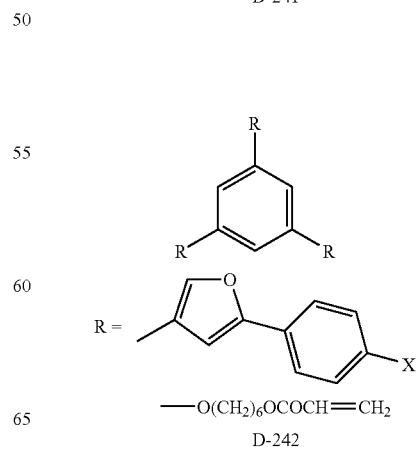
—O(CH₂)₆OCOCH=CH₂
     D-242

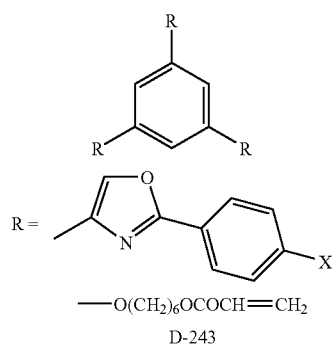
D-243
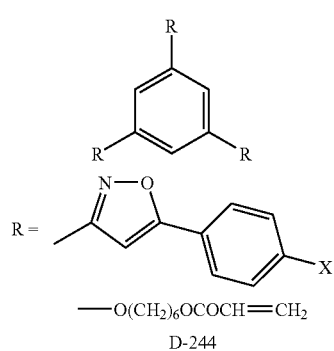
D-244
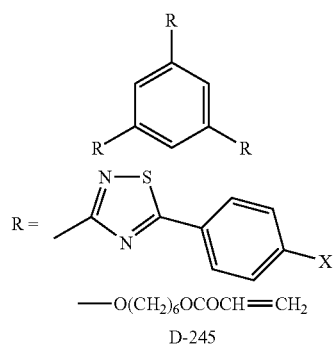
D-245
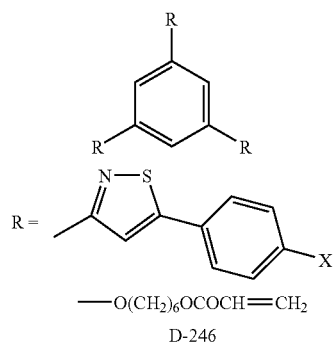
D-246
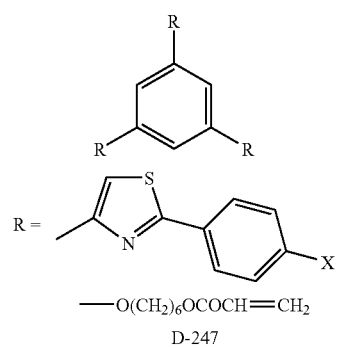
D-247
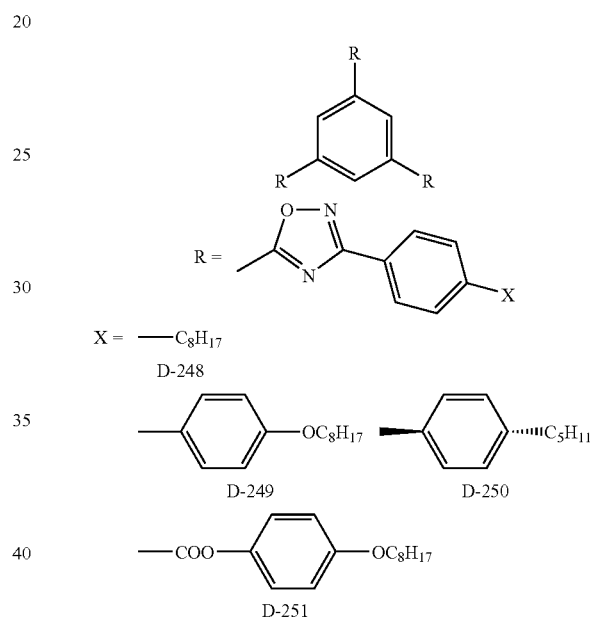
D-248, D-249, D-250, D-251, D-252
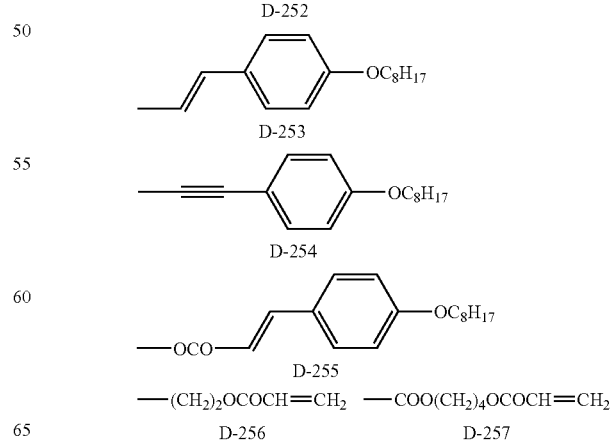
D-253, D-254, D-255, D-256, D-257

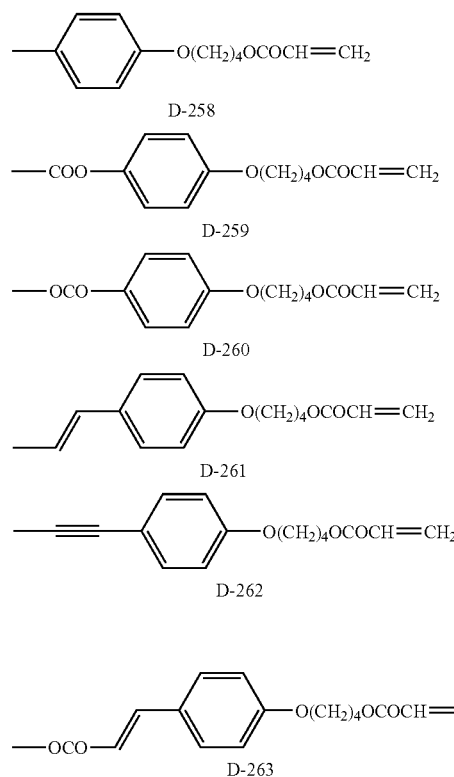
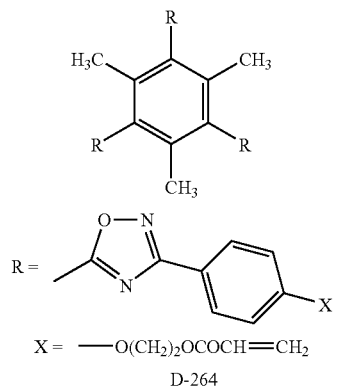
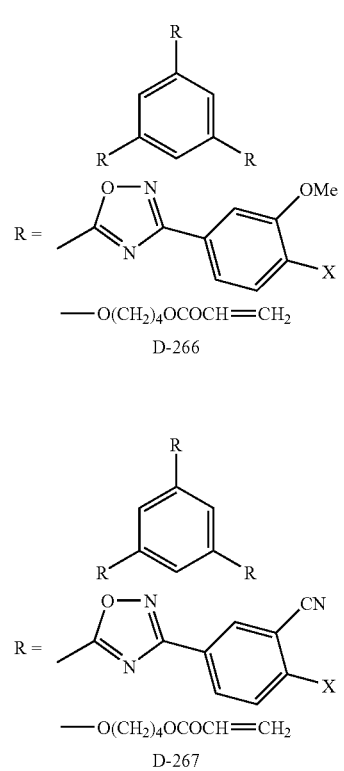
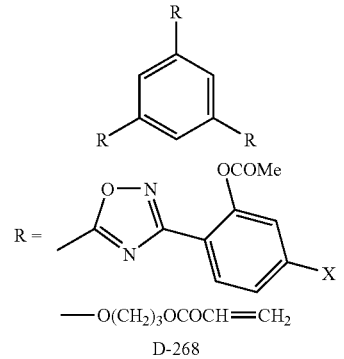
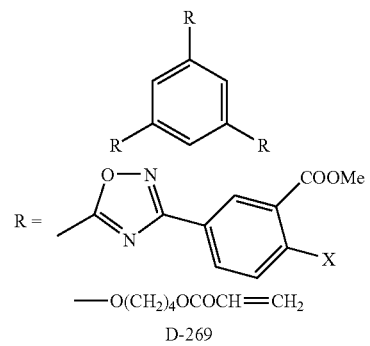

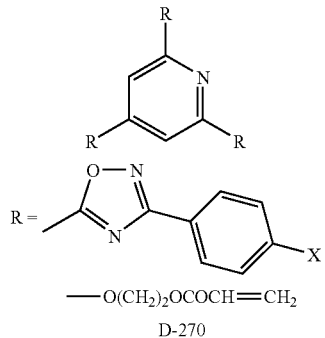
D-270
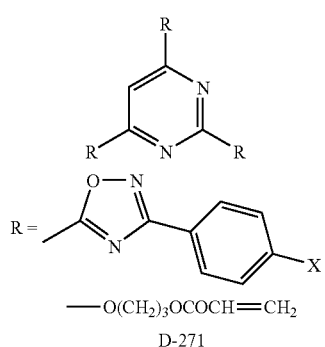
D-271
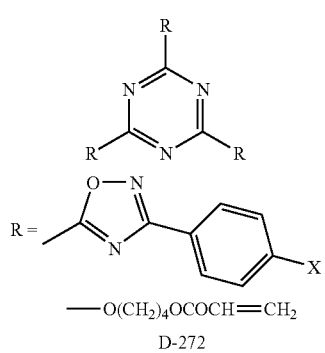
D-272
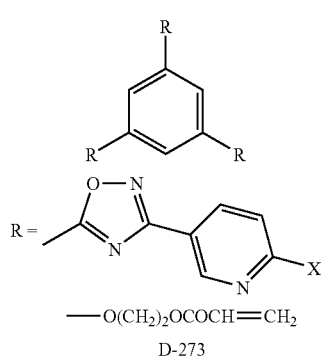
D-273
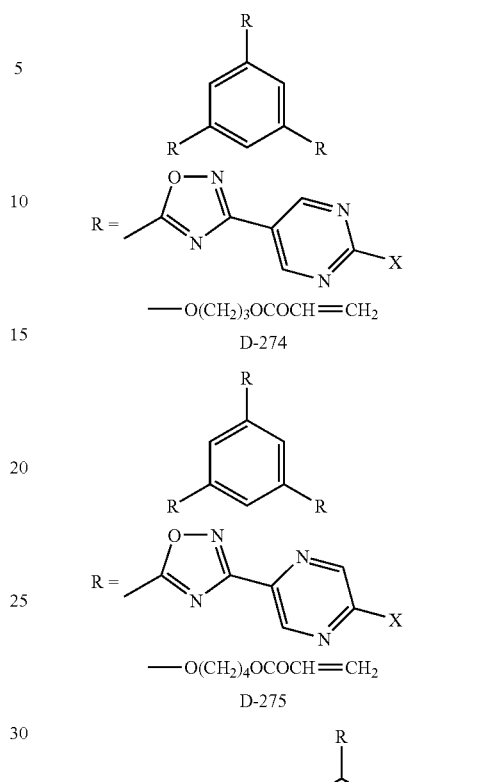
D-274
D-275
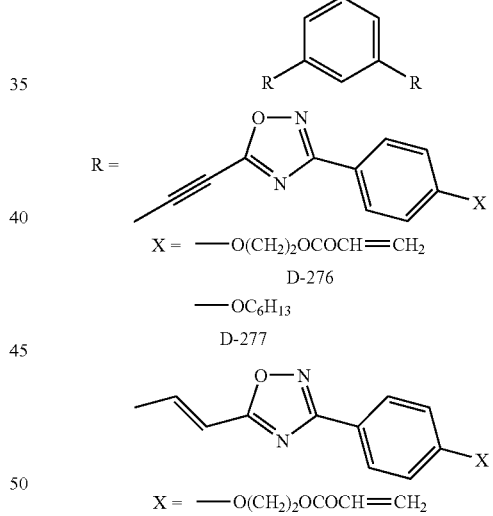
D-276
D-277
D-278
D-279
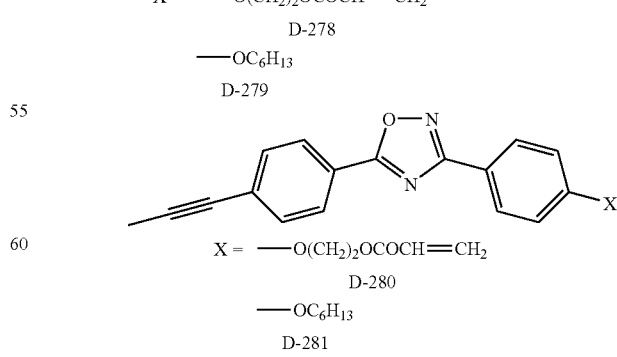
D-280
D-281

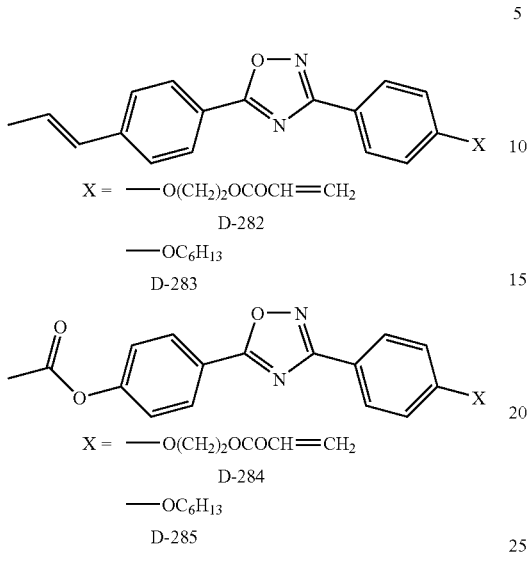
X = —O(CH₂)₂OCOCH=CH₂
D-282
—OC₆H₁₃
D-283
X = —O(CH₂)₂OCOCH=CH₂
D-284
—OC₆H₁₃
D-285
X = —O(CH₂)₂OCOCH=CH₂
D-286
—OC₆H₁₃
D-287
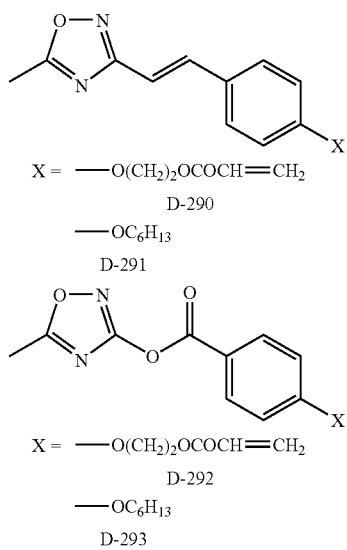
X = —O(CH₂)₂OCOCH=CH₂
D-290
—OC₆H₁₃
D-291
X = —O(CH₂)₂OCOCH=CH₂
D-292
—OC₆H₁₃
D-293
X = —O(CH₂)₂OCOCH=CH₂
D-294
—OC₆H₁₃
D-295
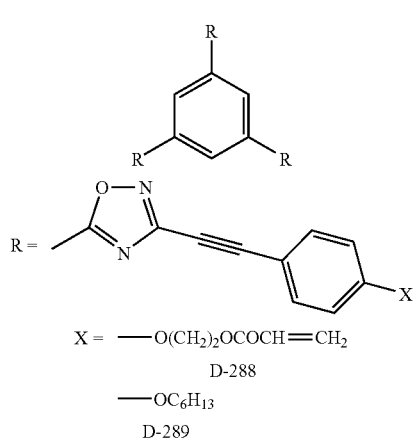
X = —O(CH₂)₂OCOCH=CH₂
D-288
—OC₆H₁₃
D-289
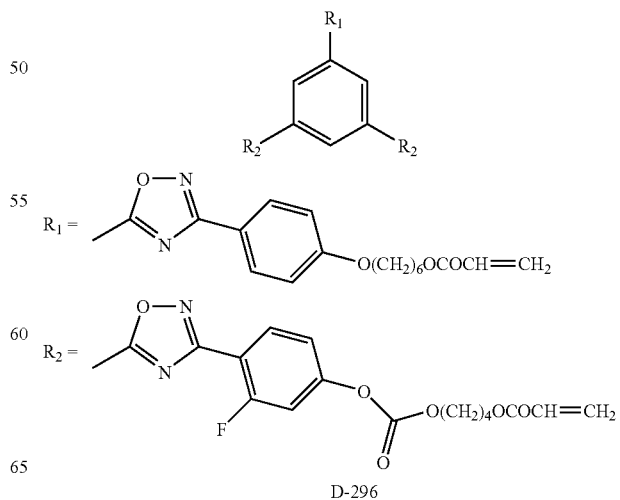
R₁ = <image of methyl oxadiazole phenyl with O(CH₂)₆OCOCH=CH₂>
R₂ = <image of methyl oxadiazole fluorophenyl carbonate with O(CH₂)₄OCOCH=CH₂>
D-296

-continued

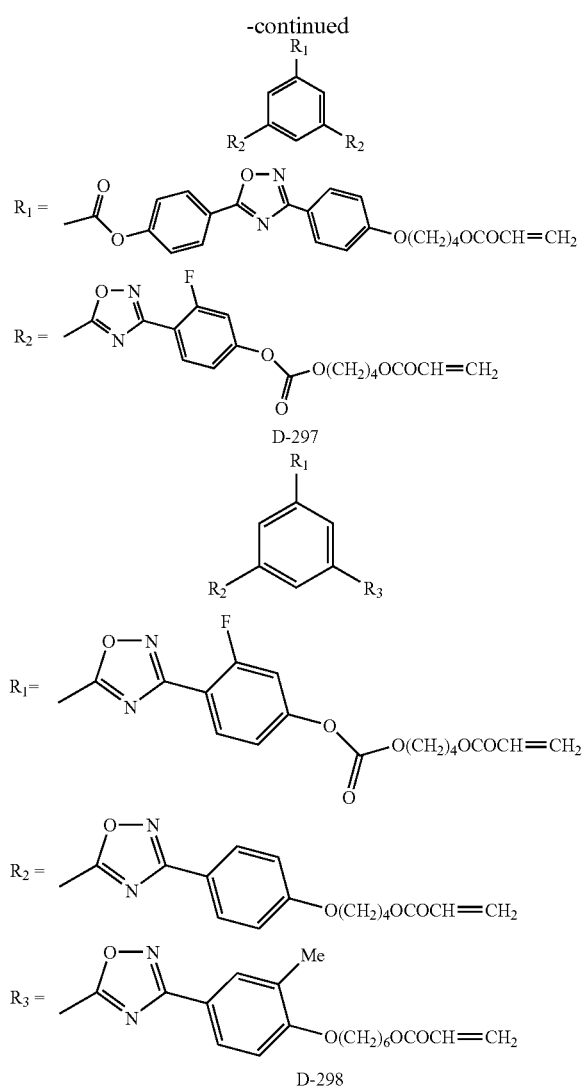

D-298

<Liquid Crystal Composition Containing Liquid Crystal R and Liquid Crystal D>

It is preferred for the liquid crystal composition in the invention containing liquid crystal R and liquid crystal D to exhibit a liquid crystal phase in the state of the mixture of liquid crystal R and liquid crystal D at a temperature of the range of from 20 to 300° C., more preferably from 40 to 280° C., and most preferably from 60 to 250° C. Here, "to exhibit a liquid crystal phase at 20 to 300° C." also includes a case of the liquid crystal temperature range being across 20° C. (specifically from 10 to 22° C.), and a case of being across 300° C. (specifically from 298 to 310° C.). It is also applied to the case of from 40 to 280° C. and the case of from 60 to 250° C.

It is preferred that the liquid crystal composition in the invention containing liquid crystal R and liquid crystal D is a liquid crystal composition exhibiting an optically biaxial liquid crystal phase. The biaxial liquid crystal phase is a liquid crystal phase which is different in the refractive indexes in triaxial directions nx, ny and nz, and, for example, satisfying the relationship of nx>ny>nz.

A biaxial film capable of controlling the refractive indexes in triaxial directions is useful in the optical field utilizing polarization. In particular, in the field of liquid crystal display, the importance of such a film capable of precisely controlling polarization is high. In preparing such an optically biaxial film, a method of obtaining the film by biaxially stretching a film obtained from a polymer is generally used (e.g., refer to JP-A-2-264905 (the term "JP-A" as used herein refers to an "unexamined published Japanese patent application")). For obtaining a biaxially stretched film by biaxial stretching, since the refractive indexes in the triaxial direction can be controlled by the stretching magnification, refractive indexes can be relatively easily controlled to desired refractive indexes.

A biaxial film using a biaxial liquid crystal has an advantage such that the film thickness can be extremely thinned as compared with biaxially stretched films so far been widely used, so that using a biaxial liquid crystal in a biaxial film is a useful means for thinning or light weighting of a device. Further, stretched films have various problems such that they are dimensionally unstable and optical performances are fluctuated by humidity and heat. Accordingly, there is a possibility of capable of solving such problems by using polymerizable biaxial liquid crystals.

However, in manufacturing a biaxial film with a biaxial liquid crystal, there arises a problem that the refractive indexes in the triaxial direction cannot be arbitrarily controlled. This is due to the fact that the refractive indexes in the triaxial direction of the obtained biaxial film are determined almost unconditionally by the refractive indexes in the triaxial direction of the a compound exhibiting a biaxial liquid crystal phase (a biaxial liquid crystal compound). That is, for adjusting the refractive indexes of a biaxial film in the three axis directions to desired levels, there is no more than a way of synthesizing a biaxial liquid crystal compound having desired refractive indexes. However, biaxial liquid crystal compounds are extremely few in number as compared with the compounds exhibiting a uniaxial liquid crystal phase (uniaxial liquid crystal compounds), therefore, it has been very difficult to arbitrarily control the refractive indexes in the three axis directions.

To avoid such a problem, it is proposed to blend rod-like liquid crystal with disc-like liquid crystal to thereby exhibit a biaxial liquid crystal phase (e.g., Y. Rabin et al., Cry. Liq. Cry., Vol. 89, p. 67 (1982). According to this method, the refractive indexes in the triaxial directions can be very easily controlled by the change of the blending ratio of rod-like liquid crystal and disc-like liquid crystal. However, as a result of the trial of developing a biaxial liquid crystal phase by the blending of rod-like liquid crystal and disc-like liquid crystal of this proposal (e.g., refer to R. Pratiba and N. V. Madhususana, Mol. Cry. Liq. Cry., Vol. 1, p. 111 (1985)), since the compatibility of the rod-like liquid crystal and disc-like liquid crystal is poor, a liquid crystal property vanishes in the blending of the two liquid crystals, or the phase separation of the two liquid crystals occurs, so that a biaxial liquid crystal phase cannot be exhibited by this blending system.

In the liquid crystal composition in the invention containing liquid crystal R and liquid crystal D, the blending ratio of liquid crystal R and liquid crystal D for developing a biaxial liquid crystal phase differs according to the molecular structures and the molecular weights of liquid crystal R and liquid crystal D, so that it cannot be defined decidedly, but liquid crystal R/liquid crystal D in mass ratio (weight ratio) is preferably from 10 to 0.02, more preferably from 5 to 0.05, and most preferably from 2 to 0.1.

A biaxial liquid crystal phase is exhibited in many cases at lower temperature as compared with a uniaxial liquid crystal phase. For example, a uniaxial nematic phase in many cases is susceptible to transition to a biaxial nematic phase by temperature down. In many cases, with a certain blending ratio (liquid crystal R/liquid crystal D) as a boundary, the transition from a rod-like nematic phase to a biaxial nematic phase occurs at the time of temperature down when the content of liquid crystal R increases a little. Incidentally, the transition from a discotic nematic phase to a biaxial nematic phase occurs when the content of liquid crystal D increases a little.

In the liquid crystal composition in the invention containing liquid crystal R and liquid crystal D, when a uniaxial nematic phase is on the high temperature side of a biaxial nematic phase, it is possible to control the value of (nx−nz)/(nx−ny) of the biaxial liquid crystal phase.

For instance, when temperature is lowered from a rod-like nematic phase ((nx−nz)/(nx−ny)=1.0), the value of (nx−nz)/(nx−ny) is liable to gradually increase according to the temperature not suddenly change. Accordingly, the value of (nx−nz)/(nx−ny) can be controlled by selecting the temperature for the fixation of orientation such as polymerization with UV irradiation. The latitude of control range of the value of (nx−nz)/(nx−ny) in the case of the transition from a rod-like nematic phase to a biaxial nematic phase fluctuates by the molecular structures and the like of liquid crystal R and liquid crystal D, so that it cannot be defined absolutely, but the range nearer to 1.0 is easy for the control. Specifically, 1.0<(nx−nz)/(nx−ny)<10 is easy for the control.

Similarly to the transition from a rod-like nematic phase to a biaxial nematic phase, in the case of the transition from a discotic nematic phase to a biaxial nematic phase, the control of the value of (nx−nz)/(nx−ny) is possible but in this case the value of (nx−nz)/(nx−ny) of a discotic nematic phase is ∞(nx−ny), so that the range nearer to a is easy for the control. Specifically, 1.2<(nx−nz)/(nx−ny)<∞ is easy for the control.

When the liquid crystal composition in the invention containing liquid crystal R and liquid crystal D develops an optically biaxial liquid crystal phase and the refractive indexes of the biaxial liquid crystal phase in three directions are taken as nx, ny and nz (nx>ny>nz), it is preferred for each value to satisfy the following equation (III), and more preferred to satisfy equation (VI). By satisfying the values of the ranges, the angle dependency of retardation can be controlled in accordance with liquid crystal displays.

$$1.1 \leq (nx-nz)/(nx-ny) \leq 20 \quad \text{(III)}$$

$$1.2 \leq (nx-nz)/(nx-ny) \leq 10 \quad \text{(VI)}$$

The liquid crystal composition in the invention containing liquid crystal R and liquid crystal D preferably has the above optical properties and, at the same time, is uniform and free from defects in orientation, and shows good mono-domain properties. When the mono-domain properties are poor, the obtained structure becomes poly-domain, which results in the generation of orientation defects at the boundary between domains to thereby cause light scattering. When a liquid crystal composition showing good mono-domain properties is used for a retardation plate, the retardation plate is liable to have high light transmittance.

As the biaxial liquid crystal phases exhibited by the liquid crystal composition in the invention containing liquid crystal R and liquid crystal D, a biaxial nematic phase, a biaxial smectic A phase, and a biaxial smectic C phase can be exemplified. Of these liquid crystal phases, a biaxial nematic phase (an Nb phase) showing good mono-domain properties is preferred. The biaxial nematic phase is one kind of a liquid crystal phase that a nematic liquid crystal compound can take, which shows a state wherein, when the space of the liquid crystal phase is defined by x-axis, y-axis and z-axis, free rotation of the liquid crystal compound around the y-axis in xz-plane and free rotation thereof around the z-axis in xy-plane are prohibited.

<Retardation Plate>

The retardation plate in the invention has an optical anisotropic layer comprising the liquid crystal composition of the invention on a transparent support. It is preferred to provide an orientation film between the transparent support and the optical anisotropic layer. It is preferred to obtain the optical anisotropic layer by adding, if necessary, other additives to the liquid crystal composition of the invention, coating the composition on the orientation film, and then fixing the orientation of the liquid crystal state.

The thickness of the optical anisotropic layer in the retardation plate of the invention is preferably from 0.1 to 20 μm, more preferably from 0.2 to 15 μm, and most preferably from 0.5 to 10 μm.

The retardation plate of the invention can be offered for the use of an elliptic polarizing plate by the combination with a polarizing film. Further, by applying to transmission type, reflection type, and semi-transmission type liquid crystal displays in combination with polarizing films, the retardation plate of the invention can contribute to the widening of a viewing angle of the liquid crystal displays.

When an optical anisotropic layer is formed with the liquid crystal composition of the invention, the direction of optical anisotropy differs by the state of liquid crystal orientation, so that it is necessary to control orientation according to use. For example, in a case of the liquid crystal composition of the invention exhibiting a biaxial nematic phase, the following cases are considered, i.e., (1) orientation of the nx direction and the normal line of a plane in parallel, (2) orientation of the ny direction and the normal line of a plane in parallel, (3) orientation of the nz direction and the normal line of a plane in parallel, and (4) others (hybrid orientation, etc.). For realizing each orientation, it is necessary to select proper compounds of the following orientation film and air interface orientation controller according to the orientation state.

The optical anisotropic layers obtained with the liquid crystal compositions of the invention are variously different according to the liquid crystal phases developed by the liquid crystal compositions and the states of the following-shown orientations. It is also preferred for the refractive index main values in three directions of an optical anisotropic layer to satisfy the following equation (III), similarly to the refractive index ratio of the biaxial liquid crystal phase, and it is more preferred to satisfy equation (VI).

$$1.1 \leq (nx-nz)/(nx-ny) \leq 20 \quad \text{(III)}$$

$$1.2 \leq (nx-nz)/(nx-ny) \leq 10 \quad \text{(VI)}$$

In the invention, in-plane retardation (retardation in a plane of the layer) in the orientation in (3) above shows reciprocal dispersiblity. Specifically, as more preferred range of wavelength dispersion, it is preferred to satisfy the following equations (A)-1 and (A)-2.

$$0.60 < R(450)/R(550) < 0.99 \quad \text{(A)-1}$$

$$1.01 < R(650)/R(550) < 1.35 \quad \text{(A)-2}$$

In the equations, R (450), R (550) and R (650) represent the retardation values at 450 nm, 550 nm and 650 nm respectively, provided that each measured wavelength contains errors within ±10 nm.

The angle dependency of retardation differs between a biaxial retardation plate comprising a transparent support having provided thereon a biaxial liquid crystal composition and a uniaxial retardation plate having provided a uniaxial liquid crystal composition. For example, in a retardation plate using a uniaxial liquid crystal composition, retardation in the direction of the normal line of a plane and that in the direction of the angle of several-ten degree from the normal line of a plane greatly differ (retardation becomes smaller by the inclination in the slow axis direction, and becomes greater by the inclination in the fast axis direction). On the other hand, in a case of a biaxial liquid crystal composition, the change rate of retardation differs from that in the uniaxial liquid crystal composition. In manufacturing retardation plates for various liquid crystal displays, the angle dependency of retardation should be controlled in accordance with the devices to be used. When a biaxial liquid crystal composition is used, the angle dependency of retardation can be arbitrarily controlled by changing the refractive index difference of nx, ny and nz, and the direction of orientation of each axis, and so very useful.

An optical anisotropic layer can be formed by once heating the liquid crystal composition of the invention to a temperature at which a liquid crystal phase is formed, and then cooling with maintaining the state of orientation and fixing it without impairing the mode of orientation in its liquid crystal state. An optical anisotropic layer can also be formed by heating the liquid crystal composition of the invention to which a polymerization initiator has been added to a temperature at which a liquid crystal phase is formed, polymerizing and then fixing the orientation in its liquid crystal state by cooling.

In the invention, the most typical and preferred embodiment of the state where orientation is fixed is a state where the orientation is maintained, however, the invention is not restricted thereto. Specifically, it means such a state that, under the condition of usually from 0 to 50° C., more severely −30 to 70° C., the fixed liquid crystal composition shows no fluidity, does not undergo fluctuation in the state of orientation when outer field or outer force is applied thereto, and can stably maintain the fixed orientation form. Incidentally, when orientation state is finally fixed and an optical anisotropic layer is formed, the liquid crystal composition of the invention is not required to show a liquid crystal property any more. For example, since a compound having a polymerizable group is used as the liquid crystal compound, the compound may lose a liquid crystal property with the advancement of polymerization or cross-linking by heat or light resulting in a high molecular weight compound.

<Air Interface Orientation Controller>

A biaxial liquid crystal compound is oriented at a tilt angle of air interface at the air interface. For example, in the case of a biaxial liquid crystal composition, there are three kinds of tilt angles, i.e., a tilt angle between nx refractive index direction and the air interface, a tilt angle between ny refractive index direction and the air interface, and a tilt angle between nz refractive index direction and the air interface.

The degree of a tilt angle varies depending upon the kind of the liquid crystal compound contained in the liquid crystal composition and the blending ratio when two or more compounds are used, and hence it is necessary to arbitrarily control the air interface tilt angle according to the end use.

In order to control the tilt angle, outer fields such as an electric field and a magnetic field or additives may be used, with the use of additives being preferred. As such additives, compounds having in the molecule one or more substituted or unsubstituted aliphatic groups having from 6 to 40 carbon atoms or one or more oligosiloxanoxy groups substituted with a substituted or unsubstituted aliphatic group having from 6 to 40 carbon atoms are preferred, and compounds having two or more such groups in the molecule are more preferred. As the air interface orientation controller, the hydrophobic excluded volume effect compounds as disclosed in JP-A-2002-20363 can be used.

The amount of orientation-controlling additives on the air interface side is preferably from 0.001 to 20 mass % (weight %) to the liquid crystal composition of the invention, more preferably from 0.01 to 10 mass %, and most preferably from 0.1 to 5 mass %.

<Repelling Preventive>

As a material to be added to the biaxial liquid crystal composition of the invention for preventing repellency upon coating the composition, high molecular compounds are generally preferably used.

Such polymers are not especially restricted so long as they do not seriously inhibit the change in inclined angle or the orientation of the liquid crystal compound in the invention.

The examples of the polymers are disclosed in JP-A-8-95030 and, as particularly preferred specific polymer examples, cellulose esters can be exemplified. The examples of the cellulose esters include cellulose acetate, cellulose acetate propionate, hydroxypropyl cellulose and cellulose acetate butyrate.

In order not to inhibit orientation of the liquid crystal composition of the invention, the amount of the polymers to be used for the purpose of preventing repellency is generally in a range of from 0.1 to 10 mass % (weight %) to the liquid crystal composition in the invention, more preferably in a range of from 0.1 to 8 mass %, and still more preferably from 0.1 to 5 mass %.

<Polymerization Initiator>

In the invention, the liquid crystal composition is preferably fixed in a mono-domain orientation, i.e., in a substantially uniformly aligned state. Therefore, in the case where the compound contained in liquid crystal R and/or liquid crystal D has a polymerizable group, it is preferred to fix the liquid crystal composition by polymerization reaction.

The polymerization reaction includes a thermal polymerization reaction using a thermal polymerization initiator, a photo-polymerization reaction using a photo-polymerization initiator, and a polymerization reaction by irradiation with an electron beam. In order to prevent deformation and changes of properties of a support due to heat, photo-polymerization reaction and polymerization by irradiation with an electron beam are preferred.

The examples of the photo-polymerization initiators include α-carbonyl compounds (disclosed in U.S. Pat. Nos. 2,367,661 and 2,367,670), acyloin ether (disclosed in U.S. Pat. No. 2,448,828), α-hydrocarbon-substituted aromatic acyloin compounds (disclosed in U.S. Pat. No. 2,722,512), polynuclear quinone compounds (disclosed in U.S. Pat. Nos. 3,046,127 and 2,951,758), a combination of a triarylimidazole dimer and a p-aminophenylketone (disclosed in U.S. Pat. No. 3,549,367), acridine and phenazine compounds (disclosed in JP-A-60-105667 and U.S. Pat. No. 4,239,850), and oxadiazole compounds (disclosed in U.S. Pat. No. 4,212,970).

The amount of the photo-polymerization initiator is preferably from 0.01 to 20 mass % (weight %) based on the solids content of a coating solution for forming an optical anisotropic layer, and more preferably from 0.5 to 5 mass %.

Light to be used for irradiation to cause polymerization is preferably UV ray. The irradiation energy is preferably from 10 mJ to 50 J/cm$^2$, and more preferably from 50 to 800 mJ/cm$^2$. In order to accelerate the photo-polymerization reaction, irradiation with light may be performed under heating. Also, since the oxygen concentration in the atmosphere influences polymerization degree, it is preferred to reduce oxygen concentration by a method of, for example, displacing the atmosphere by nitrogen in the case where the polymerization degree does not reach a desired level in the air. The oxygen concentration is preferably 10% or less, more preferably 7% or less, and most preferably 3% or less.

<Polymerizable Monomer>

Polymerizable monomers may be added to the liquid crystal composition of the invention. The polymerizable monomers to be used in the invention are not especially limited so long as they have a proper compatibility with the compound contained in liquid crystal R and liquid crystal D in the invention and do not cause serious change in inclined angles or orientation of the liquid crystal composition. Of these monomers, compounds having a polymerization-active ethylenically unsaturated group such as a vinyl group, a vinyloxy group, an acryloyl group or a methoacryloyl group are preferably used. The addition amount of the polymerizable monomers is in a range of generally from 0.5 to 50 mass % (weight %) by weight based on the liquid crystal compound, and preferably from 1 to 30 mass % by weight. Also, the use of a monomer having two or more reactive functional groups is particularly preferred because an effect of enhancing adhesion between the orientation film and the optical anisotropic layer is expected.

<Coating Solvent>

As the solvents to be used for preparing the liquid crystal composition of the invention, organic solvents are favorably used. The examples of the organic solvents include amides (e.g., N,N-dimethylformamide), sulfoxides (e.g., dimethyl sulfoxaide), heterocyclic compounds (e.g., pyridine), hydrocarbons (e.g., toluene and hexane), alkyl halides (e.g., chloroform and dichloromethane), esters (e.g., methyl acetate and butyl acetate), ketones (e.g., acetone, methyl ethyl ketone, methyl isobutyl ketone and cyclohexanone), ethers (e.g., tetrahydrofuran and 1,2-dimethoxyethane). Of these organic solvents, alkyl halides, esters and ketones are preferably used. It is also possible to use two or more of the organic solvents in combination.

<Coating Method>

An optical anisotropic layer is formed by preparing a coating solution of the liquid crystal composition using the above-described solvent, and coating the resulting coating solution on an orientation film to attain orientation of the liquid crystal composition. Coating of the coating solution can be conducted according to well-known methods (e.g., a wire bar coating method, an extrusion coating method, a direct gravure coating method, a reverse gravure coating method or a die coating method).

<Orientation Film>

An orientation film can be formed by rubbing treatment of an organic compound (preferably a polymer), oblique evaporation of an inorganic compound, formation of a, layer having micro grooves, or accumulation of an organic compound (e.g., ω-tricosanoic acid, methyl stearate) according to a Langmuir-Blodgett's technique (LB film). Further, there are known orientation films whose orienting function can be activated by applying an electric or magnetic field to the film or by irradiation of the film with light.

The orientation film may be any film that can impart a desired orientation to the liquid crystal composition of the optical anisotropic layer to be provided on the orientation film. In the invention, however, the orientation films formed by rubbing a polymer or irradiation with light are preferably used. The orientation film formed by rubbing treatment of a polymer is especially preferred. The rubbing treatment can be generally performed by the rubbing of the surface of a polymer layer several times in a definite direction with paper or cloth. In the invention, it is especially preferred to perform the rubbing treatment according to the method described in *Ekisho Binran* (*Liquid Crystal Handbook*), Maruzen Co., Ltd. The thickness of the orientation film is preferably from 0.01 to 10 μm, and more preferably from 0.05 to 3 μm.

<Rubbing Density of Orientation Film>

Between rubbing density of an orientation film and pretilt angle of a liquid crystal compound at the interface with the orientation film exists a relationship that, when the rubbing density is increased, there results a decreased pretilt angle, whereas when the rubbing density is decreased, there results an increased pretilt angle. Therefore, the pretilt angle can be adjusted by changing the rubbing density of the orientation film.

As a method for changing the rubbing density of the orientation film, the methods described in *Ekisho Binran* (*Liquid Crystal Handbook*), compiled by Ekisho Binran Compilation Committee, published by Maruzen Co., Ltd. (2000) can be used. The rubbing density (L) is determined by the following equation (A):

$$L = Nl(1+(2\pi rn/60v))$$

In equation (A), N represents a rubbing number, 1 represents a contact length of a rubbing roller, r represents a radius of the roller, n represents a rotation number (rpm), and v represents a stage-migrating speed (per second). In order to increase the rubbing density, it suffices to increase the rubbing number, lengthen the contact length of the rubbing roller, enlarge the radius of the roller, increase the rotation number, or slow down the stage-migrating speed, whereas in order to decrease the rubbing density, it suffices to perform reverse procedure.

<Transparent Support>

The transparent support of the retardation plate of the invention is not particularly limited as to material so long as it is optically isotropic and has a light transmittance of 80% or more, but a polymer film is preferred.

As the specific examples of the polymer films, films of cellulose esters (e.g., cellulose diacetate, cellulose triacetate), norbornene polymers, and a poly(meth)acrylate esters can be exemplified. Many commercially available products can be preferably used. Of these polymers, cellulose esters are preferred in view of optical performance, and lower fatty acid esters of cellulose are more preferred. The lower fatty acid means a fatty acid having 6 or less carbon atoms, and the number of carbon atoms is preferably 2 (cellulose acetate), 3 (cellulose propionate) or 4 (cellulose butyrate). Cellulose triacetate is particularly preferred. It is also possible to use a mixed fatty acid ester such as cellulose acetate propionate and cellulose acetate butyrate. Also, conventionally known polymers that are liable to exhibit birefringence such as polycarbonate or polysulfone may be used by modifying with the molecule described in WO 00/26705 to thereby reduce birefringence-developing properties.

The cellulose acylate (in particular, cellulose triacetate) preferably used as a transparent support is described in detail below.

As the cellulose acylate, cellulose acetate having an acetylation degree of from 55.0 to 62.5% is preferred. In particular, cellulose acetate having an acetylation degree of from 57.0 to 62.0% is more preferred. The term "acetylation degree"

means the amount of bound acetic acid per unit mass (weight) of cellulose. The acetylation degree is measured and calculated according to measurement and calculation prescribed in ASTM D817-91 (Testing method on cellulose acetate, etc.). The viscosity average molecular weight (DP) of the cellulose ester is preferably 250 or more, and more preferably 290 or more. Also, the cellulose ester to be used in the invention preferably has a narrow molecular weight distribution in terms of Mw/Mn (Mw: weight average molecular weight, Mn: number average molecular weight) measured by gel permeation chromatography. The specific Mw/Mn value is preferably from 1.0 to 1.7, more preferably from 1.3 to 1.65, and most preferably 1.4 to 1.6.

With the cellulose acylate, hydroxyl groups at 2-, 3- and 6-positions of cellulose do not uniformly share the total substitution degree each with ⅓ of the total substitution, and the substitution degree of 6-position hydroxyl group tends to be smaller. It is preferred that the substitution degree of 6-position hydroxyl group is larger than that of 2- and 3-position hydroxyl groups. It is preferred that the substitution degree with acyl groups of the 6-position hydroxyl group accounts for 30 to 40% of the total substitution degree, more preferably 31% or more, and especially preferably 32% or more. The substitution degree of the 6-position is preferably 0.88 or more. The 6-position hydroxyl group may be substituted with an acyl groups having 3 or more carbon atoms (e.g., propionyl, butyryl, valeroyl, benzoyl or acryloyl) other than acetyl groups. The substitution degree at each position can be determined by NMR. Cellulose esters having a high substitution degree at 6-position hydroxyl group can be synthesized by reference to Synthesis Example 1 described in JP-A-11-5851, paragraphs 0043 to 0044, Synthesis Example 2 described in paragraphs 0048 to 0049, and Synthesis Example 3 described in paragraphs 0051 to 0052.

In order to adjust retardation of the polymer film to be used as a transparent support, particularly a cellulose acylate film, it is possible to use an aromatic compound having at least two aromatic rings as a retardation-increasing agent. In the case of using such a retardation-increasing agent, the retardation-increasing agent is used in an amount of from 0.01 to 20 mass parts (weight parts) per 100 mass parts of cellulose acylate. The retardation-increasing agent is used in an amount of preferably from 0.05 to 15 mass parts per 100 mass parts of cellulose acylate, and more preferably from 0.1 to 10 mass parts. Two or more aromatic compounds may be used in combination.

The aromatic ring of the aromatic compound includes an aromatic hetero ring as well as an aromatic hydrocarbon ring.

The aromatic hydrocarbon ring is especially preferably a 6-membered ring (i.e., benzene ring).

The aromatic hetero ring is generally an unsaturated hetero ring. The aromatic hetero ring is preferably a 5-, 6- or 7-membered ring, and more preferably a 5- or 6-membered ring. The aromatic hetero ring generally has the maximum number of double bonds. As the hetero atom, a nitrogen atom, an oxygen atom and a sulfur atom are preferred, and a nitrogen atom is especially preferred.

As the aromatic rings, a benzene ring, a furan ring, a thiophene ring, a pyrrole ring, an oxazole ring, a thiazole ring, an imidazole ring, a triazole ring, a pyridine ring, a pyrimidine ring, a pyrazine ring, and a 1,3,5-triazine ring are preferred, and a benzene ring and a 1,3,5-triazine ring are more preferred. It is particularly preferred for the aromatic compound to have at least one 1,3,5-triazine ring.

The examples of the aromatic hetero rings include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyran ring, a pyridine ring, a pyridazine ring, a pyrimidine ring, a pyrazine ring, and a 1,3,5-triazine ring.

The number of aromatic rings contained in the aromatic compound is preferably from 2 to 20, more preferably from 2 to 12, still more preferably from 2 to 8, and most preferably 2 to 6. The bonding relationships between two aromatic rings are classified into: (a) a case of forming a condensed ring, (b) a case of directly bonding to each other through a single bond, and (c) a case of bonding to each other through a linking group (spiro bonding cannot be formed due to aromatic ring). The bonding relationship may be any of (a) to (c). Such retardation-increasing agents are disclosed, for example, in WO 01/88574A1, WO 00/2619A1, JP-A-2000-111914, JP-A-2000-275434, and Japanese Patent Application No. 2002-70009.

It is preferred to manufacture the cellulose acylate film by a solvent casting process from a prepared cellulose acylate solution (dope). The retardation-increasing agent may be added to the dope.

The dope is cast onto a drum or a band to evaporate the solvent and form a film. The concentration of the dope before casting is preferably adjusted so that the solid content becomes from 18 to 35%. The surface of the drum or band is preferably finished in a mirror state. Casting and drying method in the solvent casting process are disclosed in U.S. Pat. Nos. 2,336,310, 2,367,603, 2,492,078, 2,492,977, 2,492,978, 2,607,704, 2,739,069, 2,739,070, British Patents 640,731, 736,892, JP-B-45-4554 (the term "JP-B" as used herein refers to an "examined Japanese patent publication"), JP-B-49-5614, JP-A-60-176834, JP-A-60-203430, and JP-A-62-115035.

The dope is preferably cast on a drum or a band having a surface temperature of 10° C. or less. After casting, it is preferred to apply wind for 2 seconds or longer to dry. It is also possible to strip the thus formed film from the drum or band and dry with a wind having a temperature consecutively changed from 100 to 160° C. This method is described in JP-B-5-17844. This method permits to shorten the time of from casting to stripping. In order to carry out this method, it is necessary for the dope to gel at a surface temperature of the drum or the band upon casting.

It is also possible to form a film by casting two or more layers using a prepared cellulose acylate solution (dope). The dope is cast onto a drum or a band to evaporate the solvent and form a film. It is preferred to adjust the concentration of the dope before casting so that the solid content becomes from 10 to 40%. The surface of the drum or band is preferably finished in a mirror state.

In the case of casting a plurality of cellulose acylate solutions, the film may be formed by providing a plurality of casting slits in a direction along which the support is conveyed with a space between the slits, and casting the solutions containing cellulose acylate through respective casting slits to form a laminate film. For example, the methods as disclosed in JP-A-61-158414, JP-A-1-122419, and JP-A-11-198285 can be employed. It is also possible to form a film by casting a cellulose acylate solution through two casting slits. For example, the methods as disclosed in JP-B-60-27562, JP-A-61-94724, JP-A-61-104813, JP-A-61-158413, and JP-A-6-134933 can be used. A method of casting for forming a cellulose acetate film by enclosing a flow of a high viscous cellulose acetate solution with a low viscous cellulose acetate solution and co-extruding both the high viscous cellulose acetate solution and the low viscous cellulose acetate solution as described in JP-A-56-162617 can also be used.

Retardation of a cellulose acylate film may be adjusted by stretching treatment. The draw ratio is preferably in a range of from 0 to 100%. In the case of stretching the cellulose acylate film for use in the invention, tenter stretching is preferably used. For the purpose of controlling the slow axis with high accuracy, it is preferred that difference between the left side and the right side in tenter clipping speed and releasing timing should be minimized.

A plasticizer may be added to a cellulose acylate film in order to improve mechanical properties or accelerate drying speed. As such plasticizers, phosphoric acid esters or carboxylic acid esters are used. The examples of the phosphoric acid esters include triphenyl phosphate (TPP), diphenylbiphenyl phosphate and tricresyl phosphate (TCP). The typical examples of the carboxylic acid esters are phthalates and citrates. The examples of the phthalates include dimethyl phthalate (DMP), diethyl phthalate (DEP), dibutyl phthalate (DBP), dioctyl phthalate (DOP), diphenyl phthalate (DPP), and di-2-ethylhexyl phthalate (DEHP). The examples of the citrates include triethyl O-acetylcitrate (OACTE) and tributyl O-acetylcitrate (OACTB). The examples of other carboxylic acid esters include butyl oleate, methyl acetyl ricinoleate, dibutyl sebacate, and various trimellitic acid esters. The phthalic acid ester series plasticizers (e.g., DMP, DEP, DBP, DOP, DPP and DEHP) are preferably used. DEP and DPP are especially preferred. The addition amount of the plasticizer is preferably from 0.1 to 25 mass % (weight %) based on the amount of the cellulose ester, more preferably from 1 to 20 mass %, and most preferably 3 to 15 mass %.

To the cellulose acylate film may be added deterioration-preventing agents (e.g., an antioxidant, a peroxide-decomposing agent, a radical inhibitor, a metal-inactivating agent, an acid capturing agent and an amine) and UV ray-preventing agent. The deterioration-preventing agents are disclosed in JP-A-3-199201, JP-A-5-197073, JP-A-5-194789, JP-A-5-271471 and JP-A-6-107854. The addition amount of the deterioration-preventing agent is preferably from 0.01 to 1 mass % (weight %) based on the weight of a prepared solution (dope), and more preferably from 0.01 to 0.2 mass %. If the addition amount is less than 0.01 mass %, there results scarce effects of the deterioration-preventing agent. If the addition amount exceeds 1 mass %, bleed-out phenomenon of the deterioration-preventing agent onto the film surface is sometimes observed.

As a particularly preferred example of the deterioration-preventing agent, butylated hydroxytoluene (BHT) is exemplified. As to UV ray-preventing agent, descriptions are found in JP-A-7-11056.

The cellulose acylate film is preferably subjected to surface treatment. The specific examples of the treatment include corona discharge treatment, glow discharge treatment, flame treatment, acid treatment, alkali treatment and UV ray-irradiating treatment. Also, as is described in JP-A-7-333433, it is favorably utilized to provide an undercoat layer.

In view of maintaining flat properties of the film, the temperature of cellulose acylate film in these treatments is preferably maintained under Tg (glass transition temperature), specifically preferably 150° C. or lower.

In view of adhesion properties to an orientation film and the like, it is particularly preferred to perform acid treatment or alkali treatment, i.e., saponification treatment of cellulose acylate. The alkali saponification treatment is specifically described below. The alkali saponification treatment is carried out preferably by a cycle of dipping the film surface in an alkali solution, neutralizing in an acidic solution, washing with water, and drying. As the alkali solution, a solution of potassium hydroxide and a solution of sodium hydroxide are exemplified. The normal concentration of the hydroxide ion is in a range of preferably from 0.1 to 3.0 N, and more preferably from 0.5 to 2.0 N. The temperature of the alkali solution is in a range of preferably from room temperature to 90° C., and more preferably from 40 to 70° C.

The surface energy of the cellulose acylate film is preferably 55 mN/m or more, and preferably in a range of from 60 to 75 mN/m.

The surface energy can be determined according to a contact angle method, a wetting heat method, and an adsorption method as described in *Nure no Kiso to Oyo* (*The Elements and Applications of Wetting*), Realize Advanced Technology Limited (Dec. 10, 1989). In the case of the cellulose acylate film for use in the invention, a contact angle method is preferably used. Specifically, two kinds of solutions whose surface energies are already known are dripped onto a cellulose acylate film, at the point of intersection of the surface of the droplet and the film surface, the angle containing the droplet is defined as a contact angle of the angle formed by the tangent line drawn on the droplet and the film surface, and the surface energy of the film can be found from the calculation.

The thickness of the cellulose acetate film is usually in a range of from 5 to 500 μm, preferably in a range of from 20 to 250 μm, more preferably in a range of from 30 to 180 μm, and particularly preferably in a range of from 30 to 110 μm.

<Elliptic Polarizing Plate>

The elliptic polarizing plate can be prepared by laminating the retardation plate of the invention and a polarizing film. An elliptic polarizing plate capable of enlarging the viewing angle of a liquid crystal display can be provided by the use of the retardation plate of the invention.

As the polarizing films, an iodine series polarizing film, a dye series polarizing film using a dichroic dye, and a polyene series polarizing film are exemplified. The iodine series polarizing film and the dye series polarizing film are generally produced with a polyvinyl alcohol series film. The polarizing axis of the polarizing film corresponds to the direction perpendicular to the stretching direction of the film.

The polarizing film is laminated on the optical anisotropic layer side of the retardation plate. It is preferred to form a transparent protective film on the side of the polarizing film opposite to the side on which the retardation plate is laminated. The transparent protective film has a light transmittance of preferably 80% or more. As the transparent protective film, a cellulose ester film is generally used, with a triacetyl cellulose film being preferred. It is preferred to form the cellulose ester film by the solvent casting method. The thickness of the transparent protective film is preferably from 20 to 500 μm, and more preferably from 50 to 200 μm.

<Liquid Crystal Display>

A liquid crystal display having an enlarged viewing angle can be provided with the utilization of the retardation plate of the invention. A retardation plate for TN mode liquid crystal cell (optically compensatory sheet) is described in JP-A-6-214116, U.S. Pat. Nos. 5,583,679, 5,646,703 and German Patent 3,911,620A1. An optically compensatory sheet for IPS mode or FLC mode liquid crystal cell is disclosed in JP-A-10-54982. Further, an optically compensatory sheet for OCB mode or HAN mode liquid crystal cell is described in U.S. Pat. No. 5,805,253 and WO 96/37804. Still further, an optically compensatory sheet for STN mode liquid crystal cell is disclosed in JP-A-9-26572, and an optical compensatory sheet for VA mode liquid crystal cell is disclosed in Japanese Patent No. 2866372.

In the invention, retardation plates (optically compensatory sheets) for liquid crystal cells of various modes can be prepared by reference to the above publications. The retardation plate of the invention can be used for liquid crystal displays of various display modes such as TN (Twisted Nematic) mode, IPS (In-Plane Switching) mode, FLC (Ferroelectric Liquid Crystal) mode, OCB (Optically Compensatory Bend) mode, STN (Super Twisted Nematic) mode, VA (Vertically Aligned) mode and HAN (Hybrid Aligned Nematic) mode.

A liquid crystal display comprises a liquid crystal cell, a polarizing element and a retardation plate (optically compensatory sheet). The polarizing element generally comprises a polarizing film and a protective film. As the polarizing film and the protective film, those described with respect to the elliptic polarizing plate can be used.

The invention will be described with reference to Examples, but the invention is not limited thereto.

Example 1

Synthesis of Compound (D-9)

Compound (D-9) was synthesized according to the following reaction scheme.

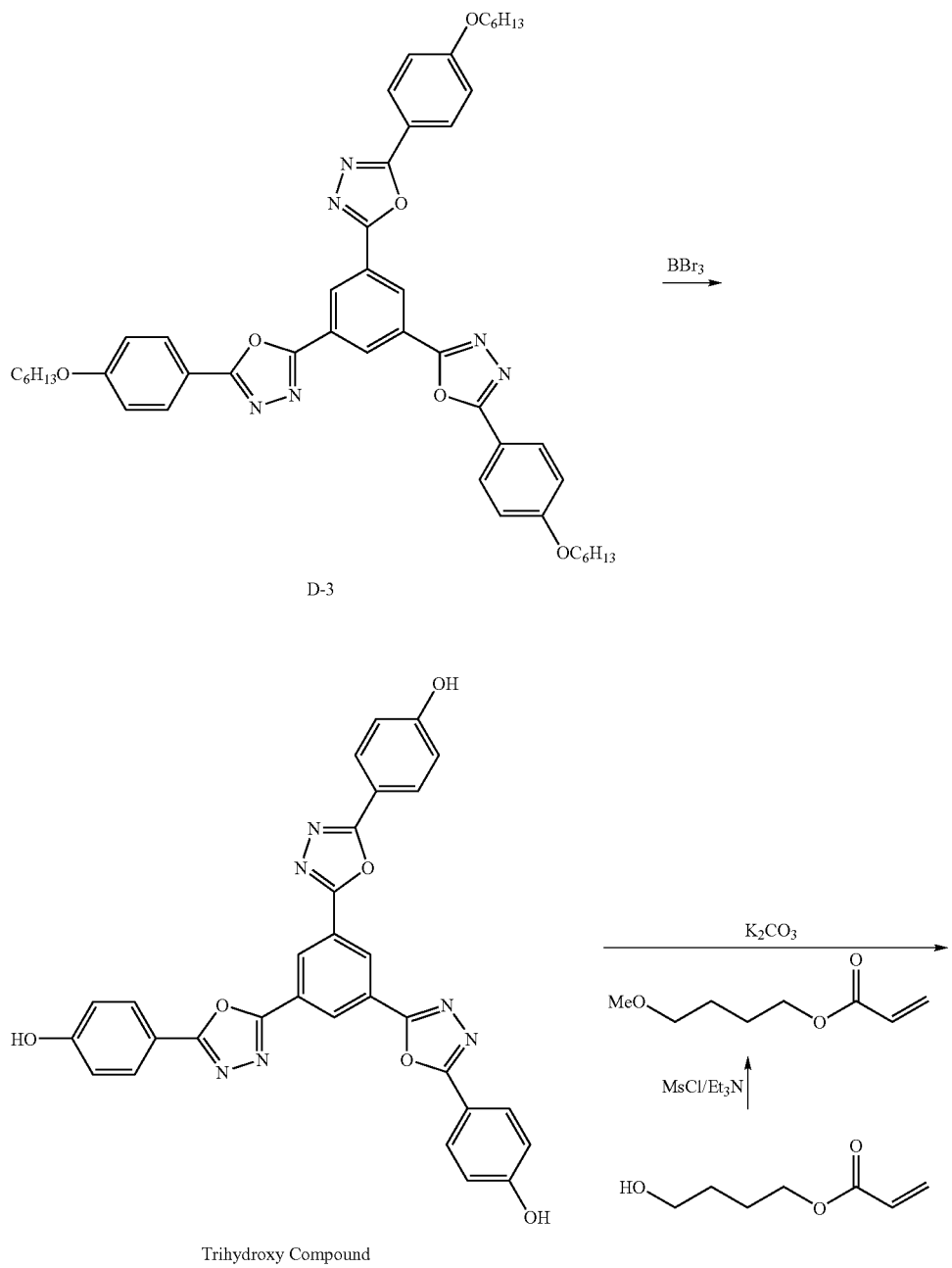

-continued

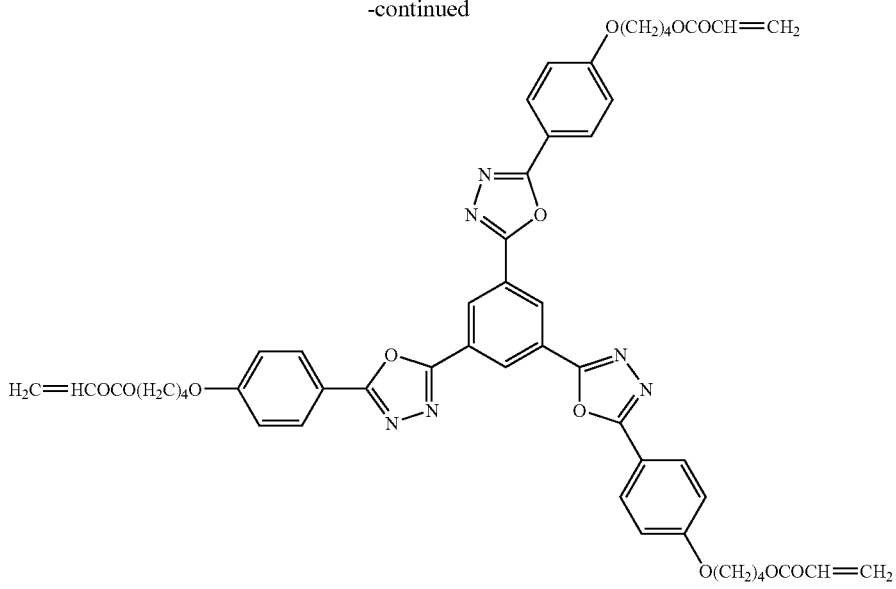

D-9

Five point zero (5.0) grams of compound (D-3) synthesized according to the method described in Kim and Bong Gi, *Molecular Crystals and Liquid Crystals*, Vol. 370, p. 391 (2001) was dissolved in 106 ml of $CH_2Cl_2$, and 75 ml of boron tribromide (a 1.0M $CH_2Cl_2$ solution) was added to the solution. After stirring the reaction solution at 40° C. for 12 hours, water was added to the reaction solution, and the precipitated crystal was recovered by filtration. By drying the crystal, 3.0 g of a trihydroxy compound was obtained.

After dissolving 6.5 g of 4-hydroxybutyl acrylate and 8.0 g of triethylamine in 100 ml of ethyl acetate, a solution obtained by dissolving 4.2 g of methanesulfonyl chloride in 50 ml of ethyl acetate was dropwise added to the above solution at reaction temperature of 30° C. or less. After stirring the reaction solution for 0.5 hours, an ethyl acetate layer was washed by the addition of 100 ml of water. After solution separation, the ethyl acetate layer was distilled off, and 0.5 g of the above trihydroxy compound, 0.8 g of potassium carbonate and dimethylformamide were added to the reaction solution, followed by stirring at 100° C. for 5 hours. Water was added to the reaction solution and extracted with $CH_2Cl_2$, the organic layer was concentrated and purified with column chromatography, whereby 0.7 g of compound (D-9) was obtained as a crystal.

$^1$H-NMR (solvent: $CDCl_3$, standard: tetramethylsilane) δ (ppm): 1.70-1.90 (6H, m), 1.90-2.00 (6H, m), 3.95-4.30 (12H, m), 5.80 (3H, d), 6.14 (3H, dd), 6.43 (3H, d), 7.08 (6H, d), 8.13 (6H, d), 9.02 (3H, s)

The phase transition temperature of the obtained compound (D-9) was observed by texture observation with a polarizing microscope. Phase transition from a crystal phase to a columnar phase of (D-9) was observed around 131° C. by gradually increasing the temperature, further from the columnar phase to a discotic nematic phase near 134° C., and when the temperature exceeded 138° C., the transition to an isotropic liquid phase was confirmed. That is, (D-9) developed a liquid crystal phase between 131° C. and 138° C., in particular, a discotic nematic phase was developed between 134° C. and 138° C.

Compound (D-9) (containing 0.1 wt % of hydroquinone monomethyl ether) was poured into a horizontal orientation cell (KSRP-10/A107MINSS (ZZ), manufactured by EHC) having a cell gap of 10 μm at 150° C., and subjected to homeotropic orientation at 130° C. It was found from the measurement of the angle dependency of retardation and observation with a conoscope that (D-9) exhibited a liquid crystal phase having a negative birefringence property.

Example 2

Synthesis of Compound (D-8)

Compound (D-8) was synthesized according to the following reaction scheme.

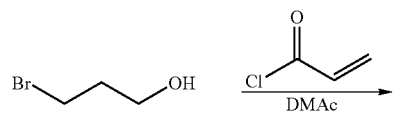

-continued

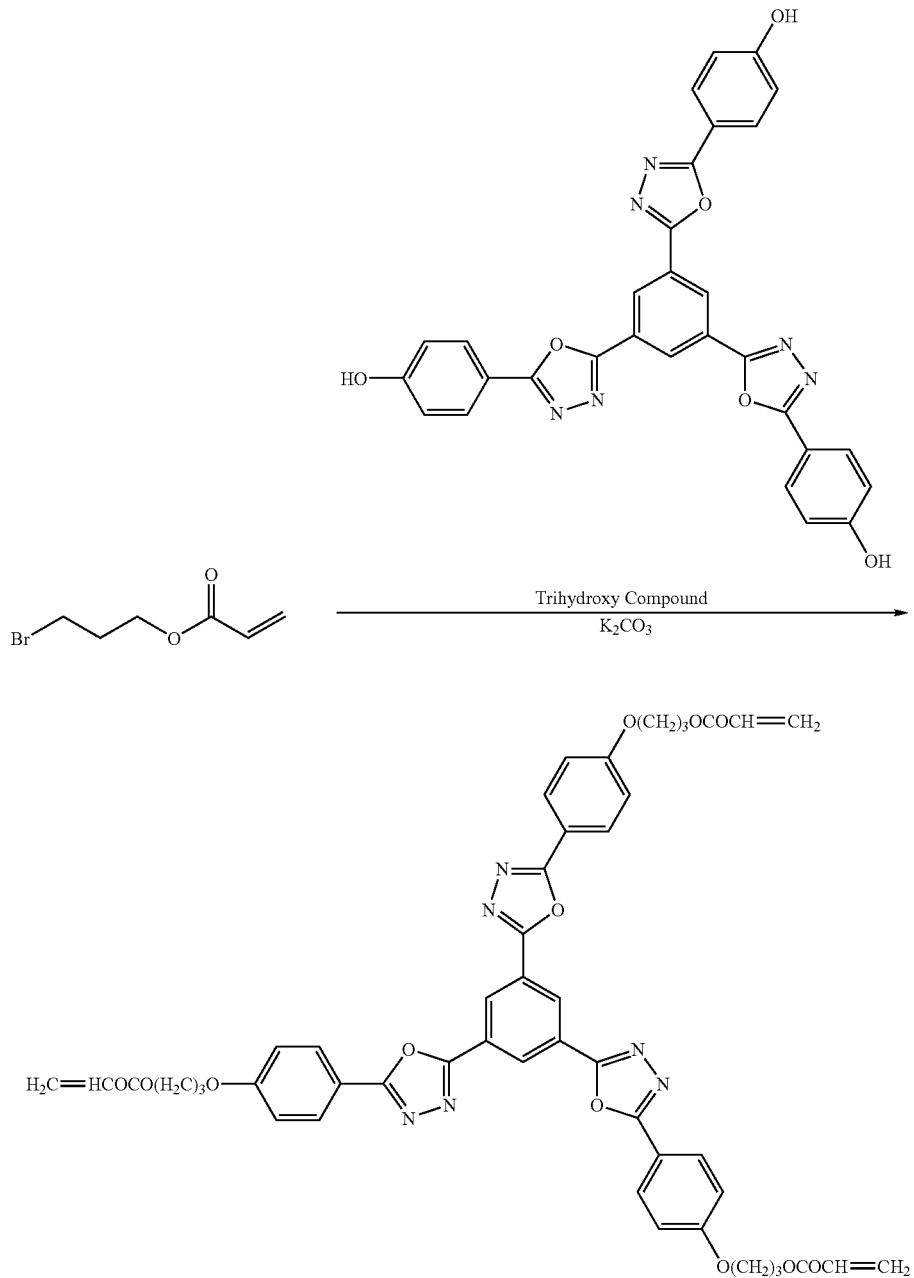

D-8

After dissolving 5.0 g of 3-bromo-1-propanol in 20 ml of dimethylacetamide, 3.8 ml of acryloyl chloride was dropwise added thereto at a reaction temperature of 40° C. or less. After stirring for one hour, 200 ml of water was added and the reaction solution was extracted with, ethyl acetate/hexane. After solution separation, the organic layer was distilled off, and 0.5 g of the trihydroxy compound in Example 1, 2.0 g of potassium carbonate and dimethylformamide were added to the reaction solution, followed by stirring at 100° C. for 10 hours. Water was added to the reaction solution and extracted with $CH_2Cl_2$, the organic layer was concentrated and purified with column chromatography, whereby 0.8 g of compound (D-8) was obtained as a crystal.

$^1$H-NMR (solvent: $CDCl_3$, standard: tetramethylsilane) δ (ppm): 2.15-2.30 (6H, m), 4.18 (6H, t), 4.43 (6H, t), 5.86 (3H, d), 6.16 (3H, dd), 6.45 (3H, d), 7.08 (6H, d), 8.16 (6H, d), 9.02 (3H, s)

The phase transition temperature of the obtained compound (D-8) was observed by texture observation with a polarizing microscope. Phase transition from a crystal phase to a discotic nematic phase of (D-8) was observed around 125° C. by gradually increasing the temperature, and when the temperature exceeded 149° C., the transition to an isotropic liquid phase was confirmed. That is, (D-8) exhibited a discotic nematic phase between 125° C. and 149° C.
Example 3
Synthesis of Compound (G-50)
Compound (G-50) was synthesized according to the following reaction scheme.
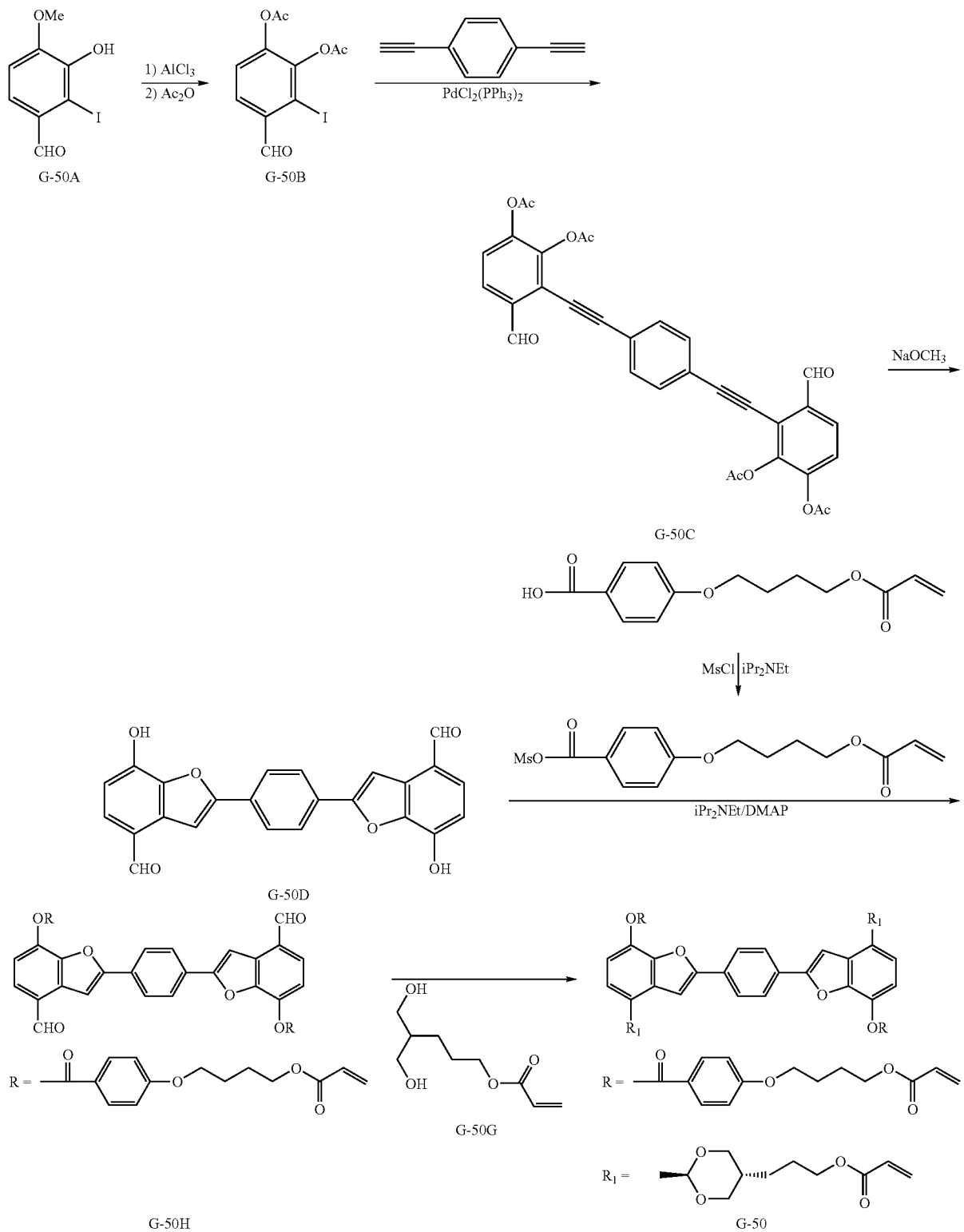

-continued

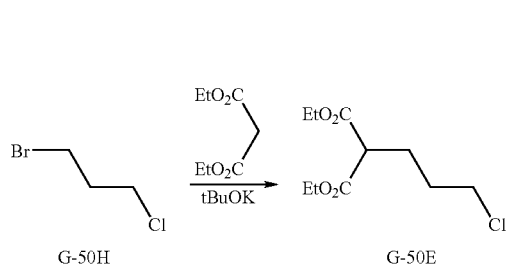 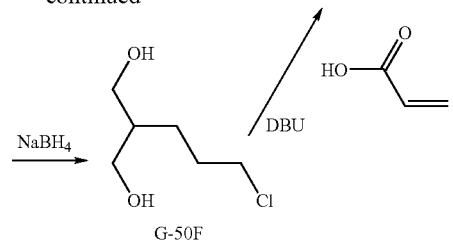

(Synthesis of Compound (G-50B))

After dissolving 10 g of compound (G-50A) synthesized according to the method described in *J. Med. Chem.*, Vol. 35, p. 466 (1992) in 100 ml of 1,2-dichloroethane, 6.0 g of aluminum chloride and 12.7 ml of pyridine were added thereto, and the solution was stirred at 60° C. for 4 hours. After the addition of dilute hydrochloric acid, the reaction solution was extracted with ethyl acetate, and then the solvent was distilled off. To the obtained crystal were added 50 ml of pyridine and 10 ml of acetic anhydride, and the solution was stirred at room temperature for 12 hours. Cool water was added to the reaction solution, the precipitated crystal was filtered out and dried, whereby 8.5 g of compound (G-50B) was obtained as a crystal.

(Synthesis of Compound (G-50C))

To 3.9 g of (G-50B), 0.67 g of 1,4-diethynylbenzene, 0.20 g of bis(triphenylphosphine)palladium(II) dichloride, and 52 mg of copper(I) iodide were added 80 ml of triethylamine and 30 ml of dimethylformamide, and the mixture was stirred under a nitrogen atmosphere at 70° C. for 5 hours. After cooling the reaction solution, the precipitated crystal was filtered, washed with methanol and dried, whereby 1.3 g of compound (G-50C) was obtained as a crystal.

(Synthesis of Compound (G-50D))

To 1.30 g of (G-50C) were added 200 ml of ethanol and 10 ml of sodium methoxide (a 28% methanol solution), the reaction mixture was stirred at 60° C. for 1 hour, and then refluxed for 6 hours. After the inner temperature was lowered to 50° C., water was added until the precipitated crystal was dissolved, and then hydrochloric acid was added. The precipitated crystal was filtered out and dried, whereby 0.8 g of compound (G-50D) was obtained as a crystal.

(Synthesis of Compound (G-50E))

1-Bromo-3-chloropropane (16.2 g) and 15.0 g of diethyl malonate were dissolved in 100 ml of ethanol, and then 10.5 g of potassium t-butoxy was added thereto, and the reaction mixture was refluxed for 2 days. After cooling the reaction solution, dilute hydrochloric acid was added thereto, and extracted with ethyl acetate. After distilling off the ethyl acetate, the reaction product was purified with column chromatography, whereby 9.0 g of compound (G-50E) was obtained.

(Synthesis of Compound (G-50F))

Compound (G-50E) (9.0 g) was dissolved in 350 ml of methanol, and then the solution was heated to 55° C., and 20 g of sodium boron hydride was added thereto little by little. After stirring the reaction solution for 1 hour, water was added and the methanol was distilled off, and the solution was extracted with ethyl acetate. By distilling off the obtained organic layer, 5.9 g of compound (G-50F) was obtained.

(Synthesis of Compound (G-50G))

Compound (G-50F) (5.9 g), 5.6 g of acrylic acid, and 11.8 g of DBU were dissolved in 150 ml of toluene, and the solution was refluxed for 1 hour. After cooling the reaction solution, extraction was carried out by adding ethyl acetate. After distilling off the solvent, the reaction product was purified with column chromatography, whereby 5.5 g of compound (G-50G) was obtained.

(Synthesis of Compound (G-50H))

Methanesulfonyl chloride (1.38 g) was dissolved in 20 ml of tetrahydrofuran, and the solution was cooled to 0° C. To the solution was dropwise added 50 ml of a tetrahydrofuran solution containing 3.18 g of 4-(4-acryloyloxybutyloxy)-benzoic acid and 2.2 ml of diisopropylethylamine. After stirring the reaction solution at 0° C. for 1 hour, 2.2 ml of diisopropylethylamine and 0.02 g of 4-dimethylaminopyridine were added, and then 20 ml of a tetrahydrofuran solution containing 0.80 g of (G-50C). The reaction solution was stirred at room temperature for 12 hours, and then 500 ml of methanol was added to the reaction solution, and the precipitated crystal was filtered out. The obtained crystal was dried, and then purified with column chromatography, whereby 1.70 g of compound (G-50H) was obtained as a crystal.

(Synthesis of Compound (G-50))

1,2-Dichloroethane (20 ml) was added to 1.0 g of (G-50H), 0.80 g of (G-50G), and 0.10 g of p-toluenesulfonic acid, and the mixed solution was stirred at 100° C. for 1 hour. After cooling, the reaction solution was purified with column chromatography, whereby 0.85 g of (G-50) was obtained as a crystal. The NMR spectrum analysis of the obtained (G-50) was as follows.

$^1$H-NMR (solvent: CDCl$_3$, standard: tetramethylsilane) δ (ppm): 1.20-1.33 (4H, m), 1.70-1.80 (4H, m), 1.90-2.00 (8H, m), 2.20-2.35 (2H, m), 3.68 (4H, t), 4.10-4.40 (16H, m), 5.71 (2H, s), 5.80-5.90 (4H, m), 6.10-6.20 (4H, m), 6.40-6.50 (4H, m), 7.01 (4H, d), 7.16 (2H, d), 7.32 (2H, s), 7.37 (2H, d), 7.83 (4H, s), 8.25 (4H, d)

The phase transition temperature of the obtained compound (G-50) was observed by texture observation with a polarizing microscope. Phase transition from a crystal phase to an isotropic liquid phase was observed around 175° C. by gradually increasing the temperature. And then, phase transition from the liquid phase to a nematic phase was observed around 165° C. by gradually lowering the temperature from 180° C., and when the temperature was lowered to near 120° C., the transition from the nematic phase again to a crystal phase was confirmed. That is, (G-50) exhibits a nematic phase between 165° C. and about 120° C. at the time of temperature down.

<Measurement of Wavelength Dispersibility and Birefringence Property>

A polyimide series liquid crystal orientation material (SE-150, manufactured by Nissan Chemical Industries, Ltd.) was diluted with γ-butyrolactone and the obtained solution was coated on a glass plate. The coated film was dried at 80° C. for 15 minutes, heated at 250° C. for 60 minutes, and then cooled. After cooling, the layer was subjected to rubbing treatment for forming an orientation film. The thickness of the obtained orientation film was 0.1 μm. Compound (G-50) (50 mg) and 0.2 mg of the following shown additive SH-1 were dissolved in 0.5 ml of chloroform, and the obtained solution was coated by spin coating on the above glass plate having provided thereon the orientation film. The obtained sample was heated at 150° C. by a hot stage (MP200DMSH, manufactured by KITAZATO SUPPLY CO., LTD.). The retardation of the sample was found with KOBRA-WR (manufactured by Oji Scientific Instruments), and each Δn that was found from the separately measured film thickness was: Δn (450 nm)=0.036, Δn (550 nm)=0.043, and Δn (650 nm)=0.047. That is, Δn (450 nm)/Δn (550 nm)=0.84, and Δn (650 nm)/Δn (550 nm)=1.09. From the measurement of the angle dependency of retardation, it was found that the sample exhibited a liquid crystal phase having a positive birefringence property.

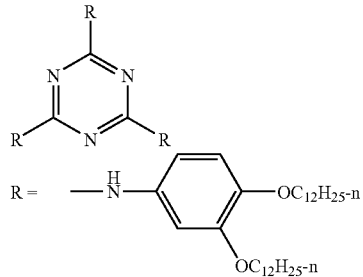

SH-1

Example 4

Manufacture of Retardation Plate (Preparation of Orientation Film)

A 5 mass % (weight %) solution was prepared by dissolving the following polyvinyl alcohol and glutaraldehyde (5 mass % of modified polyvinyl alcohol) in a mixed solvent of methanol/water (volume ratio: 20/80).

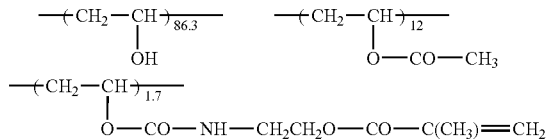

The above-prepared solution was coated on a glass substrate and, after being dried with hot air at 100° C. for 120 seconds, the coated film was subjected to rubbing treatment to form an orientation film. The thickness of the obtained orientation film was 0.8 μm.

(Preparation of Optical Anisotropic Layer)

On the above-prepared rubbing-treated orientation film, an optical anisotropic layer-coating solution having the composition shown below was coated with a spin coater.

| (Coating solution for forming optical anisotropic layer) | |
|---|---|
| Liquid crystal compound (D-8) | 62.0 mass parts (weight parts) |
| Liquid crystal compound (G-50) | 38.0 pass parts |
| Air interface orientation controller SH-1 | 0.2 mass part |
| Irgacure 907 (manufactured by Ciba Geigy Japan Limited) | 1.0 mass part |
| Chloroform | 700 mass parts |

The above glass substrate having coated thereon an optical anisotropic layer was heated with a hot plate of 150° C.; cooled to 80° C., and the glass substrate was retained at that temperature for 5 minutes. In the next place, the glass substrate was irradiated with UV ray at 600 mJ, to thereby fix the orientation state of the optical anisotropic layer. The substrate was allowed to cool to room temperature to form a retardation plate. The thickness of the optical anisotropic layer was about 1.0 μm.

The retardations of the retardation plate obtained with KOBRA-WR (manufactured by Oji Scientific Instruments) were: R (450 nm)=36.5 nm, R (550 nm)=39.8 nm, R (650 nm)=40.3 nm.

The measurement of retardation was performed by inclining the polarizing plate with the rubbing direction as the axis, as a result, R (550 nm)=46.1 nm in the inclination of 20°, and R (550 nm)=67.7 nm in the inclination of 40°. Further, the measurement of retardation was performed by inclining the polarizing plate with the orthogonal direction in the rubbing direction as the axis, R (550 nm)=29.1 nm in the inclination of 20°, and R (550 nm) 6.6 nm in the inclination of 40°.

From these results, it can be found that the retardation plate manufactured with the liquid crystal composition according to the invention exhibits biaxial properties and the in-plane retardation exhibits reciprocal dispersibility.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-60480, filed Mar. 4 of 2005, respectively, the contents of which are incorporated herein by reference.

The invention claimed is:

1. A liquid crystal composition comprising:
a liquid crystal R exhibiting a liquid crystal phase having a positive birefringence property; and
a liquid crystal D exhibiting a liquid crystal phase having a negative birefringence property,
wherein the liquid crystal phase exhibited by the liquid crystal R has a characteristic birefringence Δn (λ) at wavelength λ, the characteristic birefringence Δn (λ) satisfying equation (II):

$\Delta n(450 \text{ nm})/\Delta n(550 \text{ nm}) < 1.0$;

wherein the liquid crystal D comprises a compound represented by formula (D-2):

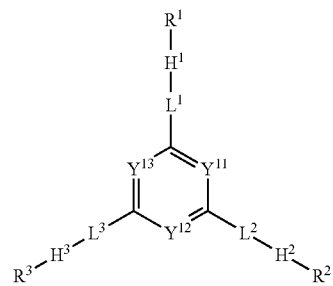

wherein $Y^{11}$, $Y^{12}$ and $Y^{13}$ each independently represents methine or a nitrogen atom; $H^1$, $H^2$ and $H^3$ each independently represents a divalent 5-membered cyclic group; $L^1$, $L^2$ and $L^3$ each independently represents a single bond or a divalent linking group; and $R^1$, $R^2$ and R³ each independently represents an alkyl group, an alkenyl group, an alkynyl group, an aryl group, a substituted or unsubstituted amino group, an alkoxyl group, an aryloxy group, an acyl group, an alkoxycarbonyl group, an aryloxycarbonyl group, an acyloxy group, an acylamino group, an alkoxycarbonylamino group, an aryloxycarbonylamino group, an alkylsulfonylamino group, an arylsulfonylamino group, a sulfamoyl group, a carbamoyl group, an alkylthio group, an arylthio group, an alkylsulfonyl group, an arylsulfonyl group, an alkylsulfinyl group, an arylsulfinyl group, a ureido group, a phosphoric acid amido group, a hydroxyl group, a mercapto group, a halogen atom, a cyano group, a sulfo group, a carboxyl group, a nitro group, a hydroxamic acid group, a sulfino group, a hydrazino group, an imino group, a heterocyclic group, or a silyl group; and wherein the liquid crystal R comprises a compound represented by formula (GI):

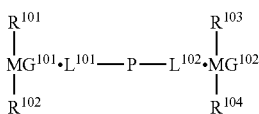

wherein $MG^{101}$ and $MG^{102}$ each independently represents a liquid crystal core part containing 2 to 8 cyclic groups for inducing an exhibition of the liquid crystal phase of the liquid crystal R, and each ring of the 2 to 8 cyclic groups in the liquid crystal core part is an aromatic ring, an aliphatic ring or a heterocyclic ring;

one cyclic group of the 2 to 8 cyclic groups in $MG^{101}$ is substituted with $L^{101}$, and one cyclic group of the 2 to 8 cyclic groups in $MG^{102}$ is substituted with $L^{102}$;

$R^{101}$ and $R^{102}$ each independently represents a flexible substituent, a dipole-acting group, or a hydrogen-bonding group, which are substituted in a molecular long axis direction of the liquid crystal core $MG^{101}$ and induce an exhibition of the liquid crystal phase of the liquid crystal R, and $R^{103}$ and $R^{104}$ each independently represents a flexible substituent, a dipole-acting group, or a hydrogen-bonding group, which are substituted in a molecular long axis direction of the liquid crystal core $MG^{102}$ and induce an exhibition of the liquid crystal phase of the liquid crystal R; and $L^{101}$ represents a linking group substituted on the liquid crystal core part $MG^{101}$, $L^{102}$ represents a linking group substituted on the liquid crystal core part $MG^{102}$, and $L^{101}$ and $L^{102}$ each independently is a group represented by one of formulae (GI)-LA and (GI)-LB:

(GI)-LA:

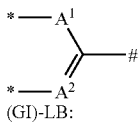

(GI)-LB:

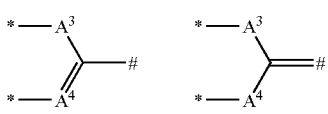

wherein * represents a position of substitution on the cyclic group $MG^{101}$ or $MG^{102}$;

# represents the position to be linked to a substituent P;

$A^1$, $A^3$ and $A^4$ each independently represents —O—, —NH—, —S—, —CH₂—, —CO—, —SO— or —SO₂

$A^2$ represents —CH= or —N=;

in the case where $L^{101}$ and $L^{102}$ each is a group represented by formula (GI)-LA, the substituent P represents a single bond, or a divalent linking group selected from the group consisting of —CH=CH—, —C≡C—, 1,4-phenylene, and a combination thereof;

in the case where one of $L^{101}$ and $L^{102}$ is a group represented by formula (GI)-LB, the substituent P is represented by *=CH—P¹-# or *=N—P¹-#, wherein * represents a linking position with the group represented by (GI)-LB, # represents a linking position with the group represented by (GI)-LA, and P¹ represents a single bond, or a divalent linking group selected from the group consisting of —CH=CH—, —C≡C—, 1,4-phenylene, and a combination thereof; and in the case where $L^{101}$ and $L^{102}$ each is a group represented by formula (GI)-LB, the substituent P represents a double bond, =CH—P¹—CH=, =N—P¹—CH=, or =N—P¹—N=.

2. The liquid crystal composition according to claim 1, wherein the liquid crystal R comprises a compound represented by formula (GII):

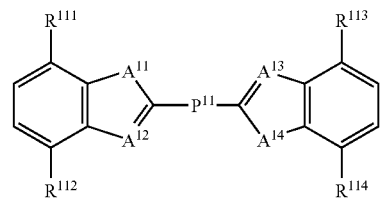

wherein $A^{11}$ and $A^{14}$ each independently represents —O—, —NH—, —S—, —CH₂—, —CO—, —SO— or —SO₂—;

$A^{12}$ and $A^{13}$ each independently represents —CH= or —N=;

$P^{11}$ represents a single bond, or a divalent linking group selected from the group consisting of —CH=CH—, —C≡C—, 1,4-phenylene, and a combination thereof; and $R^{111}$, $R^{112}$, $R^{113}$ and $R^{114}$ each independently is represented by formula (GIV):

*-$L^{121}$-divalent cyclic group-$L^{122}$-divalent chain group-$Q^{21}$ wherein * represents a position bonding to the benzene ring in formula (GII);

$L^{121}$ represents a single bond or a divalent linking group;

$L^{122}$ represents a single bond or a divalent linking group;

the divalent cyclic group represents a divalent linking group having at least one cyclic structure;

the divalent chain group represents an alkylene group, a substituted alkylene group, an alkenylene group, a substituted alkenylene group, an alkynylene group, or a substituted alkynylene group; and $Q^{21}$ represents a polymerizable group or a hydrogen atom.

3. A retardation plate comprising: a transparent support; and an optical anisotropic layer, wherein the optical anisotropic layer is a layer formed from the liquid crystal composition according to claim 1.

4. A retardation plate comprising an optical anisotropic layer formed from the liquid crystal composition according to claim 1, wherein the optical anisotropic layer is biaxial and has a retardation satisfying equation (III):

$Re(450\ nm)/Re(550\ nm)<1.0$ wherein Re (λ) is a retardation value in a plane of the optical anisotropic layer at a wavelength λ.

5. An elliptic polarizing plate comprising: a retardation plate according to claim 3; and a polarizing film.

6. An elliptic polarizing plate comprising: a retardation plate according to claim 4; and a polarizing film.

* * * * *